US012766691B2

(12) United States Patent
Okajima et al.

(10) Patent No.: US 12,766,691 B2
(45) Date of Patent: Oct. 20, 2026

(54) POWER TOOL

(71) Applicant: MAKITA CORPORATION, Anjo (JP)

(72) Inventors: Shizuki Okajima, Anjo (JP); Takao Kuroyanagi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 19/191,169

(22) Filed: Apr. 28, 2025

(65) Prior Publication Data

US 2025/0345914 A1 Nov. 13, 2025

(30) Foreign Application Priority Data

May 9, 2024 (JP) ................................ 2024-076640

(51) Int. Cl.
*B25F 5/00* (2006.01)
*B23B 45/00* (2006.01)
*B25B 21/02* (2006.01)

(52) U.S. Cl.
CPC ............ *B25F 5/001* (2013.01); *B23B 45/008* (2013.01); *B25B 21/023* (2013.01); *B25B 21/026* (2013.01)

(58) Field of Classification Search
CPC ......... B25F 5/02; B23B 45/00; B23B 45/001; B23B 45/008; B25B 31/00; B25B 33/00; H01H 15/00
USPC .......................................................... 173/216
See application file for complete search history.

(56) References Cited

U.S. PATENT DOCUMENTS 4,324,958 A * 4/1982 Valleau ................ H01H 15/005 200/548
4,493,223 A * 1/1985 Kishi ...................... B23B 45/02 74/369
4,834,192 A * 5/1989 Hansson ................ B23Q 5/142 475/263
5,365,028 A * 11/1994 Takano ................ H01H 15/005 200/16 R
6,070,675 A * 6/2000 Mayer ..................... B25F 5/001 173/48

(Continued)

FOREIGN PATENT DOCUMENTS

DE 102022133303 A1 6/2023
JP 2023089934 A 6/2023

*Primary Examiner* — Gloria R Weeks
(74) *Attorney, Agent, or Firm* — J-TEK LAW PLLC; Jeffrey D. Tekanic; Scott T. Wakeman

(57) ABSTRACT

A power tool (1) includes: a motor (6) having a stator (61) and a rotor (62); an output part (8) disposed forward of the motor; a speed-reducing mechanism (30) having three or more variable-speed stages, which transmits rotational energy from the rotor to the output part; a gear-shifting manipulation part (12), which is movable within a movable range that includes three or more speed positions for the respective three or more variable-speed stages of the speed-reducing mechanism; and a position-holding part (90; 90A-90F), which imparts a position-holding force to the gear-shifting manipulation part at each of the speed positions to hold it at the speed position. The position-holding force at an intermediate speed position (PM), which is located between two end-portion speed positions (PE) at the two ends of the movable range, is larger than the position-holding force at each of the two end-portion speed positions of the movable range.

16 Claims, 34 Drawing Sheets

(56) References Cited

U.S. PATENT DOCUMENTS

| | | | | |
|---|---|---|---|---|
| 6,655,470 | B1 * | 12/2003 | Chen | B25B 17/02 173/217 |
| 7,066,691 | B2 * | 6/2006 | Doyle | F16D 7/08 408/124 |
| 7,398,834 | B2 * | 7/2008 | Jung | B25D 16/006 173/4 |
| 7,600,579 | B2 * | 10/2009 | Wasielewski | B25F 5/029 173/171 |
| 7,882,900 | B2 * | 2/2011 | Borinato | B23B 45/008 173/217 |
| 7,987,922 | B2 * | 8/2011 | Tokunaga | B25F 5/001 173/160 |
| 8,066,611 | B2 * | 11/2011 | Spielmann | B25F 5/001 475/299 |
| 8,083,007 | B2 * | 12/2011 | Inagaki | B25F 5/001 173/217 |
| 8,251,158 | B2 * | 8/2012 | Tomayko | B25F 5/001 475/329 |
| 8,760,102 | B2 * | 6/2014 | Hirabayashi | B60L 15/20 318/4 |
| 9,481,080 | B2 * | 11/2016 | Kuehne | B23B 45/008 |
| 10,300,590 | B2 * | 5/2019 | Brennenstuhl | B25F 5/001 |
| 10,328,565 | B2 * | 6/2019 | Moessnang | B25F 5/001 |
| 10,497,523 | B2 * | 12/2019 | Wong | H01H 15/02 |
| 11,059,160 | B2 * | 7/2021 | Kuehne | B23B 45/008 |
| 11,302,498 | B1 * | 4/2022 | Piper | G05G 1/04 |
| 11,964,375 | B2 * | 4/2024 | Gehret | B25F 5/02 |
| 2010/0200257 | A1 * | 8/2010 | Scrimshaw | B27B 5/32 74/423 |
| 2021/0170564 | A1 * | 6/2021 | Gehret | F16H 3/663 |
| 2023/0191580 | A1 | 6/2023 | Eba et al. | |
| 2024/0408737 | A1 * | 12/2024 | Kuroyanagi | B25B 21/02 |

* cited by examiner

[Speed "2"]

[Speed "3"]

POWER TOOL

CROSS-REFERENCE TO RELATED APPLICATION

This application claims priority to Japanese patent application no. 2024-076640 filed on May 9, 2024, the contents of which are fully incorporated herein by reference.

TECHNICAL FIELD

The techniques disclosed in the present specification relate to a power tool.

BACKGROUND ART

US 2023/0191580 A1 and family member DE 10 2022 133 303 A1 disclose a driver-drill comprising a gear-shifting mechanism (speed-reducing mechanism) having three stages. The speed-reduction ratio of the gear-shifting mechanism is switched by moving (sliding) a speed-change lever (speed switch lever) to a low-speed mode position, a medium-speed mode position, or a high-speed mode position, respectively. The medium-speed mode position is located between the low-speed mode position and the high-speed mode position.

SUMMARY OF THE INVENTION

In some situations, when a user is switching the speed-change mechanism to the medium-speed mode, the speed-change lever may be unintentionally moved past the medium-speed mode position to the position of a different speed mode, which is inconvenient, or to a position between two adjacent speed-mode positions, which might lead to damage to the speed-change mechanism and/or inferior performance. It is therefore one non-limiting object of the present teachings to disclose techniques that reduce the likelihood of the gear-shifting mechanism being switched to an unintended gear-shift mode or to a position between two adjacent speed-mode positions.

In one aspect of the present teachings, a power tool may comprise: a motor, which comprises a stator and a rotor; an output part, which is disposed forward of the motor; a speed-reducing mechanism having three or more gear-shift stages, which is driven by rotation of the rotor and causes the output part to rotate at a rotational speed that is lower than the rotational speed of the rotor that is being input to the speed-reducing mechanism; a gear-shifting manipulation part, which is movable within a movable range that includes three or more speed (change) positions for the respective three or more gear-shift stages of the speed-reducing mechanism; and a position-holding part, which imparts a position-holding force to the gear-shifting manipulation part at each of the speed positions to hold it at the respective speed position. The position-holding force at an intermediate speed position, which is located between end-portion speed positions respectively at both ends of the movable range, may be larger than the position-holding force(s) at the end-portion speed positions of the movable range of the movable range.

In addition, a power tool may comprise: a motor, which comprises a stator and a rotor; an output part, which is disposed forward of the motor; a speed-reducing mechanism having three or more gear-shift stages, which is driven by rotation of the rotor and causes the output part to rotate at a rotational speed that is lower than the rotational speed of the rotor that is being input to the speed-reducing mechanism; a gear-shifting manipulation part, which is movable within a movable range that includes speed positions for the respective gear-shift stages of the speed-reducing mechanism; and a housing, which holds the gear-shifting manipulation part in a movable manner and imparts to the gear-shifting manipulation part a resisting force that resists movement of the gear-shifting manipulation part. The resisting force at an intermediate position, which preferably corresponds to a medium-speed mode or an intermediate-speed mode, of the movable range may be larger than the resisting force(s) at the end portions of the movable range.

According to the techniques disclosed in the present specification, the likelihood of switching the gear-shifting mechanism to a gear-shift position that is not intended by the user is reduced.

DETAILED DESCRIPTION OF THE INVENTION

Figure 1:
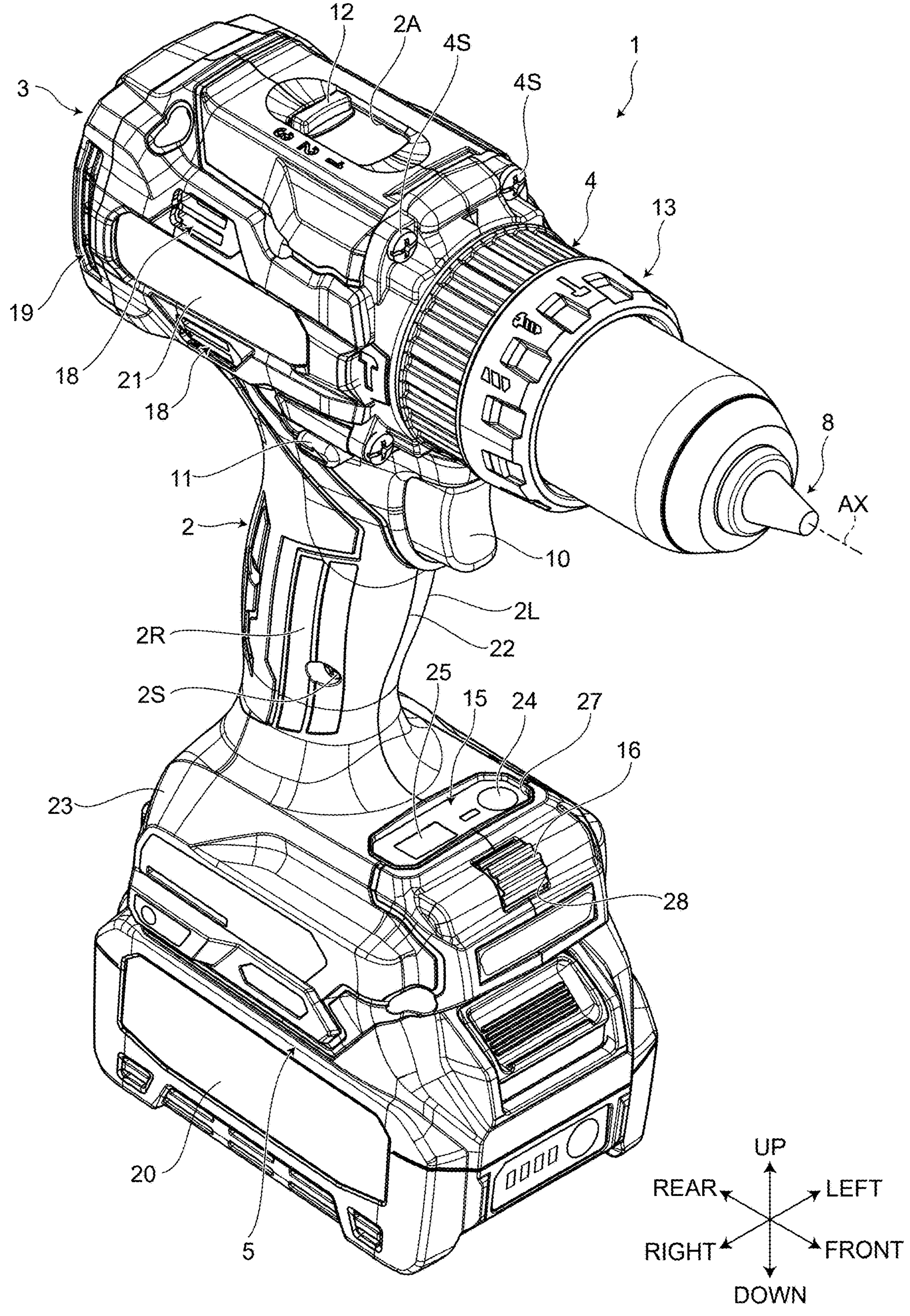
FIG. 1 is an oblique view, viewed from the right front, that shows a power tool according to a first representative embodiment of the present teachings.

As was mentioned above, a power tool according to one aspect of the present teachings may comprise: a motor, which comprises a stator and a rotor; an output part, which is disposed forward of the motor; a speed-reducing mechanism having three or more gear-shift stages, which is driven by rotation of the rotor and causes the output part to rotate at a rotational speed that is lower than the rotational speed of the rotor that is being input to the speed-reducing mechanism (but at a higher torque); a gear-shifting manipulation part (e.g., a slidable element or a rotatable dial), which is (manually) movable within a movable range that includes three or more speed (change) positions for the respective three or more gear-shift stages of the speed-reducing mechanism; and a position-holding part, which imparts a position-holding force to the gear-shifting manipulation part at each of the speed positions to hold it at the respective speed position. The position-holding force at an intermediate speed position, which is located between end-portion speed positions respectively at both ends of the movable range, may be larger than the position-holding force(s) at the end-portion speed positions of the movable range of the movable range.

In the present specification, the expression "the position-holding force to hold it at the respective speed position" means the resisting force (reaction force) that is imparted to the gear-shifting manipulation part when the gear-shifting manipulation part is being moved away (out) from the speed position. Here, it is noted that the maximum position-holding force at each speed position is the amount force required to be applied to the gear-shifting manipulation part in the direction of movement of the gear-shifting manipulation part to move it away (out) from the speed position, in which it is presently disposed. In the following description and claims, which provide a comparison of position-holding forces at the various speed positions, it should be understood that these comparisons are based on the maximum position-holding force that can be generated at each speed position in view of the shapes of the engaged portions of the gear-shifting manipulation part and the housing. In the above-mentioned configuration, because a (maximum) position-holding force that is larger than the (maximum) position-holding force(s) at each of the end-portion speed positions is imparted to the gear-shifting manipulation part at the intermediate speed position, when a user attempts to move the gear-shifting manipulation part to the intermediate speed position, the gear-shifting manipulation part is less likely to unintentionally pass through (beyond) the intermediate speed position. It is noted that, because the end-portion speed positions are at each end of the movable range, the user only needs to move the gear-shifting manipulation part to the limit of the movable range and thus cannot possibly unintentionally move the gear-shifting manipulation part beyond the end-portion speed positions. Thereby, the likelihood that the user will inadvertently switch the gear-shifting mechanism to a gear-shift mode (speed position) that is not intended is reduced in such an embodiment, and/or the likelihood that the gear-shifting mechanism will be inadvertently moved to a position between speed positions, which could lead to damage of the speed-reducing mechanism, is also reduced.

In one or more embodiments, one of the gear-shifting manipulation part and the position-holding part may comprise a protruding portion (protrusion). The other of the gear-shifting manipulation part and the position-holding part may have a groove portion (groove, channel, recess) and the position-holding force is generated by engagement of the protruding portion with (in) the groove portion.

In the above-mentioned configuration, in the state the groove portion and the protruding portion have been engaged with each other owing to the protruding portion entering the interior of the corresponding groove portion, the position-holding force generated by the engagement can be effectively imparted to the gear-shifting manipulation part as a resisting force when the protruding portion attempts to move away from the interior of the groove portion (e.g., when the user presses the gear-shifting manipulation part to move (slide) it to a different speed position). Furthermore, the magnitude of the position-holding force can be easily adjusted by the engagement state (hold state) between the protruding portion and the corresponding groove portion. For example, as will be further described below, the shape of the groove portion and/or the shape of the protruding portion and/or the elasticity of the protruding portion may be modified, as desired, to increase or decrease the amount of force required to be applied to the gear-shifting manipulation part by the user to cause the protruding portion to overcome (pass over) one of the edges of the groove portion in order to be moved to a different speed position.

In one or more embodiments, groove portions may be provided at each of the three or more speed positions, which include the two end-portion speed positions and the intermediate speed position. The groove portions at the intermediate speed position may have a different shape than the shape(s) of the groove portions at the end-portion speed positions.

In the above-mentioned configuration, by making the shapes of the groove portion at the intermediate speed position and the groove portions at the end-portion speed positions different, the magnitude of the position-holding force required to be applied by the user to cause the protruding portion to move away (out) from the interiors of the respective groove portions can be made different. For example, the groove portions for the intermediate speed position are preferably shaped (configured) to require more force to be applied to the gear-shifting manipulation part to cause the gear-shifting manipulation part to move away (out) from the intermediate speed position than from the two end-portion speed positions.

In one or more embodiments, each of the groove portions may have (be defined in part by) a pair of inclined inner surfaces that are inclined relative to a movement direction of the gear-shifting manipulation part. The inclination angles of each of inclined inner surfaces of the groove portion at the intermediate speed position may be larger than the inclination angles of each of the inclined inner surfaces of the groove portions at the two end-portion speed positions. In the present specification, the inclination angle of an inclined inner surface is the size of the angle formed by (i) a straight line that extends along the movement direction of the gear-shifting manipulation part (e.g., along a straight slide surface of the housing, which movably supports the gear-shifting manipulation part, or along a straight slide surface of the gear-shifting manipulation part) and (ii) the inclined inner surface of the groove portion.

In the above-mentioned configuration, because the protruding portion(s) must move along the inclined inner surface(s) at the time when the protruding portion is being moved (pushed) to cause the protruding portion to leave (exit, depart from) the interior of a groove portion, the magnitude of the force (i.e., the position-holding force) required to cause the protruding portion to move away from (out of) the interior of the groove portion can be made larger, e.g., by making the inclination angle of the inclined inner surface(s) larger, e.g., at the intermediate speed position than at the two end-portion speed positions.

In one or more embodiments, each of the protruding portions may have (be defined, in part, by) a pair of inclined outer surfaces that are inclined relative to the movement direction of the gear-shifting manipulation part. The inclination angles of each of the inclined inner surfaces of the groove portion at the intermediate speed position may be larger than the inclination angles of each of the inclined outer surfaces of the protruding portion. In the present specification, the inclination angle of an inclined outer surface is the size of the angle formed by (i) a straight line extending along the movement direction of the gear-shifting manipulation part (in particular, along a straight slide surface of the housing, which movably supports the gear-shifting manipulation part, or along a straight slide surface of the gear-shifting manipulation part) and (ii) the inclined outer surface.

In the above-mentioned configuration, the inclination angle(s) of the inclined outer surfaces of the protruding portion(s) is matched (attuned) to (selected in view of, adjusted with respect to) the inclination angles of the pairs of inclined inner surfaces of the groove portions at the end-portion speed positions such that, for example, the protruding portion(s) can mate with the groove portions at the end-portion speed positions (i.e. the protruding portion(s) have exactly, or nearly exactly, the same shape as the groove portions at the end-portion speed positions) while the protruding portion(s) can be accommodated inside the groove portion(s) at the intermediate speed position with a gap (i.e. the protruding portion(s) have a different shape than the groove portion(s) at the intermediate speed position such that the protruding portion(s) do(es) not fully mate with the groove portion(s) at the intermediate speed position).

In one or more embodiments, the inclination angle(s) of each of the inclined inner surfaces at the intermediate speed position may be 45° or more and 90° or less. In addition or in the alternative, the inclination angle(s) of each of the inclined inner surfaces at the two end-portion speed position may be 45° or less, e.g., between 20-45°, preferably between 35-45°.

In the above-mentioned configuration, the position-holding forces can easily be made larger at the intermediate speed position than at the two end-portion speed positions (e.g., by making the inclination angle(s) at the intermediate speed position larger than the inclination angle(s) at the two end-portion speed positions).

In one or more embodiments, the groove portion(s) at the intermediate speed position may have an inner-bottom surface, which connects ends of the pair of inclined inner surfaces. The inner-bottom surface is preferably not a point (i.e. the vertex of a triangle), but rather is preferably a flat or curved surface.

In the above-mentioned configuration, by providing such an inner-bottom surface for the groove portion(s) at the intermediate speed position without forming a vertex between the pair of inclined inner surfaces, the groove depth of the groove portion(s) at the intermediate speed position can be, e.g., shallower (than if the groove portion(s) have a triangular shape) even if the inclination angle(s) of the inclined inner surfaces at the intermediate speed position has (have) been made relatively large.

In one or more embodiments, the groove depth of the groove portion(s) at the intermediate speed position may be less than the groove depth of the groove portions at the end-portion speed positions.

In the above-mentioned configuration, the maximum groove depth of the groove portion(s) at each of the speed positions is not required to be made large even if the inclination angle(s) of the inclined inner surfaces of the groove portion(s) at the intermediate speed position has (have) been made relatively large. Because the space (e.g., the thickness of the part that defines the groove portions) needed to form the groove portions at each of the speed positions is not required to be large to achieve the desirable effects of this aspect of the present teachings, the outer-shape dimensions of the power tool need not be enlarged.

In one or more embodiments, the groove depth of the groove portion(s) at the intermediate speed position may be larger than the groove depth of the groove portions at the end-portion speed positions.

In the above-mentioned configuration, the force (i.e., the position-holding force) required for the protruding portion(s) to move away from (out of) the interior(s) of the groove portion(s) at the intermediate speed position can be made larger because the protruding portion(s) are inserted into a deeper location in the groove portion(s) at the intermediate speed position than at the end-portion speed positions. In other words, because more elastic deformation is required for the protruding portion(s) to move out of the groove portion(s) at the intermediate speed position than to move out of the groove portion(s) at the end-portion speed positions, a greater force is required to be applied to the protruding portion(s) to move out of the intermediate speed position than the end-portion speed positions.

In one or more embodiments, the power tool may further comprise a housing, which holds the gear-shifting manipulation part in a movable manner. The position-holding part may be located (e.g., defined) on the housing and provides a slide surface or slide surfaces for the gear-shifting manipulation part.

In the above-mentioned configuration, the position-holding force imparted to the gear-shifting manipulation part can be adjusted by making the sliding resistance imparted to the gear-shifting manipulation part by the position-holding part different.

In one or more embodiments, the gear-shifting manipulation part may comprise a movable member, which is moveable to the 3 or more speed positions, and at least one elastic member, which is held by the movable member and contacts (one of) the slide surface(s) in a state of being elastically deformed.

In the above-mentioned configuration, by providing the elastic member(s) on the gear-shifting manipulation part, the position-holding force imparted to the gear-shifting manipulation part can be adjusted using the elastic deformation of the elastic member(s).

In one or more embodiments, the movable range or path of the gear-shifting manipulation part, which may be defined by the above-mentioned position holding part and/or a portion of the housing of the power tool, may have a straight-line shape that extends along or in parallel to a front-rear direction of the power tool, e.g., in parallel to a rotational axis of a spindle that rotates a chuck during operation of the power tool.

In the above-mentioned configuration, while on the one hand, the user can move the gear-shifting manipulation part to each of the speed positions by performing a simple manipulation (e.g., merely pushing (sliding)) of the gear-shifting manipulation part in one direction, the gear-shifting manipulation part can easily move beyond the intermediate speed position when the user applies a larger force to the gear-shifting manipulation part. Consequently, by making the position-holding force at the intermediate speed position larger than at all other positions between the end-portion speed positions, a simple and easily manipulatable configuration can be achieved by which it is possible to reduce the likelihood of situations in which the user inadvertently switches the gear-shifting mechanism to an unintended gear-shift mode or to a position between the intermediate speed position and one of the end-portion speed positions.

In one or more embodiments, the gear-shifting manipulation part may have a plate shape that is slidable along the movable range or path.

In the above-mentioned configuration, the gear-shifting manipulation part can be moved to each of the speed positions by merely sliding the gear-shifting manipulation part.

In one or more embodiments, the speed-reducing mechanism may comprise one or more gear mechanisms that is (are) connected to the gear-shifting manipulation part. The speed-reduction ratio of the speed-reducing mechanism may be switched (changed) by changing an intermeshing position of the gear mechanism(s) in accordance with the respective speed positions of the gear-shifting manipulation part.

In the above-mentioned configuration, because electronic control is not needed for switching the speed-reducing mechanism, the configuration of the power tool can be simplified.

In one or more embodiments, the speed-reducing mechanism may be a three-stage, gear-shifting mechanism.

In the above-mentioned configuration, the user can select the appropriate gear-shift stage, from among the three stages, in accordance with working conditions. Furthermore, the speed-reducing mechanism can be switched, as appropriate, from among the three stages, to the gear-shift stage that corresponds to the intermediate speed position.

In one or more embodiments, the output part may comprise: a spindle, which is rotatable about a rotational axis extending in a front-rear direction using rotational force transmitted from the rotor (e.g., the spindle is preferably directly connected to the speed-reducing mechanism, which is driven by the rotor); and a chuck, which is mounted on the spindle and is configured to hold a tool accessory.

In the above-mentioned configuration, the power tool can be employed for a wide variety of types of work by switching the tool accessory.

In one or more embodiments, the power tool may further comprise a housing, which holds the gear-shifting manipulation part in a movable manner. The position-holding part may comprise an elastic member, which is disposed on the housing and contacts a slide surface of the gear-shifting manipulation part.

In the above-mentioned configuration, by providing the elastic member on the housing (instead of on the gear-shifting manipulation part), the position-holding force imparted to the gear-shifting manipulation part also can be adjusted using the elastic deformation of the elastic member.

In one or more embodiments, a power tool may comprise: a motor, which comprises a stator and a rotor; an output part, which is disposed forward of the motor; a speed-reducing mechanism having three or more gear-shift stages, which is driven by rotation of the rotor and causes the output part to rotate at a rotational speed that is lower than the rotational speed of the rotor that is being input to the speed-reducing mechanism; a gear-shifting manipulation part, which is movable within a movable range that includes (e.g. three or more) speed (change) positions for the respective gear-shift stages of the speed-reducing mechanism; and a housing, which holds the gear-shifting manipulation part in a movable manner and imparts to the gear-shifting manipulation part a resisting force that resists (e.g., sliding) movement of the gear-shifting manipulation part. The resisting force at an intermediate position of the movable range (i.e. at an intermediate speed position) may be larger than the resisting force(s) at each end portion of the movable range (i.e. at the highest speed position and the lowest speed position).

In the above-mentioned configuration, because the resisting force imparted to the gear-shifting manipulation part at an intermediate position of the movable range is larger than at other positions along the movable range, when the user attempts to move the gear-shifting manipulation part to the speed position at an intermediate position of the movable range, it is less likely that the gear-shifting manipulation part will inadvertently pass through the (intermediate) speed position in the middle of the movable range. It is noted that the user only needs to move the gear-shifting manipulation part to the limits of the movable range for the speed positions at the end portions of the movable range, and there is no possibility that the user could unintentionally move the gear-shifting manipulation part beyond the speed positions at the end portions. Thereby, the likelihood is reduced that the user will inadvertently switch the gear-shifting mechanism to a gear-shift mode that is not intended.

In one or more embodiments, the housing may have (define) a pair of slide surfaces, which sandwiches the gear-shifting manipulation part in a movable manner. The spacing (distance) between the pair of slide surfaces may be smaller at an intermediate position of the movable range than at the end portions of the movable range.

In the above-mentioned configuration, because the resisting force due to friction can be increased by making the spacing between the pair of slide surfaces smaller, the resisting force at an intermediate position of the movable range can be made larger simply by reducing the spacing (clearance) between the two slide surface in the vicinity of the intermediate speed position.

Embodiments according to the present disclosure will be explained below, with reference to the drawings, but the present disclosure is not limited thereto. Structural elements of the embodiments explained below can be combined where appropriate. In addition, there are also situations in which some of the structural elements are not used.

In the embodiment, positional relationships among the parts are explained using the terms left, right, front, rear, up, and down. These terms indicate relative position or direction, wherein the center of a power tool is the reference.

The power tool comprises a motor. In the embodiment, the direction parallel to rotational axis AX of the motor is called the axial direction where appropriate, the direction that goes around rotational axis AX is called the circumferential direction or the rotational direction where appropriate, and the radial direction of rotational axis AX is called the radial direction where appropriate.

In the embodiment, rotational axis AX extends in a front-rear direction of the power tool. The axial direction and the front-rear direction coincide (are colinear) or are parallel with each other. One side in the axial direction is forward, and the other side in the axial direction is rearward. In addition, in the radial direction, a location that is proximate to or a direction that approaches rotational axis AX is called "radially inward" where appropriate, and a location that is distant from or a direction that leads away from rotational axis AX is called "radially outward" where appropriate.

First Embodiment

Overview of Power Tools According to the Present Teachings

Figure 2:
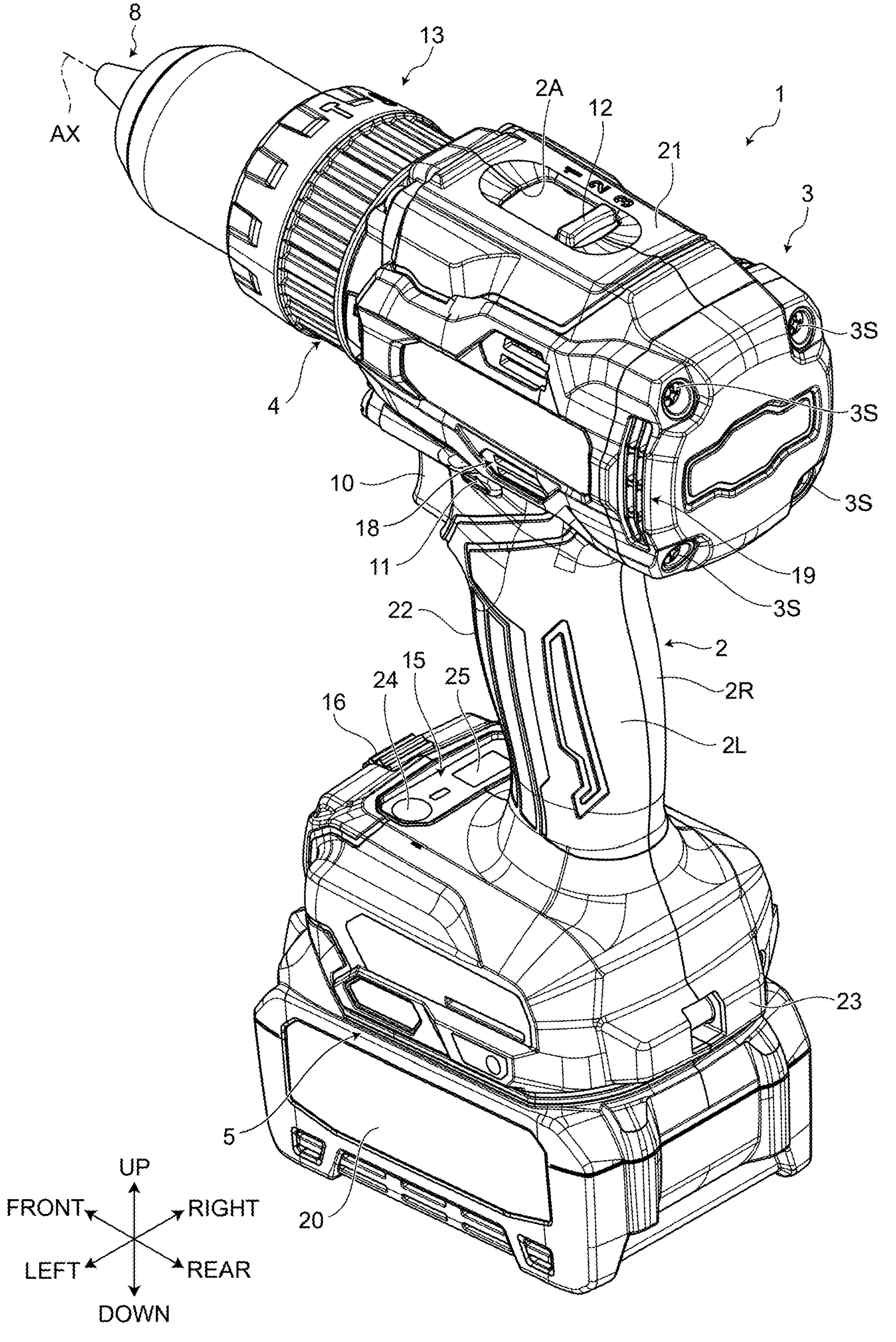
FIG. 2 is an oblique view, viewed from the left rear, that shows the power tool according to the first embodiment.
Figure 3:
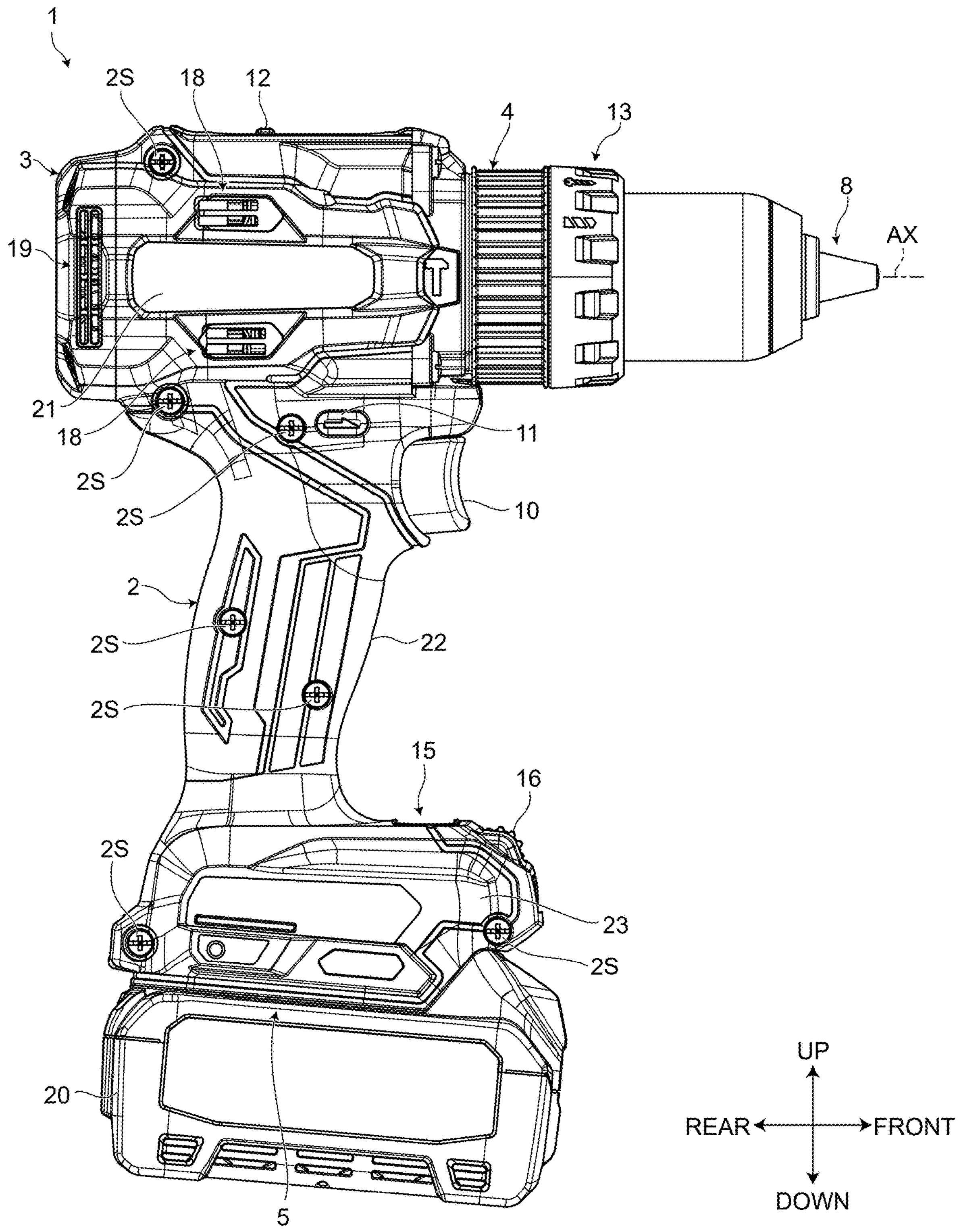
FIG. 3 is a side view that shows the power tool according to the first embodiment.
Figure 4:
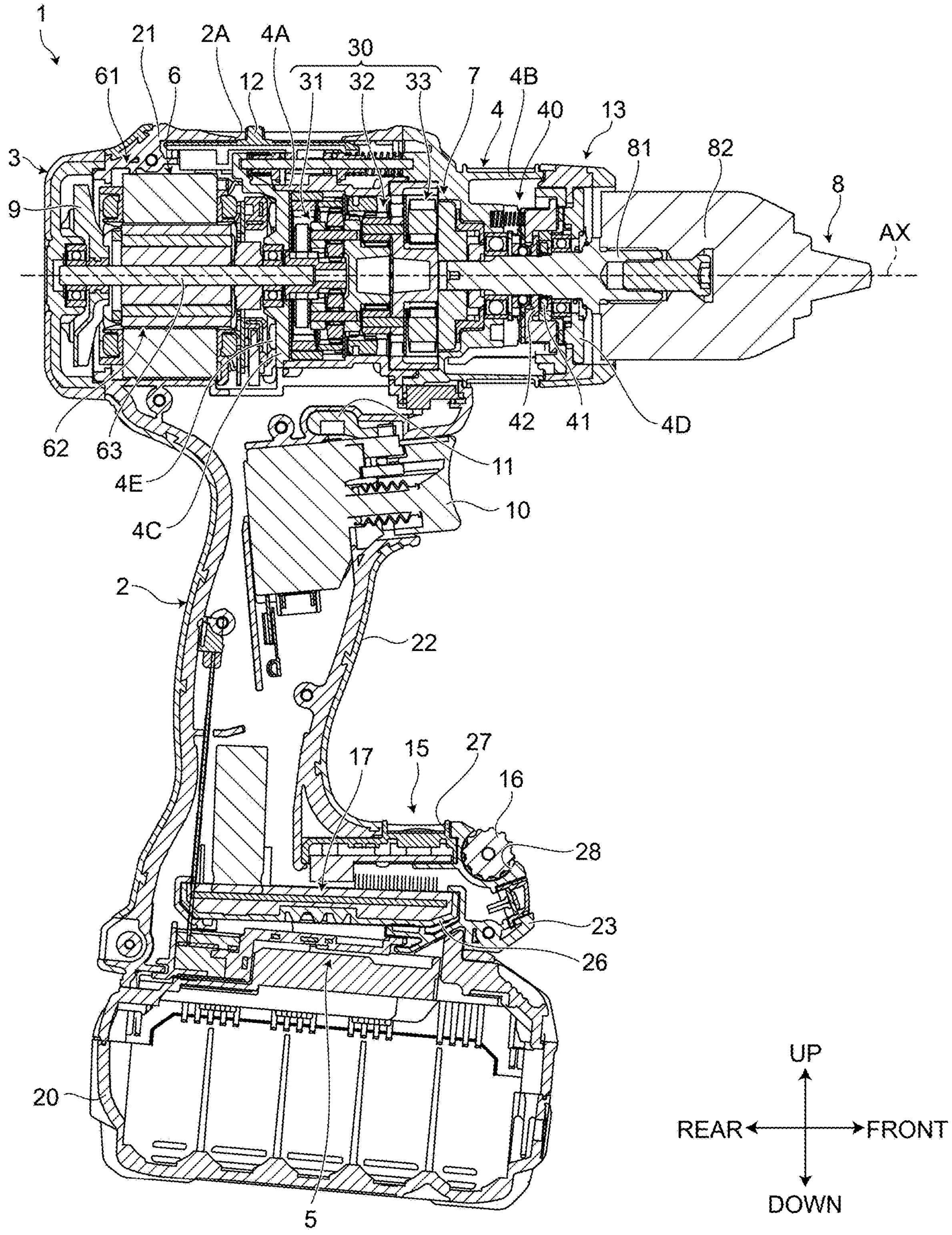
FIG. 4 is a cross-sectional view that shows the power tool according to the first embodiment.

FIG. 1 is an oblique view, viewed from the right front, that shows a power tool 1 according to the first embodiment of the present teachings. FIG. 2 is an oblique view, viewed from the left rear, that shows the power tool 1 according to the first embodiment. FIG. 3 is a side view that shows the power tool 1 according to the first embodiment. FIG. 4 is a cross-sectional view that shows the power tool 1 according to the first embodiment. In the first embodiment, the power tool 1 is a hammer driver-drill.

As shown in FIGS. 1-4, the power tool 1 comprises a housing 2, a rear cover 3, a casing 4, a battery-mounting part 5, a motor 6, a power-transmission mechanism 7, an output part 8, a fan 9, a trigger lever 10, a forward/reverse-switch lever (reversing switch lever) 11, a speed-change lever 12, which is one example of a change-manipulation part or gear-shifting manipulation part according to the present teachings, a mode-change ring (adjusting ring) 13, an interface panel 15, a dial 16, and a controller 17.

The housing 2 is made of a polymer (synthetic resin). In the embodiments described herein, the housing 2 is preferably made of nylon. The housing 2 includes a left housing 2L and a right housing 2R. The left housing 2L and the right housing 2R are fixed to each other by screws 2S. By fixing the left housing 2L and the right housing 2R to each other, the housing 2 is formed.

The housing 2 comprises a motor-housing part 21, a grip part 22, and a battery-holding part 23.

The motor-housing part 21 houses the motor 6. The motor-housing part 21 has a tubular shape. The motor-housing part 21 is disposed so as to cover the periphery of the motor 6.

The grip part 22 is configured to be gripped by the user during operation of the hammer driver-drill. The grip part 22 is disposed downward of the motor-housing part 21. The grip part 22 extends downward from the motor-housing part 21. The trigger lever 10 is disposed at a front portion of the grip part 22.

The battery-holding part 23 houses the controller 17. The battery-holding part 23 is disposed at a lower portion of the grip part 22. The battery-holding part 23 is connected to a lower-end portion of the grip part 22. In both the front-rear direction and a left-right direction, the dimensions of the outer shape of the battery-holding part 23 are larger than the dimensions of the outer shape of the grip part 22.

The rear cover 3 is made of a polymer (synthetic resin), which is again preferably nylon. The rear cover 3 is disposed rearward of the motor-housing part 21. The rear cover 3 is disposed so as to cover a rear portion of the motor 6. The rear cover 3 houses the fan 9. The rear cover 3 is disposed so as to cover an opening in a rear portion of the motor-housing part 21. The rear cover 3 is fixed to the motor-housing part 21 by screws 3S.

In the embodiments described herein, the motor-housing part 21 and the rear cover 3 are enclosing members that cover the periphery and a rear portion of the motor 6. It is noted that the motor-housing part 21 and the rear cover 3 may be integral with each other, i.e. with no seams therebetween, such as a monolithic structure.

The motor-housing part 21 has air-intake ports 18. The rear cover 3 has air-exhaust ports 19. Air that is outside of the housing 2 flows into the interior space of the housing 2 via the air-intake ports 18. Air in the interior space of the housing 2 flows out to the exterior of the housing 2 via the air-exhaust ports 19.

The casing 4 houses the power-transmission mechanism 7. The casing 4 comprises a first casing 4A, a second casing 4B, a bracket plate 4C, and a stop plate 4D. The second casing 4B is disposed forward of the first casing 4A. The mode-change ring 13 is disposed forward of the second casing 4B. The first casing 4A is made of a polymer (synthetic resin), which again may be nylon. The second casing 4B is made of a metal. In the embodiment, the second casing 4B is made of aluminum. The casing 4 is connected to a front portion of the motor-housing part 21. Both the first casing 4A and the second casing 4B have a tubular shape.

The first casing 4A is fixed to a rear-end portion of the second casing 4B. The bracket plate 4C is disposed so as to cover an opening in a rear-end portion of the first casing 4A. The bracket plate 4C is fixed to the rear-end portion of the first casing 4A by screws 4E. The stop plate 4D is disposed so as to cover an opening in a front-end portion of the second casing 4B. The stop plate 4D is fixed to the front-end portion of the second casing 4B by screws 4F (see FIG. 5).

The casing 4 is disposed so as to cover an opening in the front portion of the motor-housing part 21. The first casing 4A is disposed in the interior of the motor-housing part 21. The second casing 4B is fixed to the motor-housing part 21 by screws 4S.

The battery-mounting part 5 is formed at a lower portion of the battery-holding part 23. The battery-mounting part 5 is connected to a battery pack 20. The battery pack 20 is mounted on the battery-mounting part 5. The battery pack 20 is detachable from the battery-mounting part 5. The battery pack 20 contains secondary (rechargeable) batteries, such as, e.g., lithium-ion battery cells. When mounted on the battery-mounting part 5, the battery pack 20 can supply electric power to the power tool 1. The motor 6 is driven by electric power supplied from the battery pack 20. The interface panel 15 and the controller 17 operate using electric power supplied from the battery pack 20.

The motor 6 is the motive power supply of the power tool 1. The motor 6 is preferably an inner-rotor-type brushless motor, although other configurations of the motor 6 may be used with the present teachings. The motor 6 is housed in the motor-housing part 21. The motor 6 comprises a stator 61, which has a tubular shape, and a rotor 62, which is disposed in the interior of the stator 61. The rotor 62 rotates relative to the stator 61. The rotor 62 comprises a rotor shaft 63, which extends in the axial direction.

The power-transmission mechanism 7 is disposed forward of the motor 6. The power-transmission mechanism 7 is housed in the casing 4. The power-transmission mechanism 7 operably couples the rotor shaft 63 and the output part 8 to each other, such that the power-transmission mechanism 7 transmits motive power generated by the motor 6 to the output part 8. The power-transmission mechanism 7 comprises a plurality of gears.

More specifically, the power-transmission mechanism 7 comprises a speed-reducing mechanism 30 and a hammer mechanism 40. In the first embodiment, the hammer mechanism 40 is a cam-action hammer mechanism, although in other embodiments of the present teachings, the hammer mechanism 40 may be a percussive hammer mechanism that utilizes an impact bolt that is movably disposed inside a cylinder and repetitively strikes the spindle in the axial direction thereof to perform an axial hammering action. Furthermore, in other embodiments of the present teachings, it is not necessary to provide a hammer mechanism, and the power tool may be configured, e.g., as a driver-drill. More broadly speaking, the present teachings are applicable to any power tools that utilize a 3-speed or greater (3-stage or greater) manually-shiftable transmission.

The speed-reducing mechanism 30 is driven by the rotor 62 (the rotor shaft 63) and causes the output part 8 to rotate at a rotational speed that is lower than the rotational speed of the rotor 62 that is currently being input into the speed-reducing mechanism 30 (but at higher torque). In the first embodiment, the speed-reducing mechanism 30 comprises three stages of gear mechanisms connected to the speed-change lever 12. The speed-reduction ratio of the speed-reducing mechanism 30 is switched by changing an intermeshing position of the gear mechanisms in accordance with the speed (change) position of the speed-change lever 12. More specifically, in the first embodiment, the speed-reducing mechanism 30 comprises a first (first stage) planetary-gear mechanism 31, a second (second stage) planetary-gear mechanism 32, and a third (third stage) planetary-gear mechanism 33. At least a portion of the first planetary-gear mechanism 31 is disposed forward of the motor 6. The second planetary-gear mechanism 32 is disposed forward of the first planetary-gear mechanism 31. The third planetary-gear mechanism 33 is disposed forward of the second planetary-gear mechanism 32. The first planetary-gear mechanism 31 is driven (operated) by the rotational force output by the motor 6 via the rotor shaft 63. The second planetary-gear mechanism 32 is driven (operated) by the rotational force output by the first planetary-gear mechanism 31. The third planetary-gear mechanism 33 is driven (operated) by the rotational force output by the second planetary-gear mechanism 32.

The hammer mechanism 40, when actuated, causes the output part 8 to hammer in the axial direction. The hammer mechanism 40 comprises a first cam 41, a second cam 42, and a hammer-switching ring 43 (see FIG. 5).

The output part 8 is disposed forward of the motor 6. The output part 8 is rotated using the rotational force (energy) output by the rotor 62. More specifically, the output part 8 is rotated, in the state in which the tool accessory has been mounted thereon, by the rotational force output from the rotor 62 and transmitted via the power-transmission mechanism 7, which includes the above-described speed-change mechanism 30. The output part 8 comprises: a spindle 81, which is rotatable about rotational axis AX; and a chuck 82, which is mounted on the spindle 81 and is configured to hold a tool accessory. That is, the tool accessory is held in (by) the chuck 82. A front-end portion of the chuck 82 is disposed forward of the casing 4. At least a portion of the spindle 81 is disposed forward of the third planetary-gear mechanism 33. The spindle 81 is operably coupled to the third planetary-gear mechanism 33. Thus, in greater detail, the spindle 81 is rotated by the rotational force (energy) output by the rotor 62 and transmitted via the first planetary-gear mechanism 31, the second planetary-gear mechanism 32, and the third planetary-gear mechanism 33.

The fan 9 is disposed rearward of the motor 6. The fan 9 generates an airflow for cooling the motor 6. The fan 9 is fixed to at least a portion of the rotor 62. More specifically, the fan 9 is fixed to a rear portion of the rotor shaft 63. The fan 9 is rotated by the rotation of the rotor shaft 63. That is, when the rotor shaft 63 rotates, the fan 9 rotates together with the rotor shaft 63. When the fan 9 rotates, air outside of the housing 2 flows into the interior space of the housing 2 via the air-intake ports 18, as was explained above. The air that has flowed into the interior space of the housing 2 flows through the interior space of the housing 2, and thereby cools the motor 6. The air that has flowed through the interior space of the housing 2 flows out to the exterior of the housing 2 via the air-exhaust ports 19.

The trigger lever 10 is manipulated (pressed, squeezed) to start the motor 6. The trigger lever 10 is provided at an upper portion of the grip part 22. A front-end portion of the trigger lever 10 protrudes forward from a front portion of the grip part 22. The trigger lever 10 is movable in the front-rear direction. The trigger lever 10 is configured to be manipulated by the user to control the operation of the power tool

1. By manipulating (pressing) the trigger lever 10 such that it moves rearward, the motor 6 starts. By releasing the trigger lever 10, the motor 6 stops.

The forward/reverse-switch lever 11 is manipulated (slid) to change the rotational direction of the motor 6. The forward/reverse-switch lever 11 is provided at the upper portion of the grip part 22. A left-end portion of the forward/reverse-switch lever 11 protrudes leftward from a left portion of the grip part 22. A right-end portion of the forward/reverse-switch lever 11 protrudes rightward from a right portion of the grip part 22. The forward/reverse-switch lever 11 is movable (slidable) in the left-right direction. The forward/reverse-switch lever 11 is configured to be manipulated by the user. By manipulating (sliding) the forward/reverse-switch lever 11 such that it moves leftward, the motor 6 rotates in the forward-rotational direction. By manipulating (sliding) the forward/reverse-switch lever 11 such that it moves rightward, the motor 6 rotates in the reverse-rotational direction. By changing the rotational direction of the motor 6, the rotational direction of the spindle 81 changes.

The speed-change lever 12 is a speed-change-manipulation part (i.e. a representative, non-limiting example of a gear-shifting manipulation part according to the present description) that is configured to be manipulated to modify (change, switch) the speed mode (gear-shift stage) of the speed-reducing mechanism 30. The speed-change lever 12 is provided at (in, along) an upper portion of the motor-housing part 21. The speed-change lever 12 is provided upward of the casing 4. The speed-change lever 12 is configured to be manipulated (slid) by the user. The speed-change lever 12 is movable in the front-rear direction. The speed modes (gear-shift stages) of the speed-reducing mechanism 30 include a low-speed mode (speed “1”), a medium-speed mode (speed “2”), and a high-speed mode (speed “3”). That is, in the first embodiment, the number of gear-shift stages of the speed-reducing mechanism 30 is three. Consequently, the speed-reducing mechanism 30 of the first embodiment can be characterized as a three-stage, gear-shifting, speed-reducing mechanism.

The speed mode, in which the output part 8 is caused to rotate at a first rotational speed (low speed) in the state in which the rotor 62 is rotating at a constant rotational speed (given rotational speed), is called the low-speed mode. The speed mode, in which the output part 8 is caused to rotate at a second rotational speed (medium speed), which is higher than the first rotational speed, in the state in which the rotor 62 is rotating at the same constant rotational speed (i.e. the above-noted given rotational speed), is called the medium-speed mode. The speed mode, in which the output part 8 is caused to rotate at a third rotational speed (high speed), which is higher than the second rotational speed, in the state in which the rotor 62 is rotating at the same constant rotational speed (i.e. the above-noted given rotational speed), is called the high-speed mode. For example, in the low-speed mode, the speed-reducing mechanism 30 may be shiftable to a first gear-shift stage such that the output part 8 is rotated in a first rotational speed range (i.e. a speed range from 0 rpm to a lowest upper speed limit, e.g., 500 rpm). In the medium-speed mode, the speed-reducing mechanism 30 may be shiftable to a second gear-shift stage such that the output part 8 is rotated in a second (wider) rotational speed range (i.e. a speed range from 0 rpm to an intermediate upper speed limit, e.g., 1000 rpm). In the high-speed mode, the speed-reducing mechanism 30 may be shiftable to a third gear-shift stage such that the output part 8 is rotated in a third (even wider) rotational speed range (i.e. a speed range from 0 rpm to an highest upper speed limit, e.g., 1500 rpm). The movable range (path) of the speed-change lever 12 is defined in the front-rear direction. By manipulating (sliding) the speed-change lever 12 such that it moves to a front portion (front end) of the movable range, the speed mode of the speed-reducing mechanism 30 is set to the low-speed mode. By manipulating (sliding) the speed-change lever 12 such that it moves to an intermediate portion (intermediate position) of the movable range, the speed mode of the speed-reducing mechanism 30 is set to the medium-speed mode. By manipulating (sliding) the speed-change lever 12 such that it moves to a rear portion (rear end) of the movable range, the speed mode of the speed-reducing mechanism 30 is set to the high-speed mode.

The mode-change ring 13 is configured to be manipulated (rotated) to change the action mode of the hammer mechanism 40. The mode-change ring 13 is disposed forward of the casing 4. The mode-change ring 13 is rotatable. More specifically, the mode-change ring 13 is configured to be manipulated (manually rotated) by the user. The action modes of the hammer mechanism 40 include a hammer mode and a non-hammer mode. The action mode, in which the output part 8 is caused to hammer in the axial direction, is called the hammer mode. The action mode, in which the output part 8 is not caused to hammer in the axial direction, is called the non-hammer mode. By manipulating (rotating) the mode-change ring 13 such that it is disposed at a hammer-mode position in the rotational direction, the action mode of the hammer mechanism 40 is set to the hammer mode. By manipulating (rotating) the mode-change ring 13 such that it is disposed at a non-hammer-mode position in the rotational direction, the action mode of the hammer mechanism 40 is set to the non-hammer mode.

The interface panel 15 is provided on the battery-holding part 23. The interface panel 15 comprises a manipulation device 24 and a display device 25. The interface panel 15 has a sheet shape. The manipulation device 24 comprises a manipulatable button (e.g., a button switch). Illustrative examples of the display device 25 are: a segmented-display device, which comprises a plurality of light-emitting-device segments; a flat-panel display, such as a liquid-crystal display; and an indicator-type display device, on which a plurality of light-emitting diodes is disposed.

A panel opening 27 is formed in the battery-holding part 23. The panel opening 27 is formed in an upper surface of the battery-holding part 23 forward of the grip part 22. At least a portion of the interface panel 15 is disposed in the panel opening 27.

The manipulation device 24 is configured to be manipulated (pressed), e.g., by the user, to change the drive mode of the motor 6. The drive modes of the motor 6 include a drill mode and a screwdriving (rotation with clutch) mode. The drive mode in which, during the drive of the motor 6, the motor 6 is driven regardless of the amount of torque that is acting on the motor 6, is called the drill mode. The drive mode in which, during the drive of the motor 6, the motor 6 is stopped when the amount of torque that is acting on the motor 6 exceeds an upper torque limit (which in an electronic clutch system is proportional to an electric-current threshold), is called the screwdriving mode.

The dial 16 is manipulated (rotated) to change the drive condition (torque setting) of the motor 6. The dial 16 is disposed at a front portion of the battery-holding part 23. The dial 16 is supported on the battery-holding part 23 in a rotatable manner. The dial 16 is rotatable over 360° or more; i.e. the dial 16 is preferably endlessly rotatable. The dial 16 is configured to be manipulated (rotated) by the user. The drive conditions of the motor 6 include the above-mentioned upper torque limit, which is converted into the electric-current threshold that is used by the controller 16 to determine when to stop energizing the motor 6 (i.e. when a screw has been tightened to a predetermined upper torque limit that is set by rotating the dial 16). Thus, in effect, the dial 16 is manipulated to change the electric-current threshold in the screwdriving mode, which was set by pressing the manipulation device 24.

A dial opening 28 is formed in the battery-holding part 23. The dial opening 28 is formed in a central portion of a front portion of the battery-holding part 23. At least a portion of the dial 16 is disposed in the dial opening 28.

The controller 17 comprises a computer system, e.g., one or more microprocessors and associated electronics. The controller 17 outputs control instructions (drive current values) to control (energize) the motor 6 (i.e. control the rotational speed of the rotor shaft 63). At least a portion of the controller 17 is housed in a controller case 26. The controller 17 is held by (in) the controller case 26, and is thus housed in the battery-holding part 23. The controller 17 preferably comprises one or more circuit boards, on which a plurality of electronic parts is mounted. Illustrative examples of the electronic parts mounted on the circuit board include: at least one microprocessor, such as a CPU (central-processing unit); nonvolatile memory, such as ROM (read-only memory) and storage; volatile memory, such as RAM (random-access memory) and/or flash memory; transistors; capacitors; and resistors.

The controller 17 sets the drive conditions of the motor 6 (i.e. the upper torque limit to be applied to the screw, bolt, etc. that is being rotatably driven by the power tool 1) based on the manipulation (rotational position) of the dial 16. As described above, the drive conditions of the motor 6 include the electric-current threshold, which corresponds to the upper torque limit set by the user. In the screwdriving mode, the controller 17 sets the electric-current threshold based on the manipulation (rotational position) of the dial 16.

In addition, in the screwdriving mode, the controller 17 stops the motor 6 when the torque that acts on the motor 6 during the drive of the motor 6 exceeds a value that corresponds to the electric-current threshold set by the user.

In addition, the controller 17 displays the set drive condition (i.e. a value representative of the upper torque limit set by the user) of the motor 6 on the display device 25.

Motor and Power-Transmission Mechanism

Figure 5:
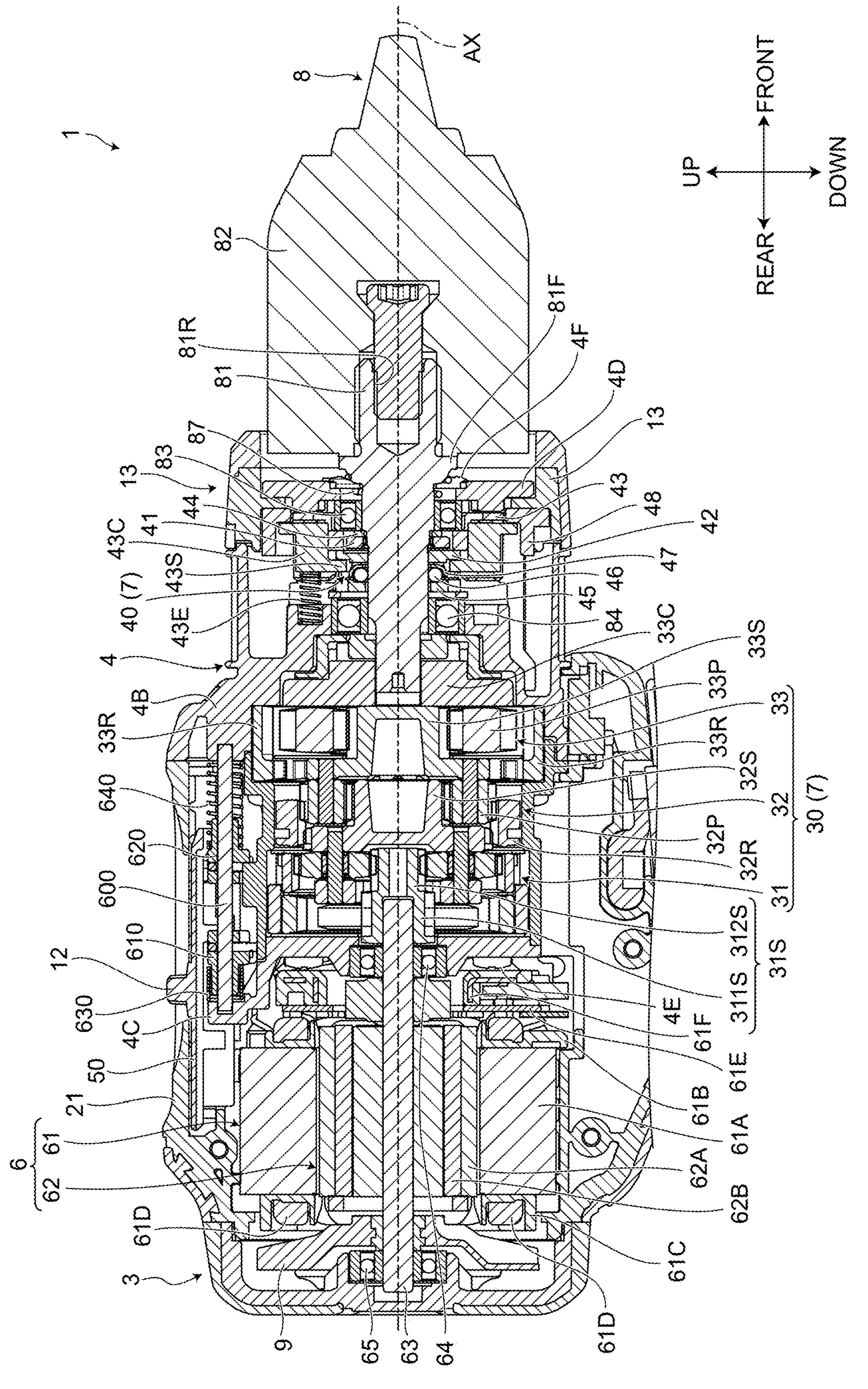
FIG. 5 is a cross-sectional view that shows a portion of the power tool according to the first embodiment.

FIG. 5 is a cross-sectional view that shows a portion of the power tool 1 according to the first embodiment. As shown in FIG. 5, the motor 6 comprises: the stator 61, which has a tubular shape; and the rotor 62, which is disposed in the interior of the stator 61. The rotor 62 comprises the rotor shaft 63, which extends in the axial direction.

The stator 61 comprises: a stator core 61A, which comprises a plurality of stacked (laminated) steel sheets; a front insulator 61B, which is disposed at a front portion of the stator core 61A; a rear insulator 61C, which is disposed at a rear portion of the stator core 61A; coils 61D, which are respectively wound around teeth disposed on the inner surface of the stator core 61A and over the front insulator 61B and the rear insulator 61C; a sensor circuit board 61E, which is mounted on the front insulator 61B; and a short-circuiting member (busbars) 61F, which is supported on the front insulator 61B. The sensor circuit board 61E comprises rotation-detection devices, which detect the rotation of the rotor 62. The short-circuiting member 61F electrically connects respective pairs of the coils 61D via fusing terminals; i.e. the busbars of the short-circuiting member 61F are respectively connected to pairs of diametrically-opposed coils 61D. The short-circuiting member 61F is electrically connected to the controller 17 via lead lines.

The rotor 62 rotates about rotational axis AX. The rotor 62 comprises: the rotor shaft 63; a rotor core 62A, which is disposed around the rotor shaft 63; and permanent magnets 62B, which are held on or in the rotor core 62A. The rotor core 62A has a circular-tube shape. The rotor core 62A comprises a plurality of laminated (stacked) steel sheets. The rotor core 62A has through holes, which extend in the axial direction. The through holes are arranged (disposed) in (around) the circumferential direction of the rotor core 62A. The permanent magnets 62B are respectively disposed in the through holes of the rotor core 62A.

The rotation-detection devices of the sensor circuit board 61E detect the rotation (rotational position) of the rotor 62 by detecting the magnetic fields of the permanent magnets 62B that spatially vary relative to the rotation-detection devices as the rotor 62 rotates. The controller 17 supplies drive currents to the respective coils 61D based on detection data from the rotation-detection devices and the amount that the trigger 10 is being pulled.

The rotor shaft 63 rotates about rotational axis AX. Rotational axis AX of the rotor shaft 63 coincides with the rotational axis of the output part 8. A front portion of the rotor shaft 63 is supported by a front bearing 64 in a rotatable manner. A rear portion of the rotor shaft 63 is supported by a rear bearing 65 in a rotatable manner. The front bearing 64 is held by the bracket plate 4C, which is disposed forward of the stator 61. The rear bearing 65 is held by the rear cover 3. A front-end portion of the rotor shaft 63 is disposed forward of the front bearing 64. The front-end portion of the rotor shaft 63 is disposed in (extends into) the interior space of the casing 4.

A pinion gear 31S is provided at (on) the front-end portion of the rotor shaft 63. The pinion gear 31S functions as the sun gear of the first planetary-gear mechanism 31. The pinion gear 31S is rotated by the motor 6. The pinion gear 31S includes a large-diameter portion 311S and a small-diameter portion 312S, which is disposed forward of the large-diameter portion 311S. The rotor shaft 63 is operably coupled to the first planetary-gear mechanism 31 of the speed-reducing mechanism 30 via the pinion gear 31S.

Figure 6:
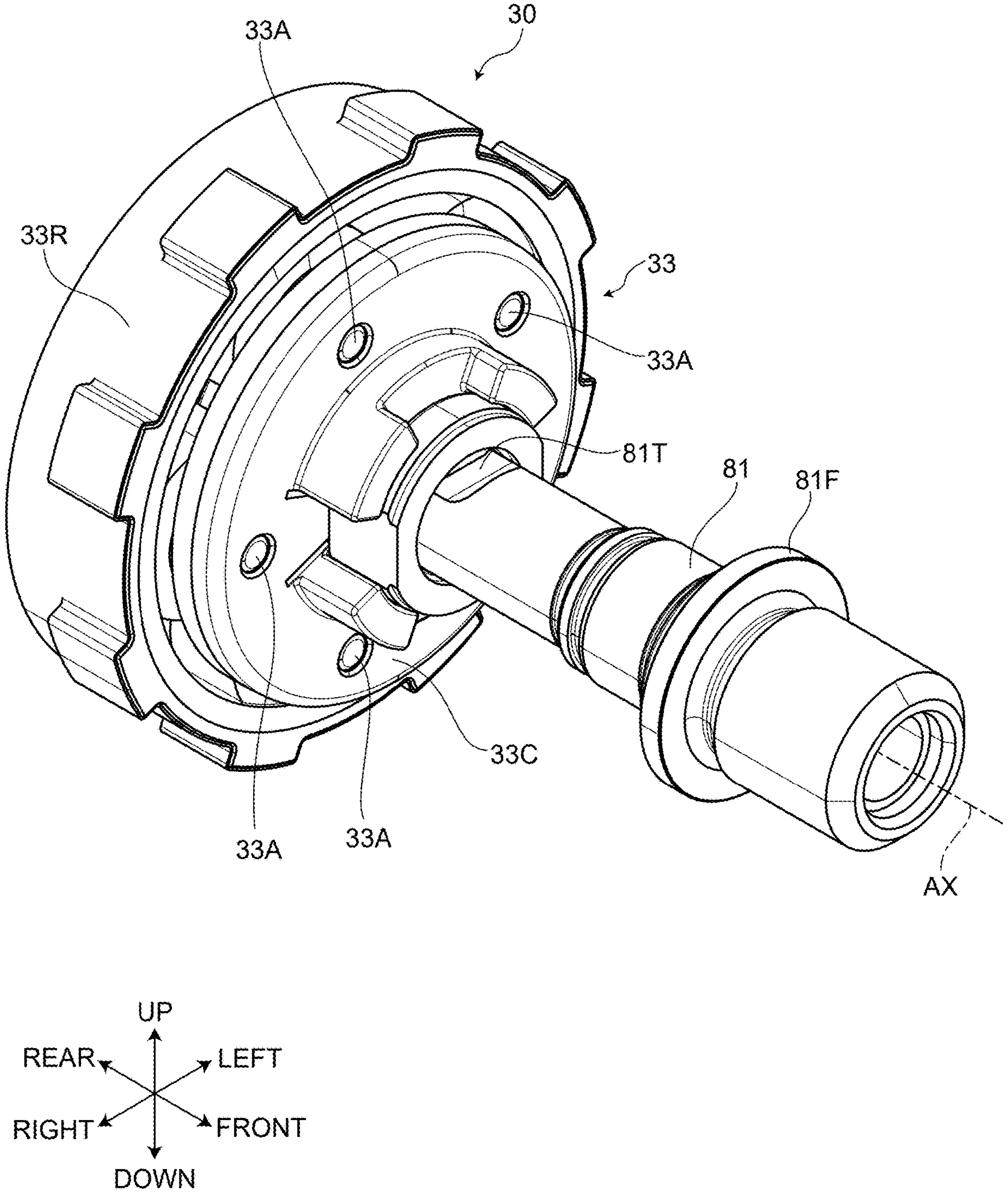
FIG. 6 is an oblique view, viewed from the right front, that shows a portion of a speed-reducing mechanism according to the first embodiment.

FIG. 6 is an oblique view, viewed from the right front, that shows a portion of the speed-reducing mechanism 30 according to the embodiment. The spindle 81 is coupled to a third carrier 33C. In the first embodiment, a pair of flat surfaces 81T is formed on an outer-circumferential surface of the spindle 81 (only one flat surface 81T is shown in FIG. 6). The flat surfaces 81T are (extend) parallel to rotational axis AX. The flat surfaces 81T face in (diametrically) opposite directions. The third carrier 33C is disposed around the spindle 81. An inner-circumferential surface of the third carrier 33C includes support surfaces, which respectively contact the pair of flat surfaces 81T. Relative rotation between the third carrier 33C and the spindle 81 is blocked (prevented, constrained) by the flat surfaces 81T. Thus, when the third carrier 33C rotates, the spindle 81 rotates together with the third carrier 33C.

Referring back to FIG. 5, the spindle 81 is supported by a front bearing 83 and a rear bearing 84 in a rotatable manner. In the state in which the spindle 81 is supported by the front bearing 83 and the rear bearing 84, the spindle 81 is movable in the front-rear direction (to enable axial hammering action of the spindle 81 by the hammer mechanism 40).

Referring now to FIGS. 5 and 6 together, the spindle 81 has a flange portion 81F. A coil spring 87 is disposed between the flange portion 81F and the front bearing 83. The flange portion 81F contacts a front-end portion of the coil spring 87. The coil spring 87 generates an elastic force that urges (biases) the spindle 81 in the forward direction.

The chuck 82 is configured (designed) to hold the tool accessory. The chuck 82 is coupled to a front portion of the spindle 81. A screw hole 81R is provided at a front-end portion of the spindle 81. When the spindle 81 rotates, the chuck 82 rotates therewith. The chuck 82 is rotatable in the state in which the chuck 82 holds the tool accessory so that work can be performed by the rotating tool accessory.

The first cam 41 and the second cam 42 of the hammer mechanism 40 are both disposed in the interior of the second casing 4B. In the front-rear direction, both the first cam 41 and the second cam 42 are disposed between the front bearing 83 and the rear bearing 84.

The first cam 41 has a ring shape. The first cam 41 is disposed around the spindle 81. The first cam 41 is fixed to the spindle 81, such that the first cam 41 rotates together with the spindle 81. A cam gear is provided on a rear surface of the first cam 41. The first cam 41 is supported (held) by a stop ring 44. The stop ring 44 is disposed around the spindle 81. In the front-rear direction, the stop ring 44 is disposed between the first cam 41 and the front bearing 83.

The second cam 42 also has a ring shape. The second cam 42 is disposed rearward of the first cam 41. The second cam 42 is disposed around the spindle 81. The second cam 42 is rotatable relative to the spindle 81. A cam gear is provided on a front surface of the second cam 42. The cam gear on the front surface of the second cam 42 meshes with the cam gear on the rear surface of the first cam 41. A tab is provided on a rear surface of the second cam 42.

In the front-rear direction, a support ring 45 is disposed between the second cam 42 and the rear bearing 84. The support ring 45 is disposed in the interior of the second casing 4B. The support ring 45 is fixed to the second casing 4B. A plurality of steel balls 46 is disposed on a front surface of the support ring 45. A washer 47 is disposed between the steel balls 46 and the second cam 42. The second cam 42 is rotatable in the state in which forward-rearward movement thereof is restricted (limited, bounded) to (within) a space defined by the support ring 45 and the washer 47.

The hammer-switching ring 43 is switchable from the hammer mode to the non-hammer mode and vice versa by manually rotating it. The mode-change ring 13 is coupled to the hammer-switching ring 43 via a cam ring 48. The mode-change ring 13 and the cam ring 48 are integrally rotatable; i.e. they rotate together. The hammer-switching ring 43 holds a switching cam 43C so that it is movable in the front-rear direction. The hammer-switching ring 43 is inserted into a guide hole that is provided in the second casing 4B. Rotation of the hammer-switching ring 43 is constrained by the guide hole provided in the second casing 4B. The switching cam 43C is biased forward by a spring 43E that is held by (in) the second casing 4B. When the user manipulates (manually rotates) the mode-change ring 13, the switching cam 43C is pushed by the mode-change ring 13 and moves rearward. When the user manipulates (manually rotates) the mode-change ring 13 in an opposite direction, the switching cam 43C is pushed by the spring 43E and returns to its forward position. When the switching cam 43C moves in the front-rear direction between an advanced (forward) position and a retracted (rearward) position, the action mode correspondingly changes between the hammer mode and the non-hammer mode. Thus, manual rotation of the mode-change ring 13 causes the action mode to change from the hammer mode to the non-hammer mode and vice versa.

The hammer mode includes the state in which rotation of the second cam 42 is blocked (prevented, constrained). The non-hammer mode includes the state in which rotation of the second cam 42 is permitted. The rotation of the second cam 42 is blocked when the switching cam 43C has been moved to the advanced (forward) position. The rotation of the second cam 42 is permitted when the switching cam 43C has been moved to the retracted (rearward) position.

In the hammer mode, at least a portion of the switching cam 43C, which has been moved to the advanced position, contacts the second cam 42. The rotation of the second cam 42 is blocked (prevented, constrained) owing to the contact between the switching cam 43C and the second cam 42. When the motor 6 is driven in the state in which rotation of the second cam 42 is blocked, the first cam 41, which is fixed to the spindle 81, rotates while making contact with the cam gear of the second cam 42. Thereby, the spindle 81 rotates while being hammered in the front-rear (axial) direction.

In the non-hammer mode, the switching cam 43C, which has been moved to the retracted position, is spaced apart from the second cam 42. Rotation of the second cam 42 is permitted owing to the switching cam 43C and the second cam 42 being spaced apart (i.e. in a non-contacting state). When the motor 6 is driven in the state in which rotation of the second cam 42 is permitted, the second cam 42 rotates together with the first cam 41 and the spindle 81. Thereby, the spindle 81 rotates without being hammered in the front-rear (axial) direction.

The hammer-switching ring 43 is disposed around the first cam 41 and the second cam 42. In addition, the switching cam 43C comprises an opposing portion 43S, which opposes the rear surface of the second cam 42. The opposing portion 43S protrudes radially inward from a rear portion of the switching cam 43C.

When the mode-change ring 13 is manipulated (manually rotated) and the switching cam 43C is thereby moved to the advanced (forward) position, the tab on the rear surface of the second cam 42 and the opposing portion 43S of the switching cam 43C contact each other. Thereby, rotation of the second cam 42 is blocked (prevented, constrained). Thus, the hammer mechanism 40 is switched to the hammer mode because the switching cam 43C has been moved to the advanced position.

On the other hand, when the mode-change ring 13 is manipulated (manually rotated in the opposite direction) and the switching cam 43C has been moved to the retracted position, the opposing portion 43S of the switching cam 43C is spaced apart from the second cam 42. Thereby, rotation of the second cam 42 is permitted. Thus, when the mode-change ring 13 is manually rotated and the switching cam 43C is thereby moved to the retracted position, the hammer mechanism 40 is switched to the non-hammer mode.

Figure 7:
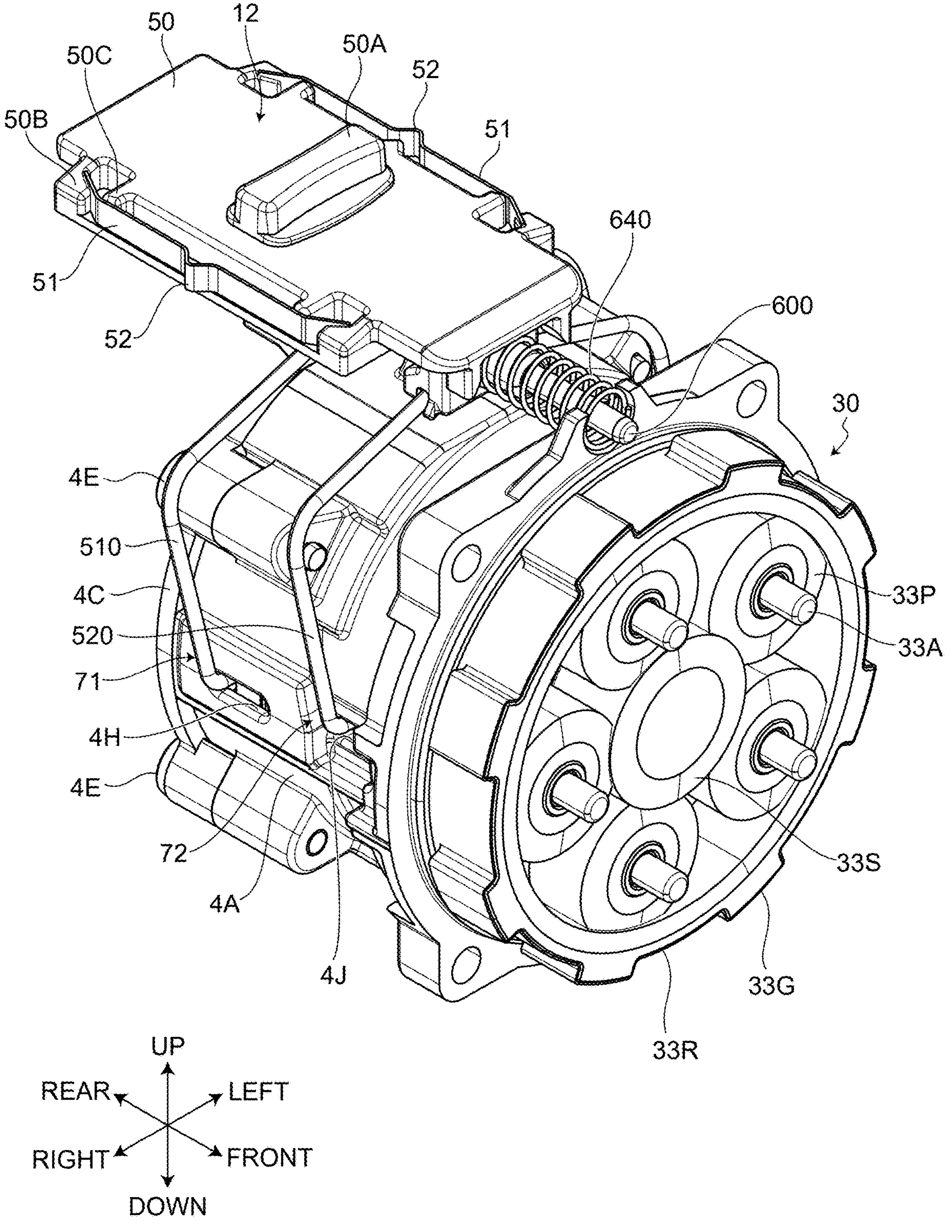
FIG. 7 is an oblique view, viewed from the right front, that shows a portion of the power tool according to the first embodiment.
Figure 8:
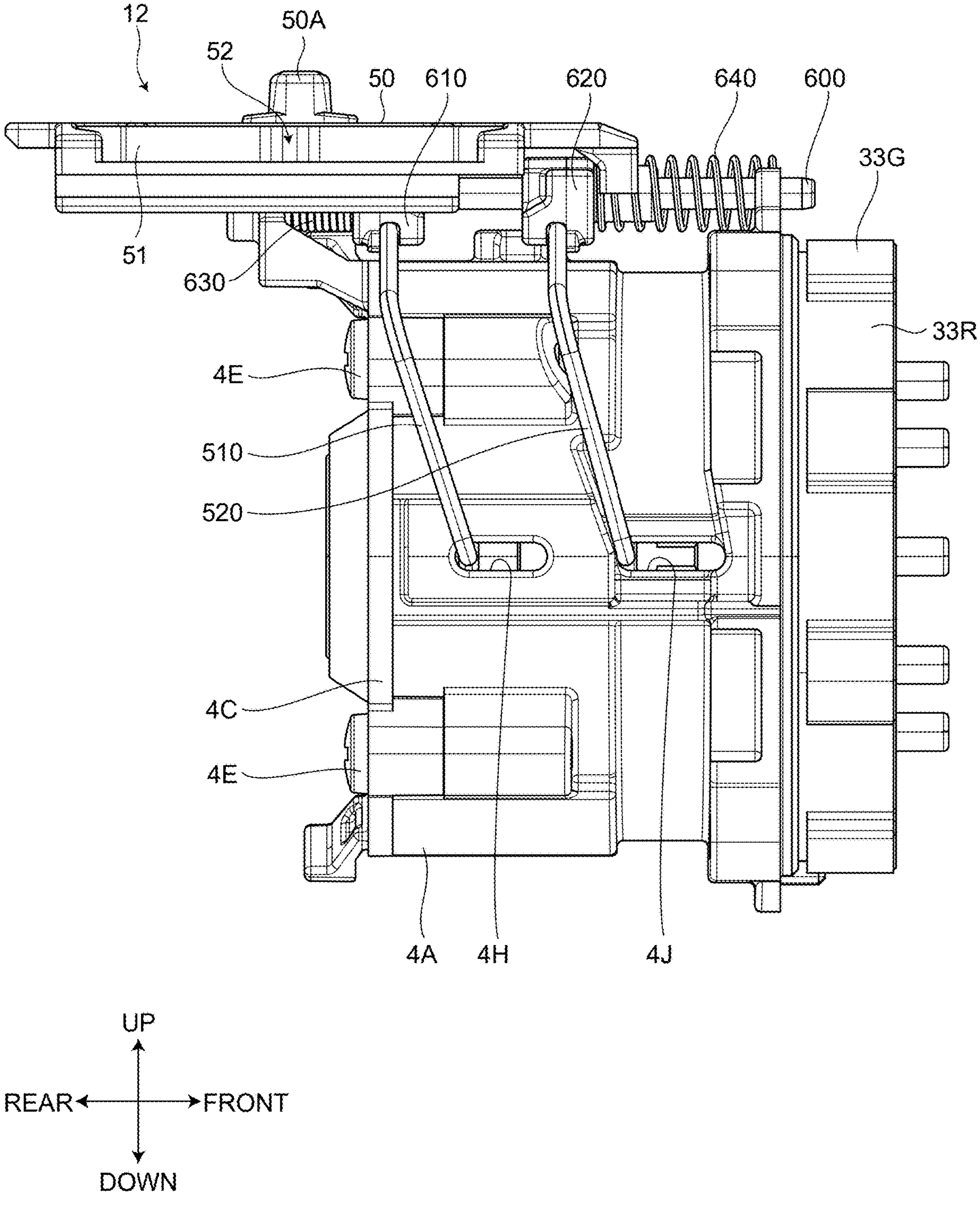
FIG. 8 is a side view that shows a portion of the power tool according to the first embodiment.
Figure 9:
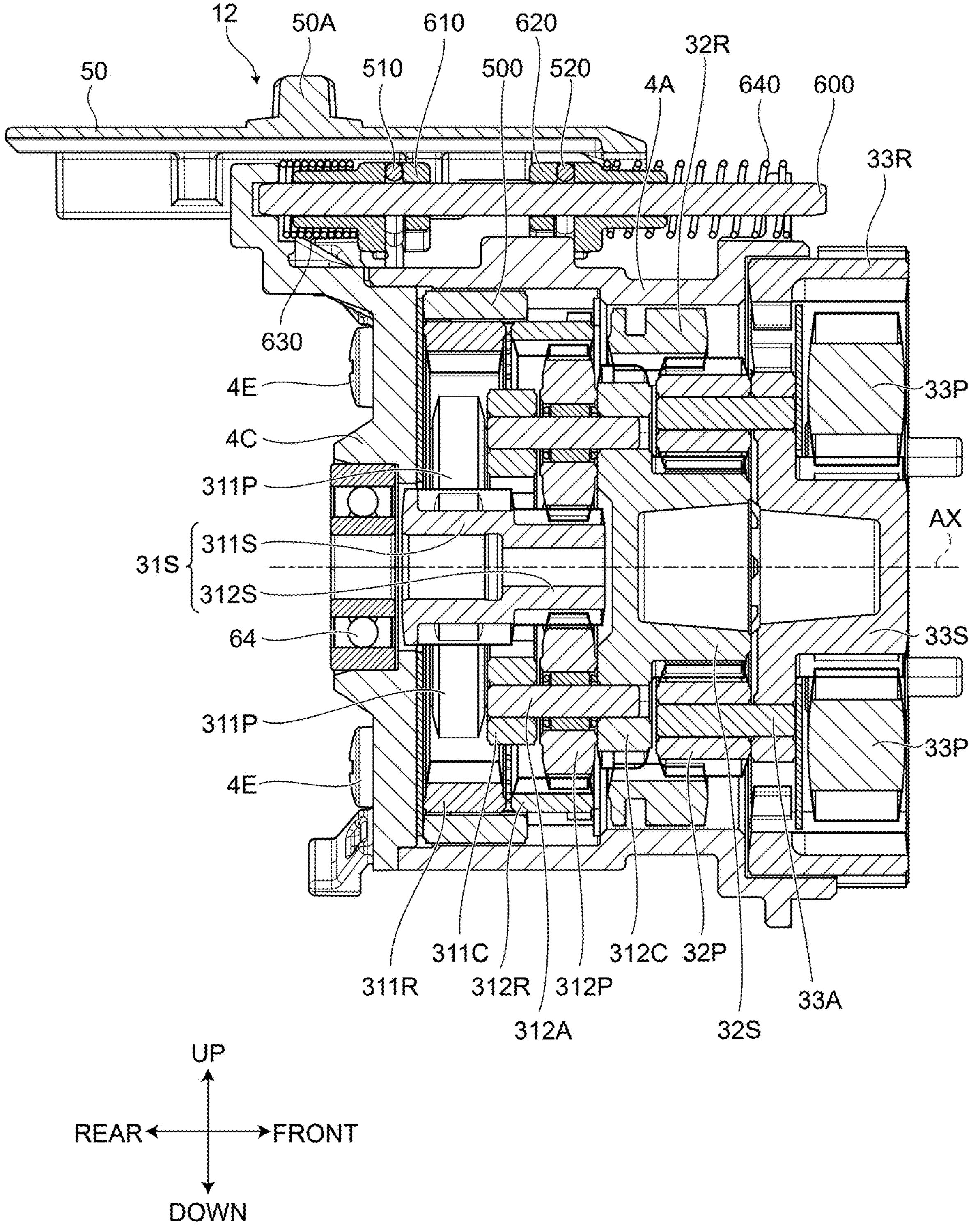
FIG. 9 is a cross-sectional view that shows a portion of the power tool according to the first embodiment.
Figure 10:
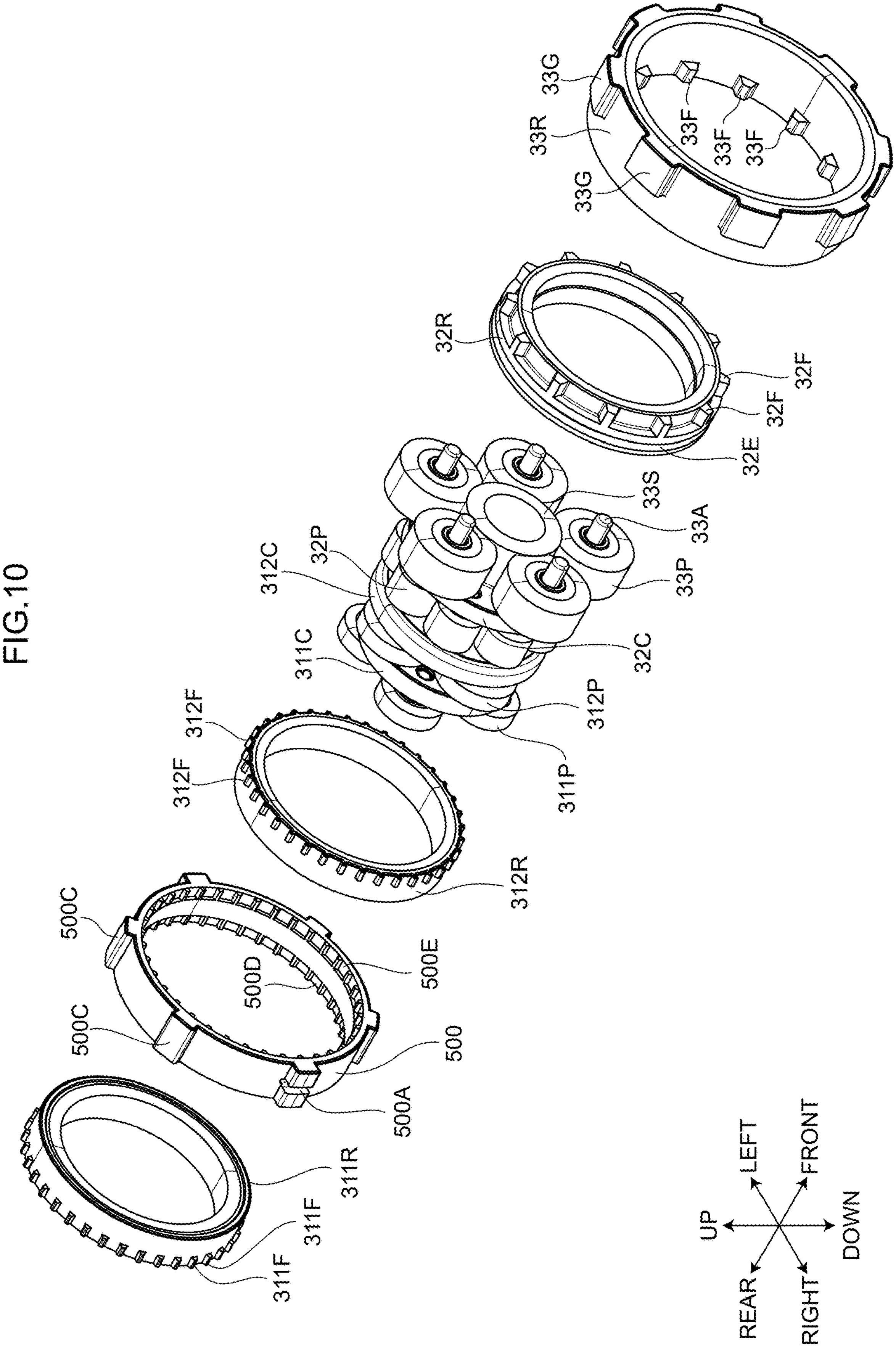
FIG. 10 is an exploded, oblique view that shows the speed-reducing mechanism according to the first embodiment.
Figure 11:
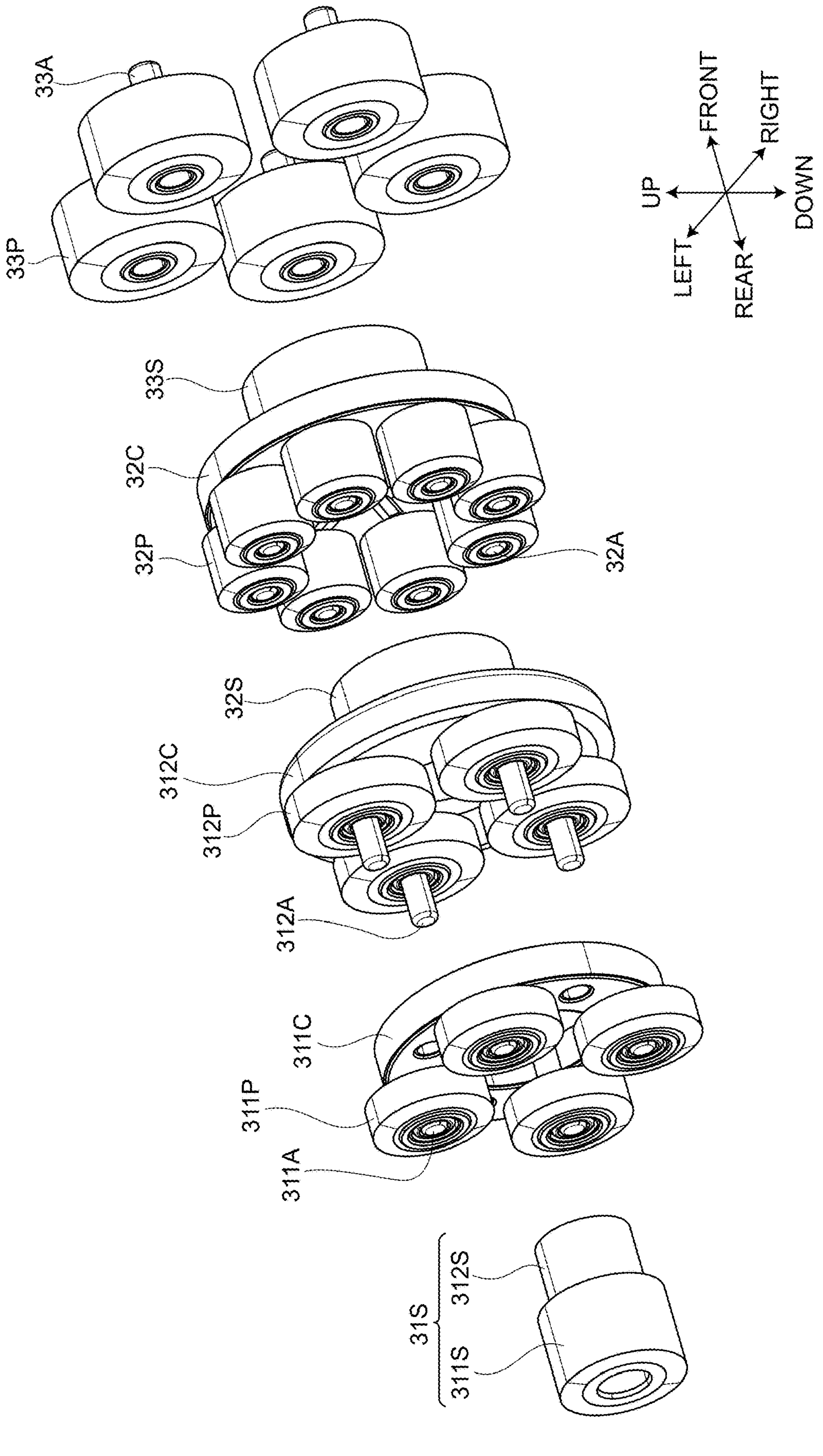
FIG. 11 is an oblique view, viewed from the right rear, that shows a portion of the speed-reducing mechanism according to the first embodiment.

FIG. 7 is an oblique view, viewed from the right front, that shows a portion of the power tool 1 according to the first embodiment. FIG. 8 is a side view that shows a portion of the power tool 1 according to the first embodiment. FIG. 9 is a cross-sectional view that shows a portion of the power tool 1 according to the first embodiment. FIG. 10 is an exploded, oblique view, viewed from the right front, that shows the speed-reducing mechanism 30 according to the first embodiment. FIG. 11 is an oblique view, viewed from the right rear, that shows a portion of the speed-reducing mechanism 30 according to the first embodiment. It is noted that, in the drawings, illustration of the teeth of gears that mesh with each other is omitted for the sake of simplification of the drawings.

As can be seen in FIGS. 10-11, the first planetary-gear mechanism 31 comprises: planet gears 311P; planet gears 312P, which are disposed forward of the planet gears 311P; a first-stage carrier 311C, which supports both the plurality of planet gears 311P and the plurality of planet gears 312P; a second-stage carrier 312C, which supports the plurality of planet gears 312P; an internal gear 311R, which is disposed around the plurality of planet gears 311P; and an internal gear 312R, which is disposed around the plurality of planet gears 312P. As shown in FIG. 5, the pinion gear 31S is provided at a front-end portion of the rotor shaft 63. The pinion gear 31S functions as the sun gear of the first planetary-gear mechanism 31. The pinion gear 31S is disposed forward of the stator 61. The pinion gear 31S is rotated by the rotor 62. The pinion gear 31S may be rotated directly or indirectly by the rotor 62.

The planet gears 311P are disposed around the large-diameter portion 311S of the pinion gear 31S. The planet gears 312P are disposed around the small-diameter portion 312S of the pinion gear 31S.

The second planetary-gear mechanism 32 comprises: a sun gear 32S; planet gears 32P, which are disposed around the sun gear 32S; a second carrier 32C, which supports the plurality of planet gears 32P; and an internal gear 32R, which is disposed around the plurality of planet gears 32P. The sun gear 32S is disposed forward of the internal gear 311R and the internal gear 312R. The sun gear 32S may be rotated directly or indirectly by the planet gears 311P and the planet gears 312P. The planet gears 32P mesh with the sun gear 32S. The internal gear 32R meshes with the planet gears 32P.

The third planetary-gear mechanism 33 comprises: a sun gear 33S; planet gears 33P, which are disposed around the sun gear 33S; the third carrier 33C, which supports the plurality of planet gears 33P; and an internal gear 33R, which is disposed around the plurality of planet gears 33P.

As can be seen, e.g., in FIG. 5, the casing 4 is disposed forward of the stator 61. The casing 4, or more specifically the first casing 4A and the second casing 4B (see also, FIGS. 4 and 9), houses the pinion gear 31S, the planet gears 311P, the planet gears 312P, the internal gear 311R, the internal gear 312R, the sun gear 32S, and the planet gears 32P. The spindle 81 is disposed forward of the internal gear 32R.

Referring again to FIGS. 10-11, the planet gears 311P are respectively supported on first pins 311A in a rotatable manner. The first pins 311A are supported on the first-stage carrier 311C. The first pins 311A protrude rearward from a rear surface of the first-stage carrier 311C. The first pins 311A are arranged spaced apart in the circumferential direction. In the first embodiment, four first pins 311A are disposed equispaced in the circumferential direction. The (e.g., four) planet gears 311P are respectively supported on the (e.g., four) first pins 311A. The planet gears 311P are disposed rearward of the first-stage carrier 311C. The first-stage carrier 311C supports the (four) planet gears 311P in a rotatable manner via the respective (four) first pins 311A.

The planet gears 312P are respectively supported on second pins 312A in a rotatable manner. The second pins 312A are supported on both the first-stage carrier 311C and the second-stage carrier 312C. The first-stage carrier 311C is disposed rearward of the second-stage carrier 312C. A rear-end portion of each of the second pins 312A is supported on the first-stage carrier 311C. A front-end portion of each of the second pins 312A is supported on the second-stage carrier 312C. The second pins 312A are arranged spaced apart in the circumferential direction. In the first embodiment, four second pins 312A are disposed equispaced in the circumferential direction. In the circumferential direction, the locations of the first pins 311A and the locations of the second pins 312A differ from each other. In the circumferential direction, the second pins 312A are respectively disposed between each pair of adjacent first pins 311A. The (e.g., four) planet gears 312P are respectively supported on the (e.g., four) second pins 312A. In the front-rear direction (axial direction), the planet gears 312P are disposed between the first-stage carrier 311C and the second-stage carrier 312C. Both the first-stage carrier 311C and the second-stage carrier 312C support the planet gears 312P in a rotatable manner via the second pins 312A. External gear teeth project radially outward from an outer circumferential surface of the second-stage carrier 312C.

The internal gear 311R is disposed around the plurality of planet gears 311P. The internal gear 312R is disposed around the plurality of planet gears 312P. The outer diameter of the planet gears 311P is smaller than the outer diameter of the planet gears 312P. That is, a first circumscribed circle around the radially outermost edges of the planet gears 311P has a smaller diameter than a second circumscribed circle around the radially outermost edges of the planet gears 312P.

The sun gear 32S is disposed forward of the second-stage carrier 312C. The diameter of the sun gear 32S is smaller than the diameter of the second-stage carrier 312C. The second-stage carrier 312C and the sun gear 32S are integral with each other; i.e. they constitute a monolithic structure with no seam therebetween. Therefore, the second-stage carrier 312C and the sun gear 32S rotate together. Pins 32A are provided on the second carrier 32C. The planet gears 32P are respectively supported on the pins 32A in a rotatable manner. The second carrier 32C supports the planet gears 32P in a rotatable manner via the respective pins 32A.

The sun gear 33S is disposed forward of the second carrier 32C. The diameter of the sun gear 33S is smaller than the diameter of the second carrier 32C. The second carrier 32C and the sun gear 33S are integral with each other; i.e. they are a monolithic structure with no seam therebetween. Therefore, the second carrier 32C and the sun gear 33S rotate together. Pins 33A are provided on the third carrier 33C. The planet gears 33P are respectively supported on the pins 33A in a rotatable manner. The third carrier 33C supports the planet gears 33P in a rotatable manner via the respective pins 33A.

Figure 12:
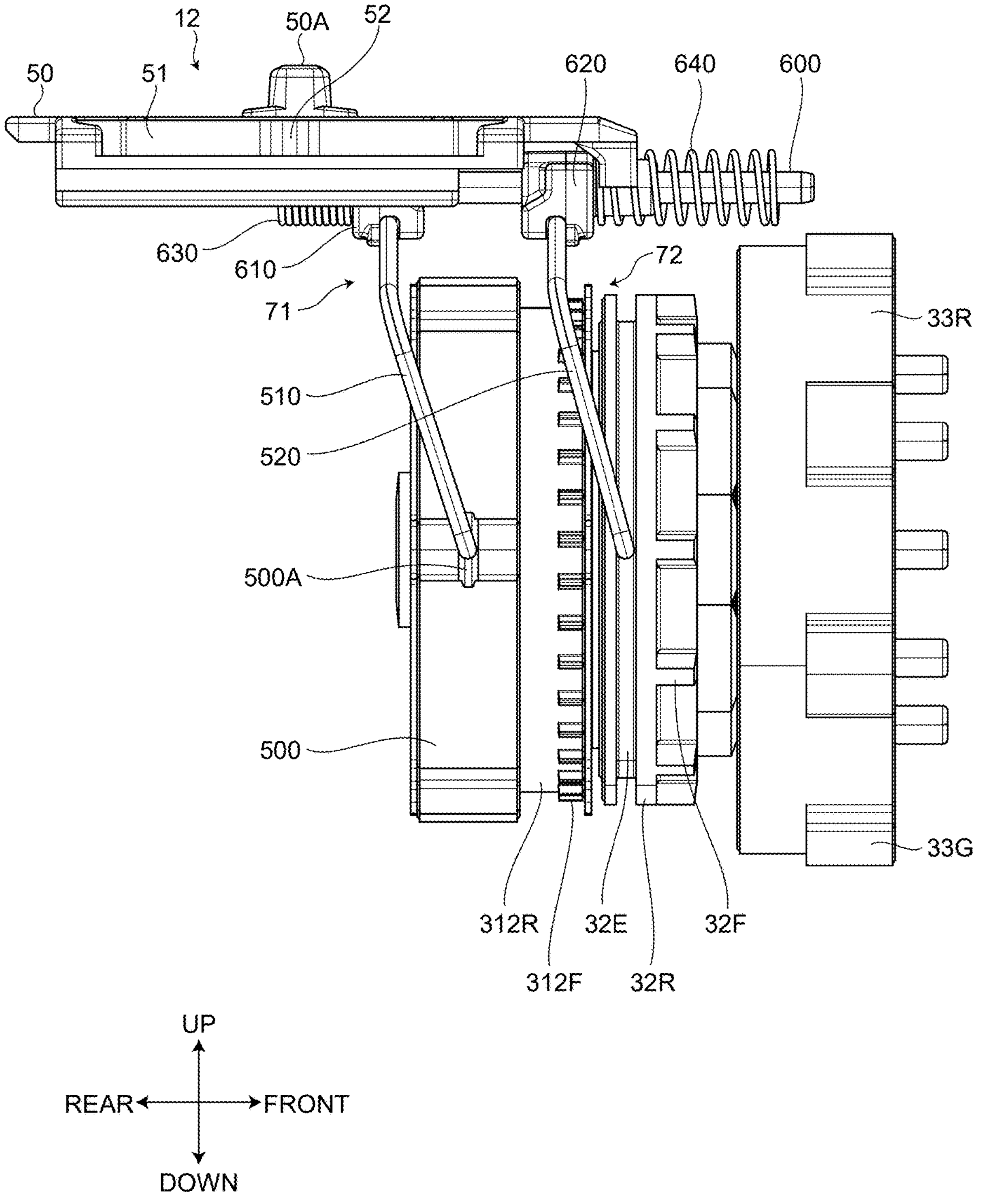
FIG. 12 is a side view that shows a first speed-change mechanism and a second speed-change mechanism according to the first embodiment.
Figure 13:
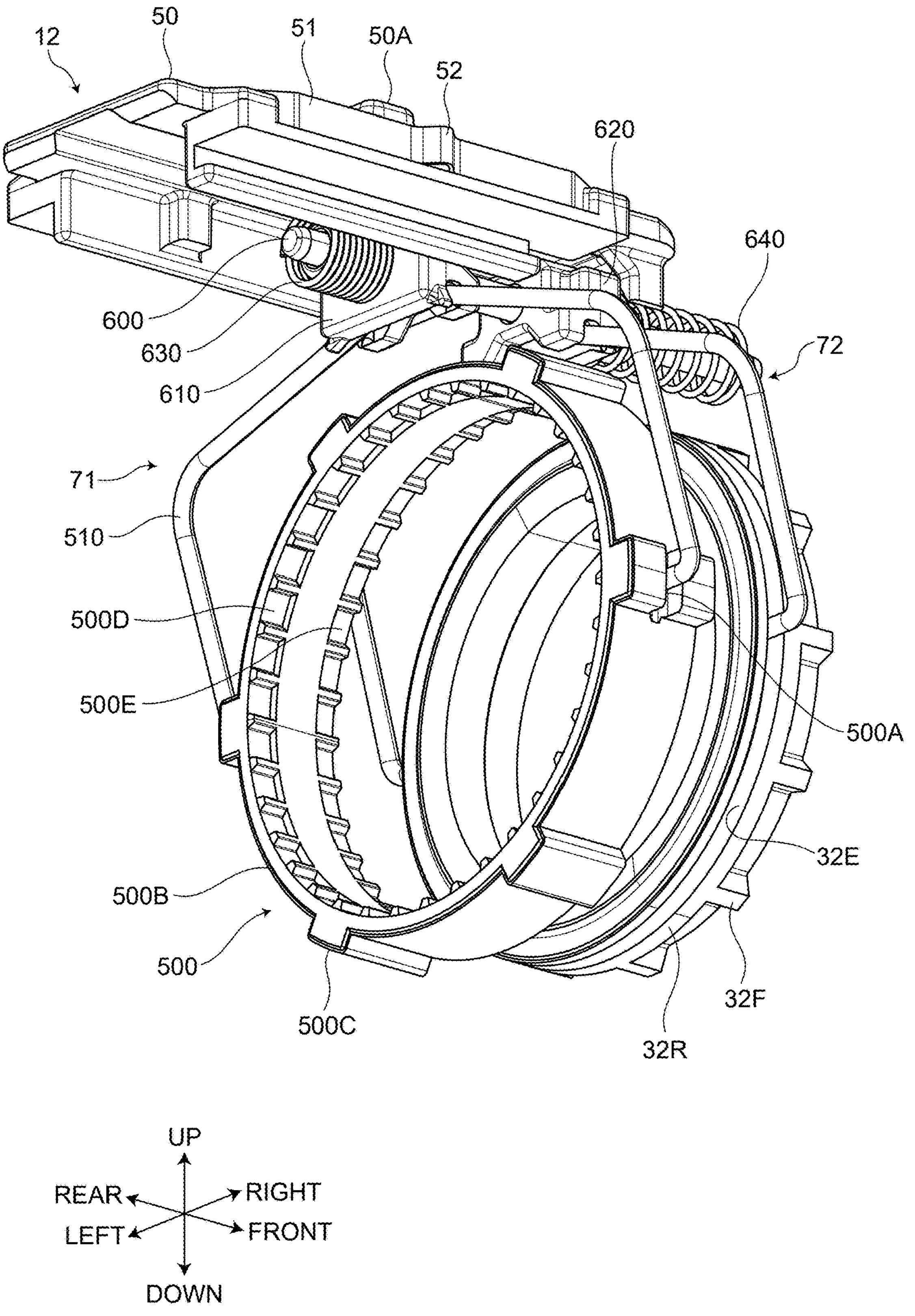
FIG. 13 is an oblique view, viewed from the lower-left rear, that shows the first speed-change mechanism and the second speed-change mechanism according to the first embodiment.

FIG. 12 is a side view that shows a first speed-change mechanism 71 and a second speed-change mechanism 72 according to the first embodiment. FIG. 13 is an oblique view, viewed from the lower-right rear, that shows the first speed-change mechanism 71 and the second speed-change mechanism 72 according to the first embodiment. The speed-reducing mechanism 30 comprises the first speed-change mechanism 71 and the second speed-change mechanism 72.

The first speed-change mechanism 71 is switchable between: a first speed-reducing mode, in which rotation of the internal gear 312R of the first planetary-gear mechanism 31 is blocked (prohibited) and rotation of the internal gear 311R is permitted (not blocked); and a second speed-reducing mode, in which rotation of the internal gear 311R of the first planetary-gear mechanism 31 is blocked (prohibited) and rotation of the internal gear 312R is permitted (not blocked).

The first speed-change mechanism 71 comprises a switching ring 500, a first switching wire 510, a first movable member 610, and a first spring 630.

The switching ring 500 comprises a ring portion 500B and protruding portions 500C, which are fixed to (e.g., integral or monolithic with) the ring portion 500B. The protruding portions 500C are respectively disposed in guide grooves, which are provided (defined) in the inner-circumferential surface of the first casing 4A. The guide grooves provided in the inner-circumferential surface of the first casing 4A extend in the front-rear direction, e.g., in parallel to rotational axis AX. Therefore, by disposing (inserting) the protruding portions 500C in (into) the respective guide grooves of the first casing 4A, rotation of the switching ring 500 relative to the first casing 4A is blocked or prevented. However, the switching ring 500 is movable in the front-rear direction in the interior of the first casing 4A. More specifically, the switching ring 500 can move in the front-rear direction under guidance of the protruding portions 500C sliding in the respective guide grooves provided in the inner-circumferential surface of the first casing 4A. As can be seen in FIG. 9, the switching ring 500 is disposed around at least one of the internal gear 311R and the internal gear 312R.

Referring to FIGS. 9 and 12 together, the switching ring 500 is coupled (connected) to the first switching wire 510. As was explained above, the switching ring 500 is movable in the front-rear direction in the interior of the first casing 4A. Therefore, by moving the switching ring 500 forward (i.e. by manually sliding the speed-change lever 12 toward the front of the power tool 1), the first speed-change mechanism 71 is switched to the above-described first speed-reducing mode; on the other hand, by moving the switching ring 500 rearward (i.e. by manually sliding the speed-change lever 12 toward the rear of the power tool 1), the first speed-change mechanism 71 is switched to the above-described second speed-reducing mode.

The (first) speed-reduction ratio of a rear-stage portion (first-stage portion) of the first planetary-gear mechanism 31, which comprises the planet gears 311P and the internal gear 311R, and the (second) speed-reduction ratio of a front-stage portion (second-stage portion) of the first planetary-gear mechanism 31, which comprises the planet gears 312P and the internal gear 312R, differ. Preferably, the (second) speed-reduction ratio of the front-stage portion, which comprises the planet gears 312P and the internal gear 312R, is larger than the (first) speed-reduction ratio of the rear-stage portion, which comprises the planet gears 311P and the internal gear 311R. In such a preferred embodiment, while the pinion gear 31S is rotating at a constant (given) rotational speed, the rotational speed of the second-stage carrier 312C in the first speed-reducing mode is slower than the rotational speed of the second-stage carrier 312C in the second speed-reducing mode.

For example, the (first) speed-reduction ratio of the rear-stage portion (first-stage portion) of the first planetary-gear mechanism 31 is 1:4.000, and the (second) speed-reduction ratio of the front-end portion (second-stage portion) is 1:5.429. In addition, the speed-reduction ratio of the second planetary-gear mechanism 32 and the speed-reduction ratio of the third planetary-gear mechanism 33 are smaller than the (first) speed-reduction ratio of the rear-stage portion (first-stage portion) of the first planetary-gear mechanism 31. Preferably, the speed-reduction ratio of the second planetary-gear mechanism 32 is smaller than the speed-reduction ratio of the third planetary-gear mechanism 33. For example, the speed-reduction ratio of the second planetary-gear mechanism 32 is 1:2.857, and the speed-reduction ratio of the third planetary-gear mechanism 33 is 1:3.684.

Referring to FIG. 9, a portion of the first switching wire 510 is disposed on an outer side of the first casing 4A. The first switching wire 510 is movable in the front-rear direction on the outer side of the first casing 4A. As can be seen in FIGS. 12-13, a tip portion of the first switching wire 510 is inserted into a groove 500A, which is provided on the outer circumferential surface of the switching ring 500. As shown in FIGS. 7-8, a through hole 4H is provided in the first casing 4A. The tip portion of the first switching wire 510 is disposed in the interior of the first casing 4A via the through hole 4H. The tip portion of the first switching wire 510 is inserted into the groove 500A in the interior of the first casing 4A. An upper portion of the first switching wire 510 is fixed to the first movable member 610. The first movable member 610 is connected to the speed-change lever 12. The first movable member 610 is guided in the front-rear direction by a guide rod 600. The guide rod 600 is disposed so as to extend in the front-rear direction. The guide rod 600 is fixed to the casing 4. As shown in FIG. 9, a rear-end portion of the guide rod 600 is fixed to the bracket plate 4C. As shown in FIG. 5, a front-end portion of the guide rod 600 is fixed to (in) the second casing 4B. A first guide hole, which extends in the front-rear direction, is formed in the first movable member 610. The guide rod 600 passes through the first guide hole of the first movable member 610. The first spring 630 is a compression spring. A rear-end portion of the first spring 630 is supported on the bracket plate 4C. A front-end portion of the first spring 630 is connected to the first movable member 610. The first spring 630 generates an elastic force that urges the first movable member 610 to move forward. The first spring 630 biases the switching ring 500 forward via the first movable member 610 and the first switching wire 510.

As shown in FIG. 10, a plurality of cam teeth 311F is provided on an outer-circumferential surface of the internal gear 311R. A plurality of cam teeth 312F is provided on an outer-circumferential surface of the internal gear 312R. Cam grooves 500D and cam grooves 500E are provided on an inner-circumferential surface of the switching ring 500. The cam grooves 500D are formed at a rear-end portion of the switching ring 500 and engage with the cam teeth 311F of the internal gear 311R. The cam grooves 500E are formed at a front-end portion of the switching ring 500 and engage with the cam teeth 312F of the internal gear 312R. The switching ring 500 is movable to a first (rearward) position at which the cam grooves 500D respectively engage with the cam teeth 311F of the internal gear 311R, and a second (forward) position at which the cam grooves 500E respectively engage with the cam teeth 312F of the internal gear 312R.

The switching ring 500 is connected to the speed-change lever 12 via the first switching wire 510 and the first movable member 610. When the speed-change lever 12 is manipulated (manually slid) in the front-rear direction, the first movable member 610 is pushed by the speed-change lever 12 and thereby moves in the front-rear direction. By manually moving the speed-change lever 12 in the front-rear direction, the first movable member 610 and the first switching wire 510 move in the front-rear direction, whereby the switching ring 500 also moves in the front-rear direction.

When the first movable member 610, the first switching wire 510, and the switching ring 500 move forward and the switching ring 500 is disposed around the internal gear 312R, the cam grooves 500E and the cam teeth 312F respectively engage with each other. Thereby, rotation of the internal gear 312R is blocked (prevented, constrained). That is, by moving the first movable member 610, the first switching wire 510, and the switching ring 500 forward and blocking rotation of the internal gear 312R, the first planetary-gear mechanism 31 is placed into the above-described first speed-reducing mode.

On the other hand, when the first movable member 610, the first switching wire 510, and the switching ring 500 move rearward and the switching ring 500 is disposed around the internal gear 311R, the cam grooves 500D and the cam teeth 311F respectively engage with each other. Thereby, rotation of the internal gear 311R is blocked (prevented, constrained). That is, by moving the first movable member 610, the first switching wire 510, and the switching ring 500 rearward and blocking rotation of the internal gear 311R, the first planetary-gear mechanism 31 is placed into the above-described second speed-reducing mode.

The first movable member 610 is capable of switching the internal gear 311R and the internal gear 312R between a rotationally fixed state and a rotatable state relative to the first casing 4A.

The second speed-change mechanism 72 is switchable between: an enabled mode, in which the speed-reducing function of the second planetary-gear mechanism 32 is enabled; and a disabled mode, in which the speed-reducing function of the second planetary-gear mechanism 32 is disabled. Setting the second planetary-gear mechanism 32 to the enabled mode includes blocking (preventing, constraining) rotation of the internal gear 32R. Setting the second planetary-gear mechanism 32 to the disabled mode includes permitting rotation of the internal gear 32R. By blocking (preventing, constraining) rotation of the internal gear 32R, the second planetary-gear mechanism 32 is placed into the enabled mode. By permitting rotation of the internal gear 32R, the second planetary-gear mechanism 32 is placed into the disabled mode.

Referring again to FIGS. 12-13, the second speed-change mechanism 72 comprises: a second switching wire 520, which is coupled to the internal gear 32R; cam teeth 33F, which are provided on the internal gear 33R; a second movable member 620; and a second spring 640. The second movable member 620 is capable of switching the internal gear 32R between a rotationally fixed state and a rotatable state relative to the first casing 4A.

Referring to FIG. 9, a portion of the second switching wire 520 is disposed on the outer side of the first casing 4A. The second switching wire 520 is movable in the front-rear direction on the outer side of the first casing 4A. As can be seen in FIGS. 12-13, a tip portion of the second switching wire 520 is inserted into a groove 32E, which is provided on the internal gear 32R. As shown in FIGS. 7-8, a through hole 4J is provided in the first casing 4A. The tip portion of the second switching wire 520 is disposed in the interior of the first casing 4A via the through hole 4J. The tip portion of the second switching wire 520 is inserted into the groove 32E in the interior of the first casing 4A. An upper portion of the second switching wire 520 is fixed to the second movable member 620. The second movable member 620 is connected to the speed-change lever 12. The second movable member 620 is disposed forward of the first movable member 610. The second movable member 620 is guided in the front-rear direction by the guide rod 600. As shown in FIG. 5, a second guide hole, which extends in the front-rear direction, is formed in the second movable member 620. The guide rod 600 passes through the second guide hole of the second movable member 620. The second spring 640 is a compression spring. A front-end portion of the second spring 640 is supported on the second casing 4B. A rear-end portion of the second spring 640 is connected to the second movable member 620. The second spring 640 generates an elastic force that urges the second movable member 620 to move rearward. The second spring 640 biases the internal gear 32R rearward via the second movable member 620 and the second switching wire 520.

As shown in FIG. 10, a plurality of cam teeth 32F is provided on the outer-circumferential surface of the internal gear 32R. The cam teeth 32F can mesh with the cam teeth 33F of the internal gear 33R. By inserting the internal gear 32R into the interior of the internal gear 33R, rotation of the internal gear 32R is blocked (prevented, constrained) by the cam teeth 33F of the internal gear 33R.

The internal gear 33R is disposed forward of the internal gear 32R. The internal gear 33R is fixed to the second casing 4B. Cam teeth 33G are provided on the outer-circumferential surface of the internal gear 33R. The cam teeth 33G are respectively inserted into recessed portions (recess) provided on (in) the inner-circumferential surface of the second casing 4B. By inserting the cam teeth 33G into the respective recessed portions provided on the inner-circumferential surface of the second casing 4B, relative movement between the internal gear 33R and the second casing 4B is constrained (prevented).

When the speed-change lever 12 is manipulated (manually slid) in the front-rear direction, the second movable member 620 also moves in the front-rear direction. By manually moving the speed-change lever 12 in the front-rear direction, the second movable member 620 and the second switching wire 520 move in the front-rear direction, and the internal gear 32R moves in the front-rear direction. By moving the internal gear 32R in the front-rear direction, the internal gear 32R is switched from the state in which the internal gear 32R is inserted into the internal gear 33R to the state in which the internal gear 32R is removed from the internal gear 33R and vice versa.

By moving the second movable member 620, the second switching wire 520, and the internal gear 32R forward, inserting at least a portion of the internal gear 32R into the interior of the internal gear 33R, and meshing the cam teeth 33F of the internal gear 33R and the cam teeth 32F of the internal gear 32R with each other, rotation of the internal gear 32R is blocked (prevented, constrained). That is, by moving the second movable member 620, the second switching wire 520, and the internal gear 32R forward and blocking rotation of the internal gear 32R, the second planetary-gear mechanism 32 is placed into the above-described enabled mode.

On the other hand, by moving the second movable member 620, the second switching wire 520, and the internal gear 32R rearward, removing the internal gear 32R from the interior of the internal gear 33R, and separating the cam teeth 33F of the internal gear 33R and the cam teeth 32F of the internal gear 32R from each other, rotation of the internal gear 32R is permitted. That is, by moving the second movable member 620, the second switching wire 520, and the internal gear 32R rearward and permitting rotation of the internal gear 32R, the second planetary-gear mechanism 32 is placed into the above-described disabled mode.

When the second planetary-gear mechanism 32 is in the enabled mode, the internal gear 32R meshes only with the planet gears 32P. When the second planetary-gear mechanism 32 is in the disabled mode, the internal gear 32R meshes with both the planet gears 32P and the external gear teeth on the outer-circumferential portion of the second-stage carrier 312C.

Figure 14:
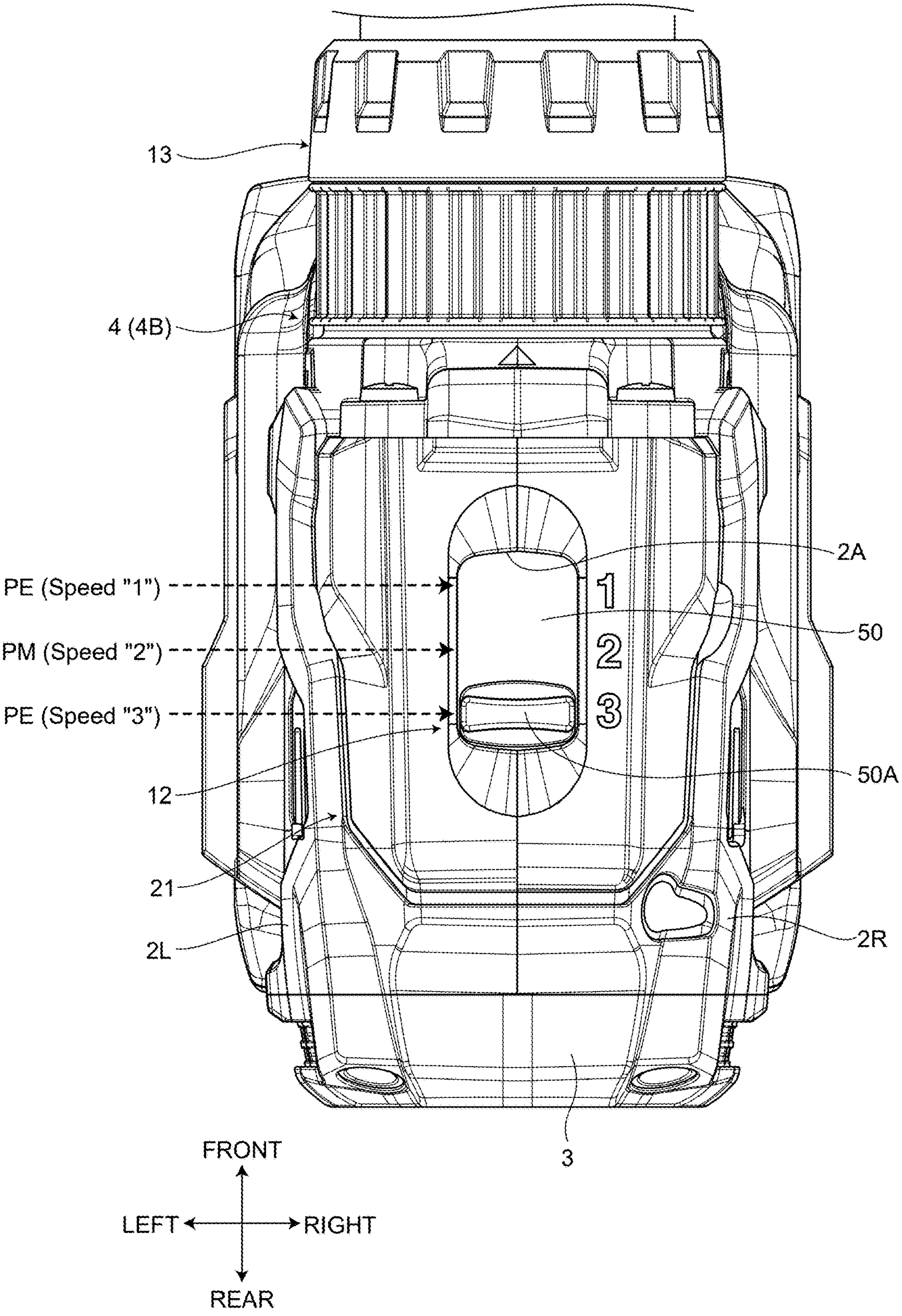
FIG. 14 is a drawing, viewed from above, of a power tool in the state in which the speed-reducing mechanism according to the first embodiment has been set to a high-speed mode (speed "3").
Figure 15:
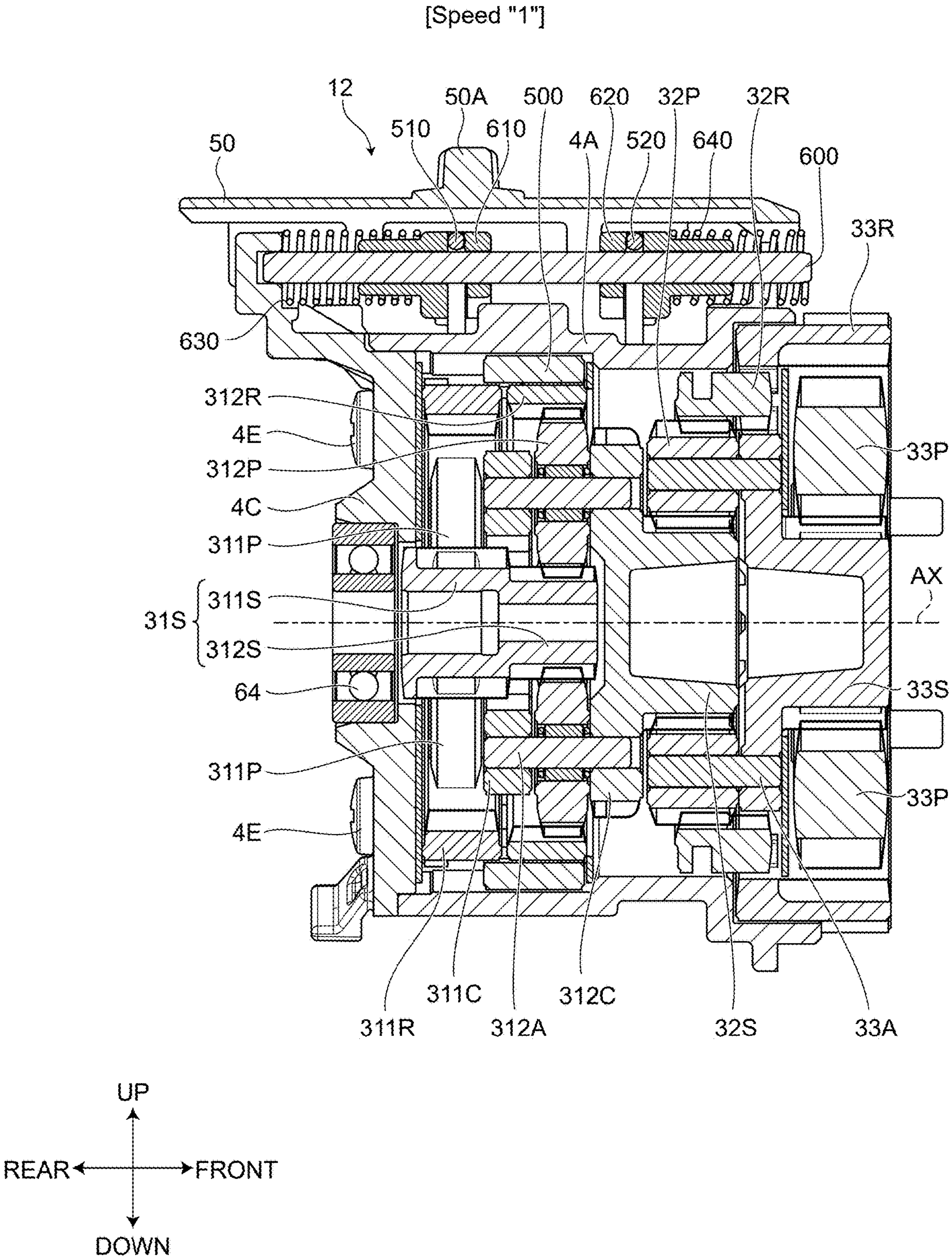
FIG. 15 is a cross-sectional view that shows the speed-reducing mechanism according to the first embodiment in the state in which the speed-reducing mechanism has been set to a low-speed mode (speed "1").
Figure 16:
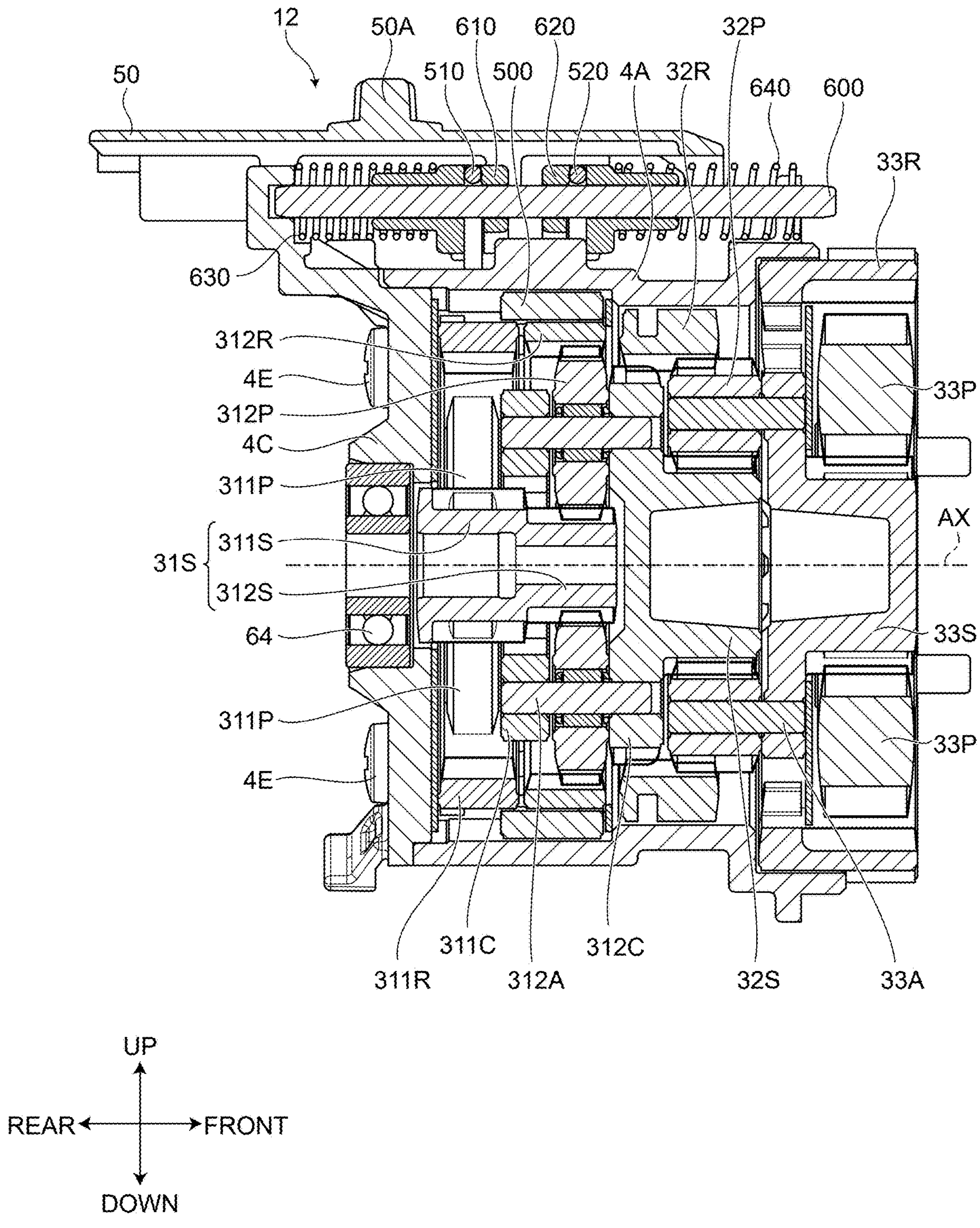
FIG. 16 is a cross-sectional view that shows the speed-reducing mechanism according to the first embodiment in the state in which the speed-reducing mechanism has been set to a medium-speed mode (speed "2").
Figure 17:
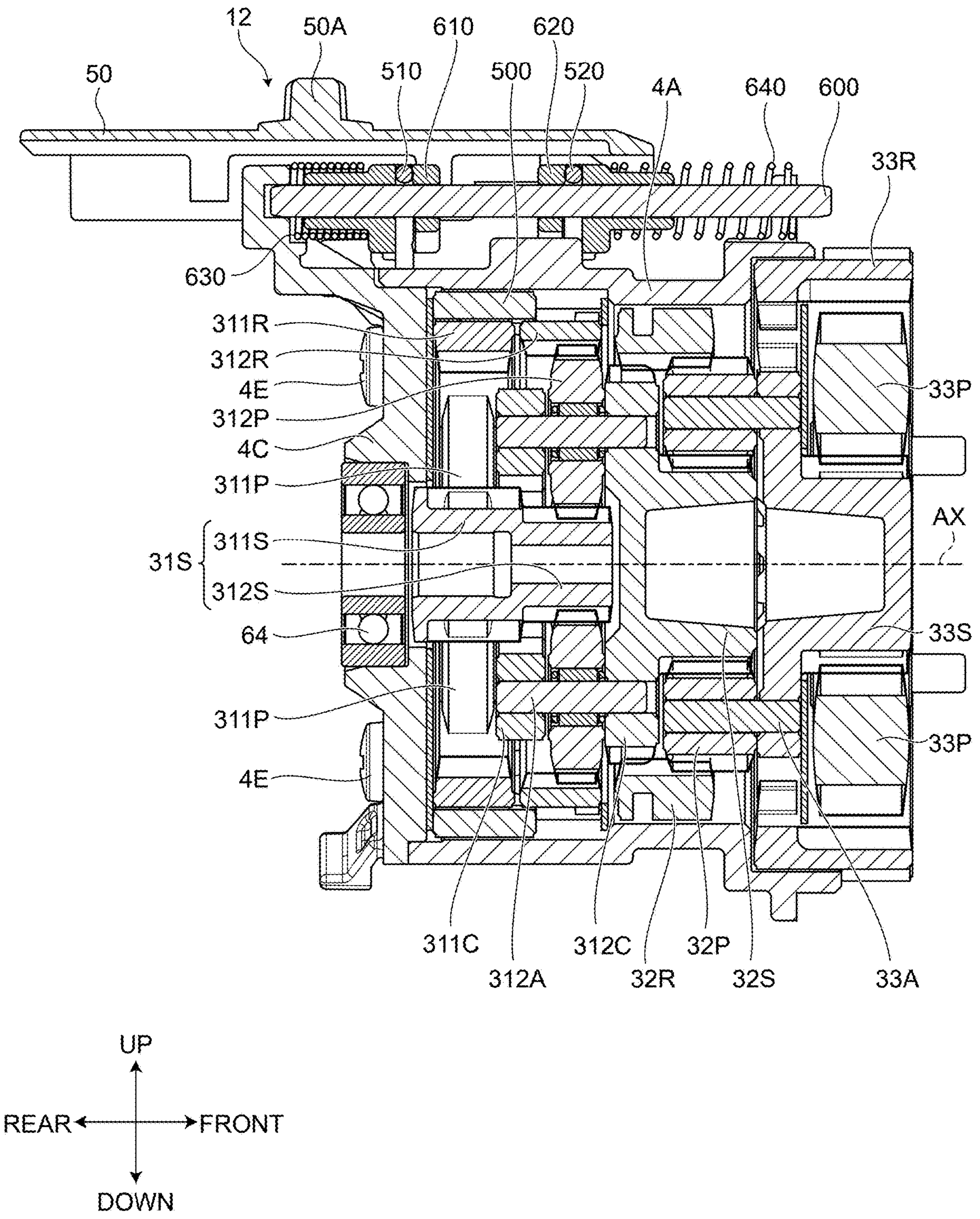
FIG. 17 is a cross-sectional view that shows the speed-reducing mechanism according to the first embodiment in the state in which the speed-reducing mechanism has been set to the high-speed mode (speed "3").

FIG. 14 is a drawing, viewed from above, of the power tool 1 when the speed-reducing mechanism 30 according to the first embodiment has been set to the high-speed mode (speed "3"). FIG. 15 is a cross-sectional view that shows the speed-reducing mechanism 30 according to the first embodiment when the speed-reducing mechanism 30 has been set to the low-speed mode (speed "1"). FIG. 16 is a cross-sectional view that shows the speed-reducing mechanism 30 according to the first embodiment when the speed-reducing mechanism 30 has been set to the medium-speed mode (speed "2"). FIG. 17 is a cross-sectional view that shows the speed-reducing mechanism 30 according to the first embodiment when the speed-reducing mechanism 30 has been set to the high-speed mode (speed "3").

As described above, in the first embodiment, the speed modes of the speed-reducing mechanism 30 include the low-speed mode (speed "1"), the medium-speed mode (speed "2"), and the high-speed mode (speed "3"). The speed modes of the speed-reducing mechanism 30 are switchable (changeable) in response to the manipulation (manual sliding) of the speed-change lever 12.

The movable range of the speed-change lever 12 is defined in the front-rear direction. The movable range has a straight-line shape along the front-rear direction. The movable range extends alongside (in parallel to) rotational axis AX. In the first embodiment, the movable range is defined by inner-perimetric edges (peripheral sides) of an opening 2A formed in the housing 2. The opening 2A is formed in an upper portion of the housing 2. The opening 2A exposes an upper surface of the speed-change lever 12. A knob part (tab, ridge) 50A, which protrudes upward, is formed on the upper surface of the speed-change lever 12. The knob part 50A protrudes through the opening 2A above the upper surface of the housing 2. A base portion of the knob part 50A of the speed-change lever 12 is configured to contact the inner-perimetric edges of the opening 2A. The front end of the movable range is the position at which the knob part 50A contacts the opening 2A on the forward-side, inner-perimetric edge. The rear end of the movable range is the position at which the knob part 50A contacts the opening 2A on the rearward-side, inner-perimetric edge.

The speed-change lever 12 is movable (slidable) within the movable range, which includes three or more speed positions that respectively correspond to the three gear-shift stages of the speed-reducing mechanism 30. In the embodiment, the speed-reducing mechanism 30 is a three-stage, gear-shifting mechanism, and therefore three speed positions are defined within the movable range. The three speed positions are the positions at which the speed-reducing mechanism 30 placed into the speed "1" (low speed) mode, the speed "2" (medium speed) mode, and the speed "3" (high speed) mode, respectively. The speed position for speed "1" is defined at a front-end portion of the movable range. The speed position for speed "2" is defined at an intermediate position of the movable range. The speed position for speed "3" is defined at a rear-end portion of the movable range. Accordingly, the speed position for speed "1" and the speed position for speed "3" are end-portion speed positions PE at each of the respective ends of the movable range. The speed position for speed "2" is an intermediate speed position PM, which is located between the end-portion speed positions PE.

By manipulating the speed-change lever 12 such that it moves (is slid) to the speed position (speed "1"), the speed mode of the speed-reducing mechanism 30 is set to the low-speed mode (speed "1"). By manipulating the speed-change lever 12 such that it moves to the speed position (speed "2"), the speed mode of the speed-reducing mechanism 30 is set to the medium-speed mode (speed "2"). By manipulating the speed-change lever 12 such that it moves to the speed position (speed "3"), the speed mode of the speed-reducing mechanism 30 is set to the high-speed mode (speed "3").

As was noted above, when the speed-change lever 12 is manipulated (manually slid) by the user, the first movable member 610 moves in the front-rear direction. The first movable member 610 moves in the front-rear direction while being guided by (along) the guide rod 600. Furthermore, when the speed-change lever 12 is manipulated (manually slid) by the user, the second movable member 620 also moves in the front-rear direction. The second movable member 620 moves in the front-rear direction while being guided by (along) the guide rod 600. The first spring 630 generates an elastic force that urges the first movable member 610 to move forward. The second spring 640 generates an elastic force that urges the second movable member 620 to move rearward.

As shown in FIG. 14, to set the speed-reducing mechanism 30 to the low-speed mode (speed "1"), the user manipulates (slides) the speed-change lever 12 so that the speed-change lever 12 is moved to the speed position (speed "1") at the forward-end portion of the movable range against the elastic force (biasing force) of the second spring 640. By moving the speed-change lever 12 forward, the second movable member 620 is moved forward against the elastic force of the second spring 640. As shown in FIG. 15, by moving the second movable member 620 forward to the front portion of the movable range of the second movable member 620, the first planetary-gear mechanism 31 is set to the first speed-reducing mode, in which rotation of the internal gear 312R is blocked and rotation of the internal gear 311R is permitted, and the second planetary-gear mechanism 32 is set to the enabled mode, in which rotation of the internal gear 32R of the second planetary-gear mechanism 32 is blocked.

In the low-speed mode, the first planetary-gear mechanism 31 is set to the first speed-reducing mode and the second planetary-gear mechanism 32 is set to the enabled mode. That is, in the low-speed mode (speed "1"), the front-stage portion (second-stage portion) of the first planetary-gear mechanism 31, the second planetary-gear mechanism 32, and the third planetary-gear mechanism 33 are used (enabled).

In FIG. 14, to set the speed-reducing mechanism 30 to the medium-speed mode (speed "2"), the user manipulates (slides) the speed-change lever 12 so that the speed-change lever 12 is moved to the speed position (speed "2") located at least approximately in the middle (an intermediate position) of the movable range. The speed-change lever 12 and the second movable member 620 are biased rearward from the forward side toward the intermediate position by the elastic force of the second spring 640. The speed-change lever 12 and the first movable member 610 are biased forward from the rearward side toward the intermediate position by the elastic force of the first spring 630. As shown in FIG. 16, by moving the first movable member 610 forward to the front portion of the movable range of the first movable member 610, and by moving the second movable member 620 rearward to the rear portion of the movable range of the second movable member 620, the first planetary-gear mechanism 31 is set to the first speed-reducing mode, in which rotation of the internal gear 312R is blocked and rotation of the internal gear 311R is permitted, and the second planetary-gear mechanism 32 is set to the disabled mode, in which rotation of the internal gear 32R of the second planetary-gear mechanism 32 is permitted.

In the medium-speed mode, the first planetary-gear mechanism 31 is set to the first speed-reducing mode and the second planetary-gear mechanism 32 is set to the disabled mode. That is, in the medium-speed mode (speed "2"), the front-stage portion (second-stage portion) of the first planetary-gear mechanism 31 and the third planetary-gear mechanism 33 are used (enabled).

In FIG. 14, to the speed-reducing mechanism 30 to the high-speed mode (speed "3"), the user manipulates (slides) the speed-change lever 12 so that the speed-change lever 12 is moved to the speed position (speed "3") at a rearward-end portion of the movable range against the elastic force (biasing force) of the first spring 630. As shown in FIG. 17, by moving the speed-change lever 12 rearward, the first movable member 610 moves rearward against the elastic force of the first spring 630. By moving the first movable member 610 rearward to the rearward portion of the movable range of the first movable member 610, the first planetary-gear mechanism 31 is set to the second speed-reducing mode, in which rotation of the internal gear 311R is blocked and rotation of the internal gear 312R is permitted, and the second planetary-gear mechanism 32 is set to the disabled mode, in which rotation of the internal gear 32R is permitted.

In the high-speed mode, the first planetary-gear mechanism 31 is set to the second speed-reducing mode and the second planetary-gear mechanism 32 is set to the disabled mode. That is, in the high-speed mode (speed "3"), the rear-stage portion (first-stage portion) of the first planetary-gear mechanism 31 and the third planetary-gear mechanism 33 are used (enabled).

The power tool 1 is configured such that, when the speed-change lever 12 is disposed in (moved to) the respective speed positions, the speed-change lever 12 is latched and positioned at the particular speed position. The structure for latching and positioning the speed-change lever 12 at each speed position is described below.

Figure 18:
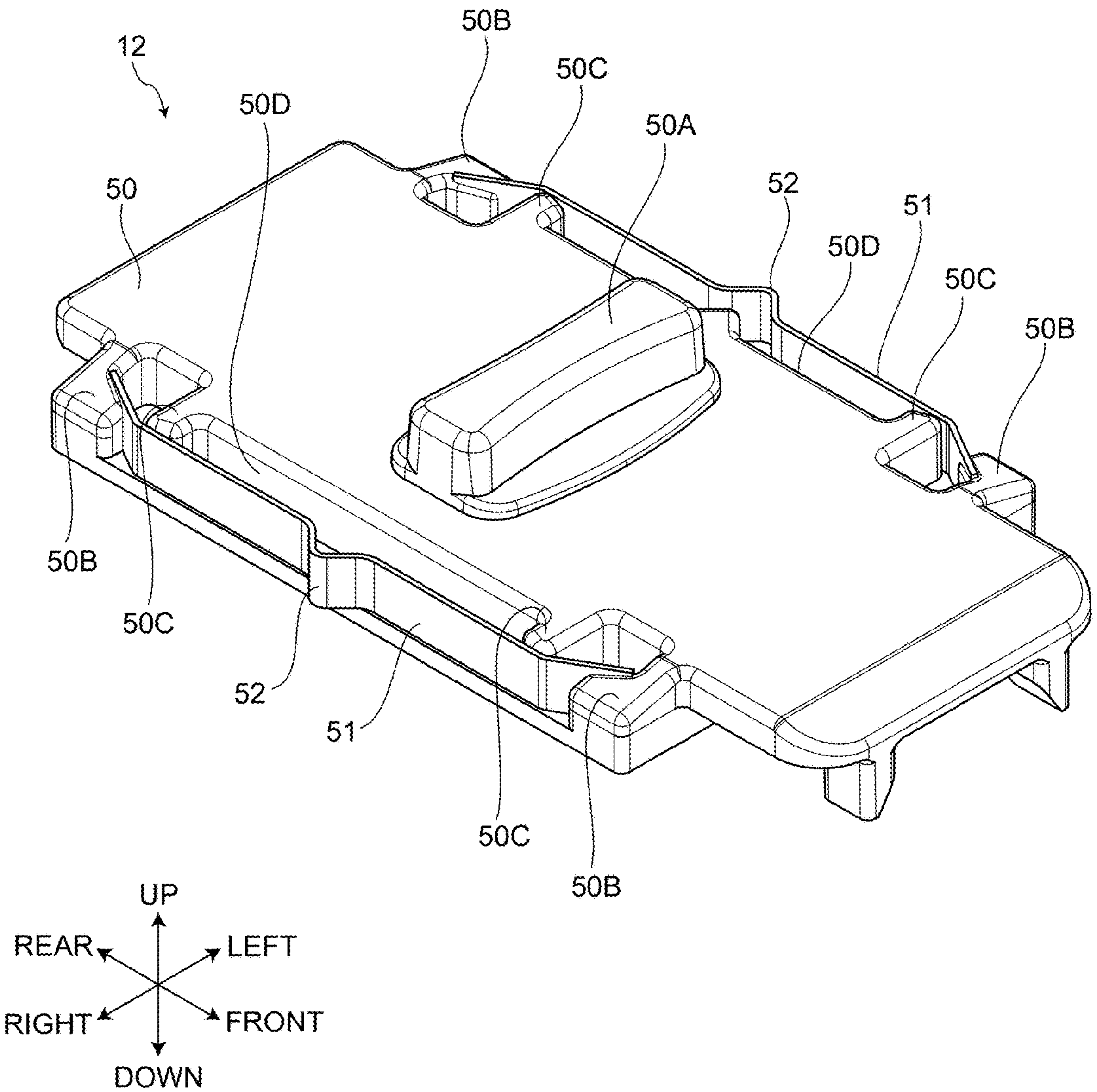
FIG. 18 is an oblique view that shows a non-limiting example of a speed-change lever according to the present teachings.
Figure 19:
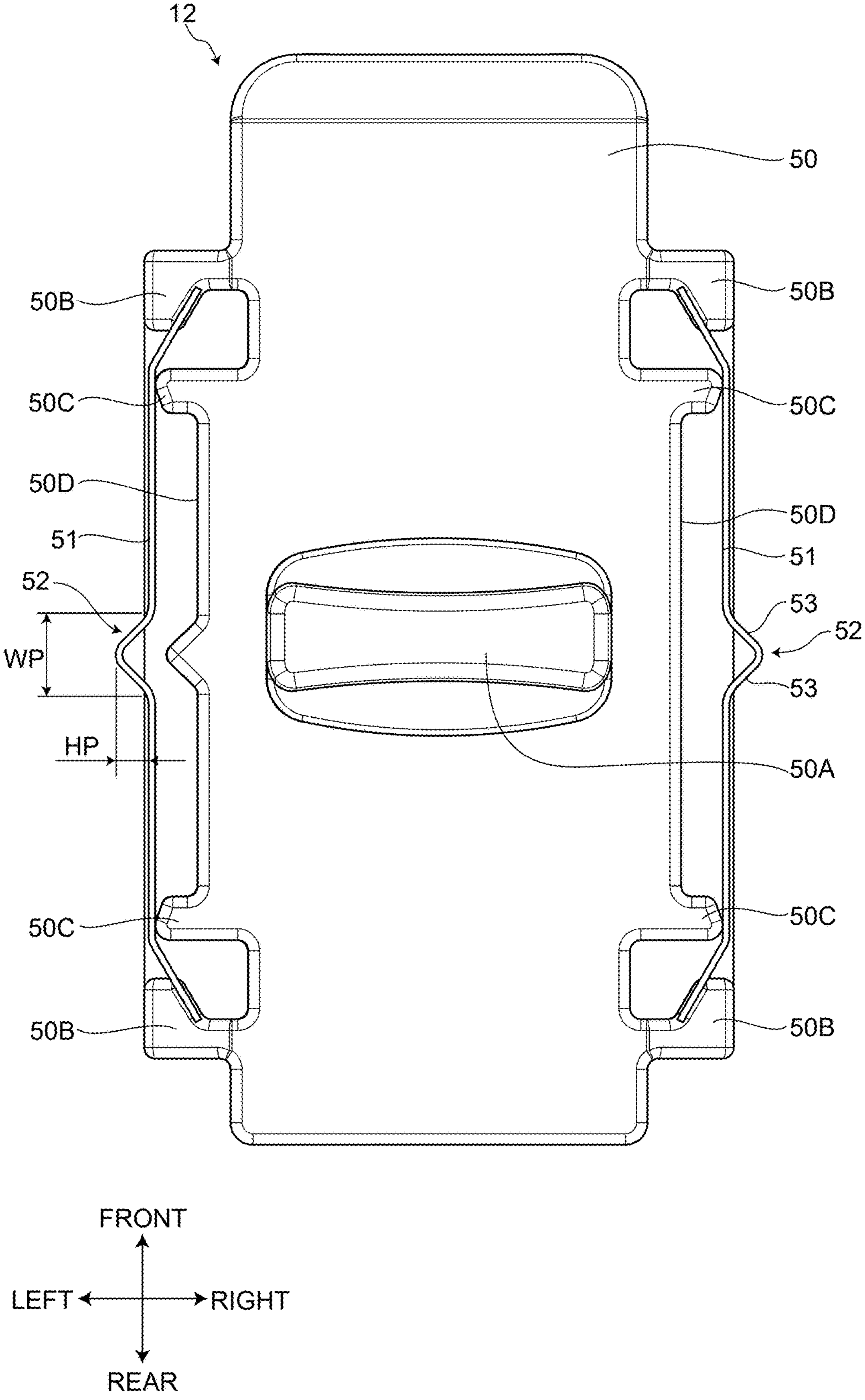
FIG. 19 is a top view that shows the speed-change lever.

FIG. 18 is an oblique view that shows the speed-change lever 12. FIG. 19 is a top view of the speed-change lever 12. The speed-change lever 12 has a plate shape and is slidable along the above-described movable range. The speed-change lever 12 comprises a movable member 50, which is movable (slidable) to the respective speed positions, and elastic members 51, which are held by (on) the movable member 50 and contact slide surfaces of the housing 2 (see below) under elastic deformation. The movable member 50 has an oblong shape that is elongated in the front-rear direction. The knob part 50A is formed on an upper surface of the movable member 50. One elastic member 51 is provided on each of the left side and the right side of the movable member 50. In the first embodiment, the elastic members 51 are leaf springs (plate springs), which are preferably made of metal, but may instead be made of an elastic (resilient) polymer. Each of the elastic members 51 extends in the front-rear direction and has a protruding portion 52 located between the front end and the rear end thereof. The elastic members 51 extend along the side surfaces of the movable member 50. On each of the elastic members 51, the surface on the side in the direction in which the protruding portion 52 protrudes will be referred to as a front surface, and the opposite surface thereof will be referred to as a rear surface. The rear surface of each of the elastic members 51 faces a corresponding side surface 50D of the movable member 50. The front end and the rear end of each of the elastic members 51 are held by the movable member 50. The movable member 50 comprises: support parts 50B, each of which supports the front surface of the corresponding elastic member 51 at one end portion thereof; and support parts 50C, each of which supports the rear surface of the corresponding elastic member 51 at one end portion thereof. A gap is formed between each of the side surfaces 50D, which is between one of the support parts 50C and the other of the support parts 50C, and the rear surface of the corresponding elastic member 51. Thereby, the movable member 50 holds each of the elastic members 51 such that a portion that includes the corresponding protruding portion 52 is deformable in the direction approaching the corresponding side surface 50D.

The protruding portions 52 are provided at an intermediate position between the front end and the rear end of the corresponding elastic member 51. The protruding portions 52 are formed into triangular shapes by bending the elastic member 51, which is a leaf spring. Each of the protruding portions 52 protrudes toward the side opposite (outward in the left-right direction) of the side surface 50D of the corresponding movable member 50. Accordingly, the speed-change lever 12 comprises one pair of the protruding portions 52, one on each of the left and the right side surfaces, that protrude outward in the left-right direction owing to the pair of elastic members 51. The shapes of each of the protruding portions 52 are identical. Each of the protruding portions 52 has a protrusion height HP and a width WP.

Figure 20:
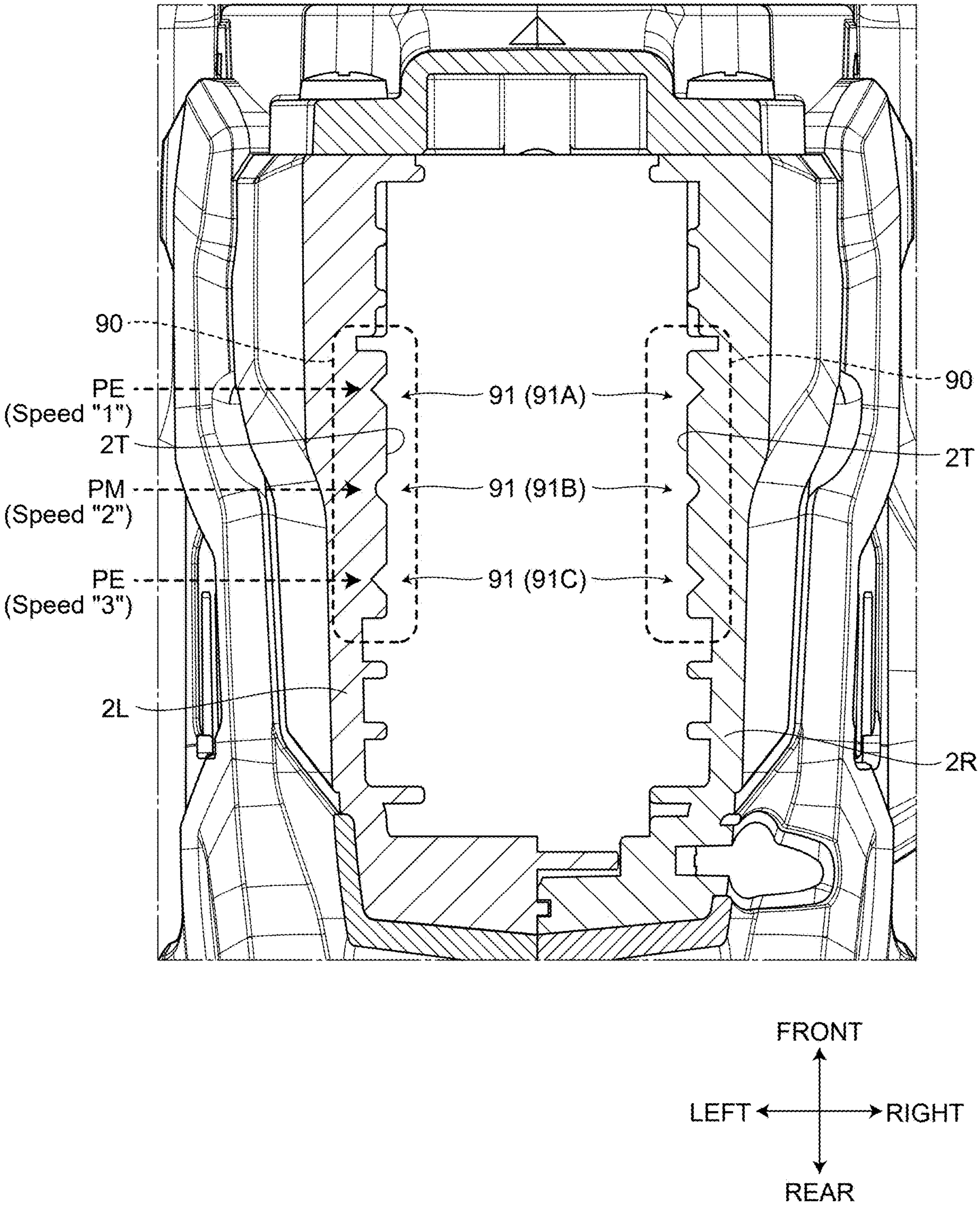
FIG. 20 is a cross-sectional view of a housing that shows groove portions that respectively engage with protruding portions of the speed-change lever.

FIG. 20 is a cross-sectional view of the housing 2 that shows groove portions (grooves, detents) 91, which are configured to respectively engage with the protruding portions 52 of the speed-change lever 12. FIG. 20 shows a cross section along the front, rear, left, and right directions at positions at which the protruding portions 52 (i.e., the elastic members 51) are to be disposed (inserted).

The power tool 1 according to the first embodiment further comprises position-holding parts 90 that impart (together with the elastic members 51) position-holding forces to the speed-change lever 12 at each of the speed positions in directions toward the center of the speed position at which the speed-change lever 12 is disposed. The speed-change lever 12 is held by the housing 2 in a movable manner. The position-holding parts 90 are located on the housing 2 and provide slide surfaces 2T for the speed-change lever 12. In the first embodiment, the position-holding parts 90 are integral (monolithic) with the housing 2 and are the portions of the housing 2 that include the slide surfaces 2T. Resisting forces that resist (impede) movement of the speed-change lever 12 away (out) from the respective speed positions are imparted to the speed-change lever 12 by the combination of the slide surfaces 2T formed on the position-holding parts 90 and the protrusions 52 formed on the elastic members 51.

The position-holding parts 90 have the groove portions 91, which generate position-holding forces, together with the elastic members 51, when the protruding portions 52 of the elastic members 51 of the speed-change lever 12 are not in the lowest energy engagement (i.e. fully seated) state with (in) the respective groove portions 91. That is, the speed-change lever 12 is positioned (held) at each of the speed positions by inserting the protruding portions 52 into the respective groove portions 91.

A pair of groove portions 91 is provided at each of the three or more speed positions, which include the two end-portion speed positions PE and the intermediate speed position PM. More specifically, in the first embodiment, a pair of groove portions 91 is provided at each of the three speed positions, namely: at the two end-portion speed positions PE for speed "1" and speed "3" and at the one intermediate speed position PM for speed "2." That is, the groove portions 91 include: two groove portions 91A, which are provided at the speed position for speed "1"; two groove portions 91B, which are provided at the speed position for speed "2"; and two groove portions 91C, which are provided at the speed position for speed "3." In embodiments in which the speed-reducing mechanism 30 is a gear-shifting mechanism having four or more stages and thus has four or more speed positions, the groove portions 91 are likewise provided at four locations or more. In the first embodiment, because the protruding portions 52 are provided on both the left and right sides of the speed-change lever 12, the groove portions 91 are provided on both the left and right sides to respectively correspond to the left-side protruding portion 52 and the right-side protruding portion 52. The groove portions 91 oppose the speed-change lever 12 in the left-right direction. The groove portions 91 are recessed from (in) the slide surfaces 2T of the housing 2 in the directions leading away from the speed-change lever 12. That is, the left-side groove portions 91 are recessed leftward from the slide surface 2T of the left housing 2L, and the right-side groove portions 91 are recessed rightward from the slide surface 2T of the right housing 2R.

Figure 21:
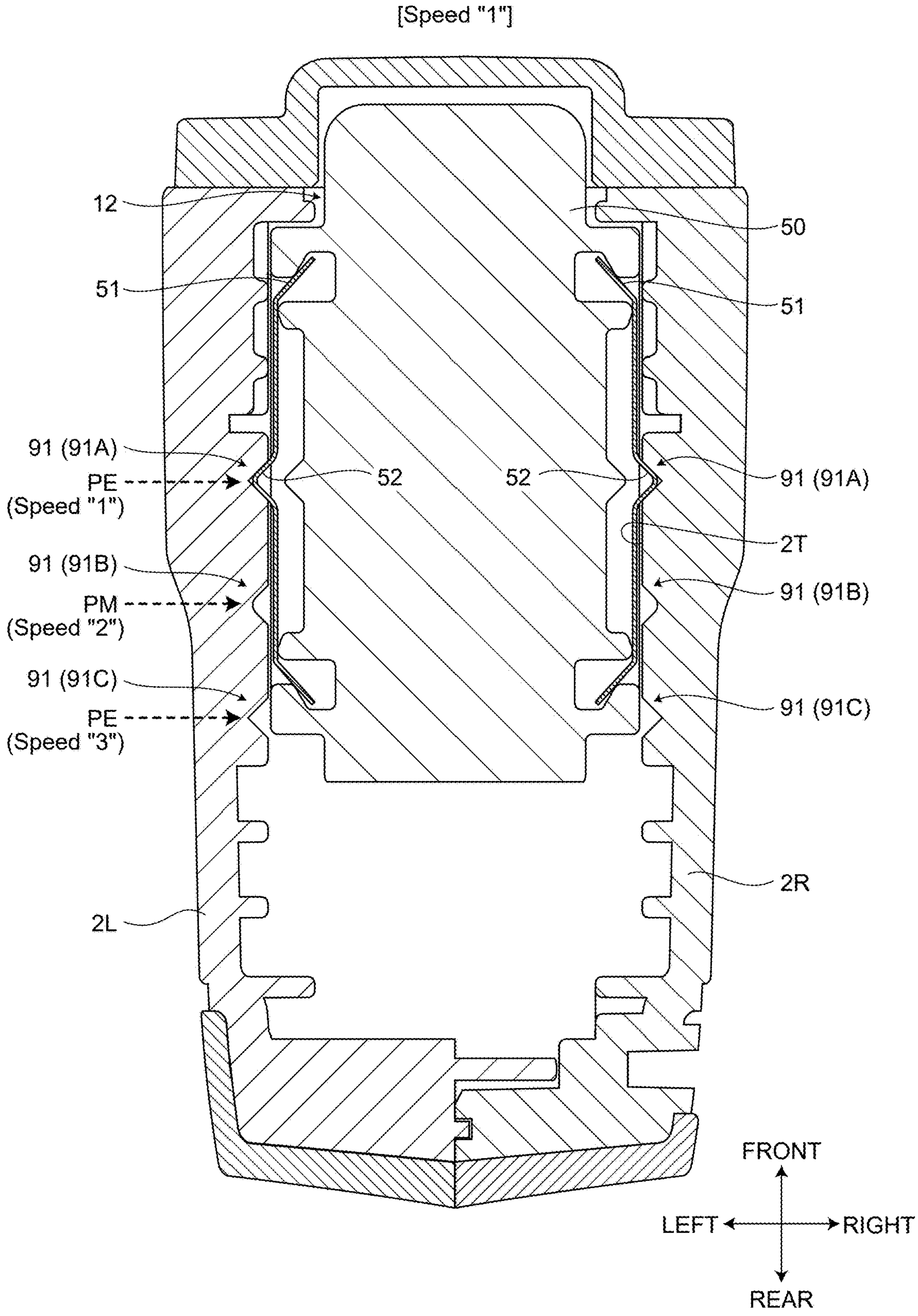
FIG. 21 is a cross-sectional view that shows the protruding portions and the groove portions in the state in which the speed-change lever is disposed at a speed position for speed "1."
Figure 22:
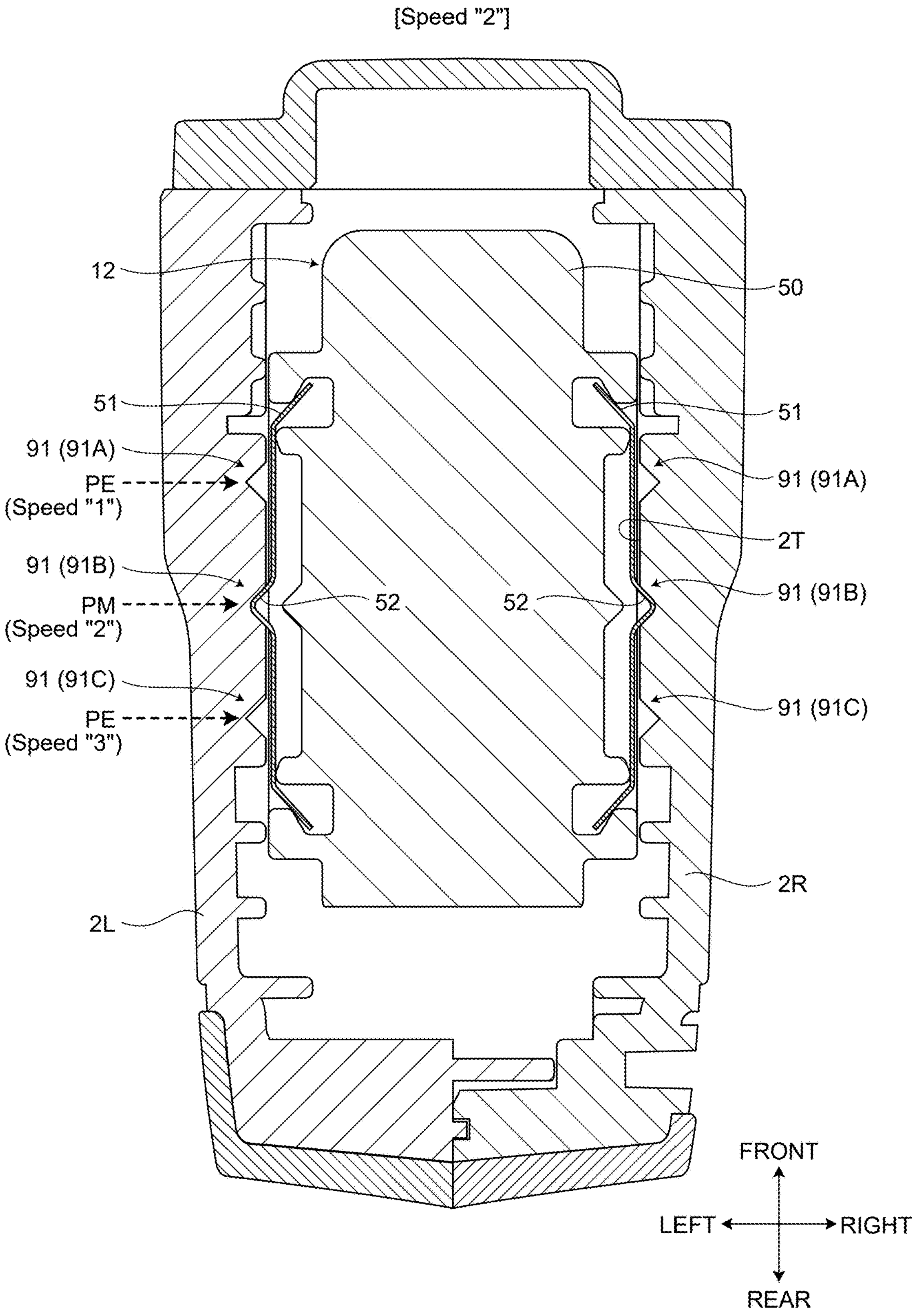
FIG. 22 is a cross-sectional view that shows the protruding portions and the groove portions in the state in which the speed-change lever is disposed at a speed position for speed "2."
Figure 23:
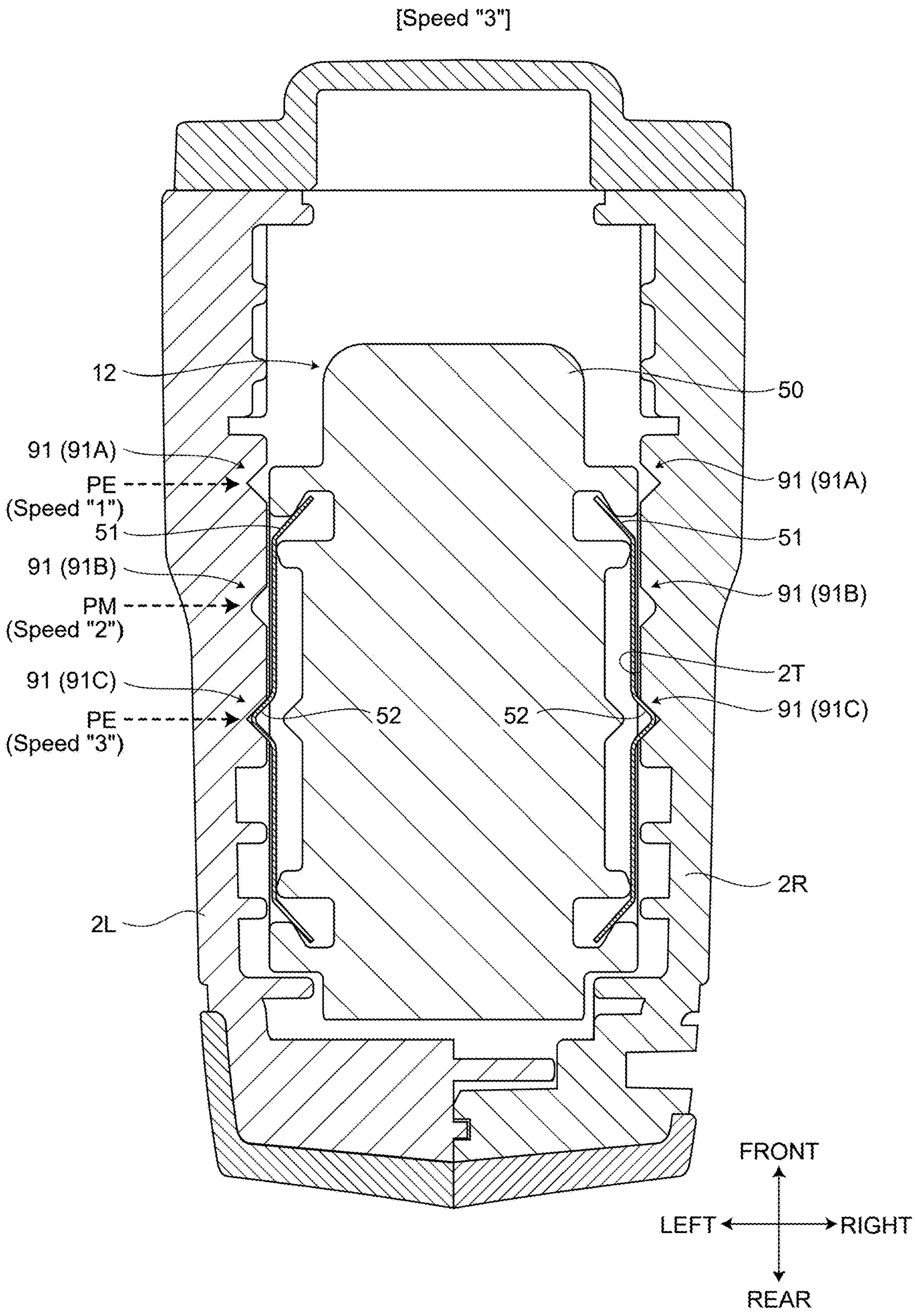
FIG. 23 is a cross-sectional view that shows the protruding portions and the groove portions in the state in which the speed-change lever is disposed at a speed position for speed "3."

FIG. 21 is a cross-sectional view that shows the protruding portions 52 and the groove portions 91 when the speed-change lever 12 is disposed at the speed position for speed "1." FIG. 22 is a cross-sectional view that shows the protruding portions 52 and the groove portions 91 when the speed-change lever 12 is disposed at the speed position for speed "2." FIG. 23 is a cross-sectional view that shows the protruding portions 52 and the groove portions 91 when the speed-change lever 12 is disposed at the speed position for speed "3."

When the speed-change lever 12 is disposed at the speed position for speed "1," the protruding portions 52 of the speed-change lever 12 are respectively disposed inside the groove portions 91A at the speed position for speed "1." When the speed-change lever 12 is disposed at the speed position for speed "2," the protruding portions 52 of the speed-change lever 12 are respectively disposed inside the groove portions 91B at the speed position for speed "2." When the speed-change lever 12 is disposed at the speed position for speed "3," the protruding portions 52 of the speed-change lever 12 are respectively disposed inside the groove portions 91C at the speed position for speed "3." When the speed-change lever 12 moves from any one of the speed positions to another speed position, the elastic members 51 elastically deform owing to the manipulation force the user imparts to the speed-change lever 12, which causes the protruding portions 52 to move away (out) from the interiors of the groove portions 91 and to ride up onto a location at which they contact the slide surfaces 2T between speed positions. In order for the protruding portions 52 to move from the interior to the exterior of the pair of groove portions 91, a manipulation force is required to be applied by the user to the speed-change lever 12 that causes the elastic members 51 to deform from the vertex position of the protruding portions 52 when the protruding portions 52 are in the interior of the groove portions 91 up to the position at which the protruding portions 52 respectively contact the slide surfaces 2T. The elastic deformation of the elastic members caused by the protrusions 52 being pressed against the groove portions 91 generates position-holding forces as reaction forces (anti-operation force) in response (opposition) to this manipulation force.

Figure 24:
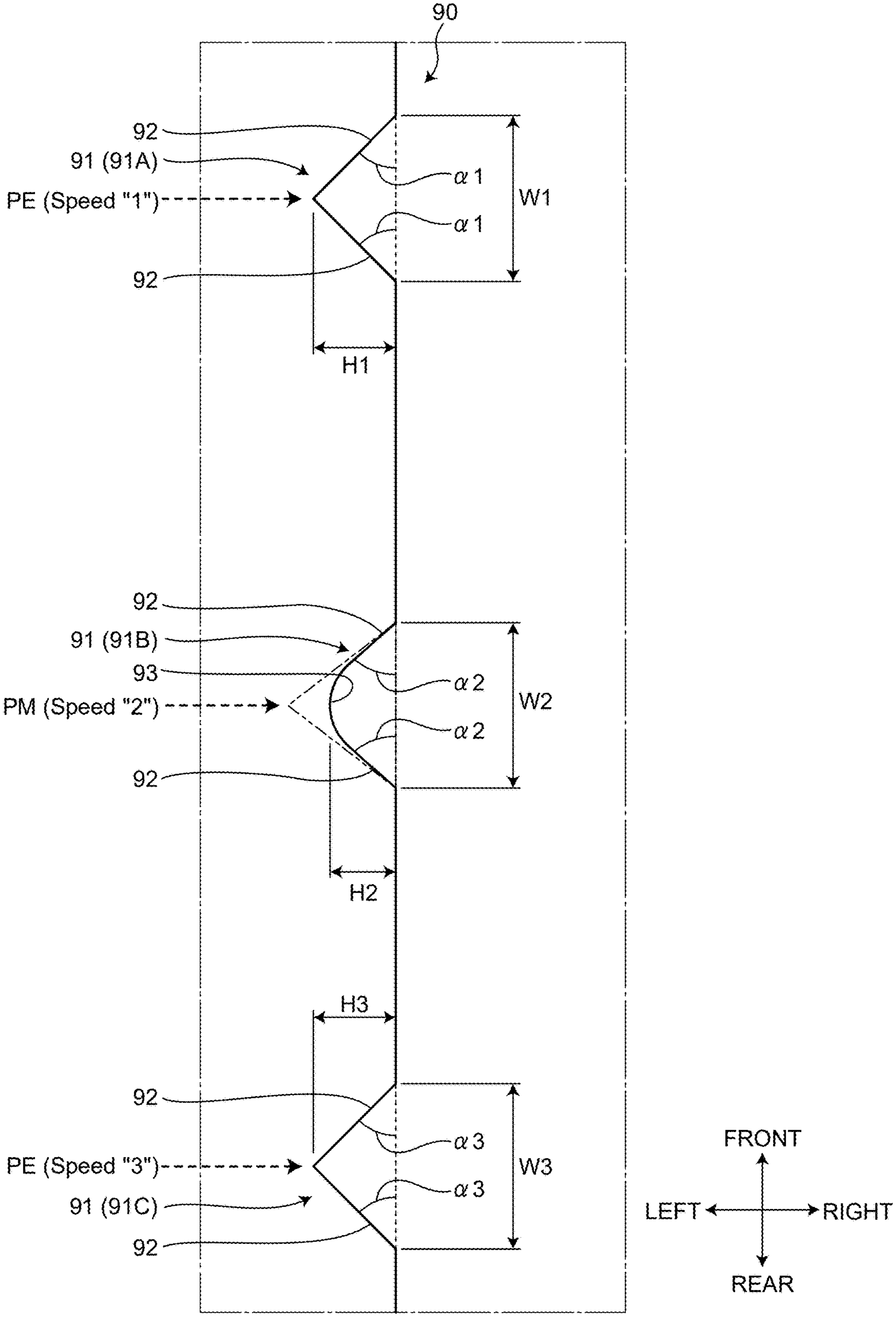
FIG. 24 is an enlarged view that shows one of the groove portions of each speed position.

FIG. 24 is an enlarged view that shows the groove portions 91 at the three speed positions. The left-side groove portions 91 formed in the left housing 2L are shown in FIG. 24. Because the right-side groove portions 91 have a shape that is left-right symmetrical with the left-side groove portions 91, an explanation of the right-side groove portions 91 is omitted.

In the first embodiment, the groove portion(s) 91 at the intermediate speed position PM has (have) a different shape than that of the groove portions 91 at the end-portion speed positions PE. That is, the shape of the groove portion(s) 91B at the speed position for speed "2," which is the intermediate speed position PM, is different from the shape of the groove portion(s) 91A at the speed position for speed "1" and the shape of the groove portion(s) 91C at the speed position for speed "3," which are the end-portion speed positions PE.

Specifically, each of the groove portions 91 has a pair of inclined inner surfaces 92 that are inclined relative to the movement direction of the speed-change lever 12 (i.e. the front-rear direction). The inclination angles of the inclined inner surfaces 92 of the groove portion(s) 91B are different from the inclination angles of both the groove portion(s) 91A and the groove portion(s) 91C. The inclination angles of each of the inclined inner surfaces 92 of the groove portion 91B at the intermediate speed position PM are larger than the inclination angle of each of the inclined inner surfaces 92 of the groove portions (the groove portion 91A and the groove portion 91C) at the end-portion speed positions PE. More specifically, please assume that the inclined inner surfaces 92 of the groove portion 91A have inclination angle $\alpha$1, the inclined inner surfaces 92 of the groove portion 91B have inclination angle $\alpha$2, and the inclined inner surfaces 92 of the groove portion 91C have inclination angle $\alpha$3. Inclination angle $\alpha$2 is larger[1] than inclination angle $\alpha$1 and inclination angle $\alpha$3.

[1]Translator's note: Inclination angle $\alpha$2 appears to be smaller than inclination angle $\alpha$1 and inclination angle $\alpha$3 in FIG. 24.

Inclination angle $\alpha$2 of each of the inclined inner surfaces 92 of the groove portion(s) 91B at the intermediate speed position PM is 45° or more and 90° or less. It is noted that, if inclination angle $\alpha$2 is 90° (see FIG. 27, which is further discussed below), that is, if the inclination angle of each of the inclined inner surfaces 92 is orthogonal to the movement direction of the speed-change lever 12 (the front-rear direction), such an angle is "inclined" relative to the movement direction according to the present teachings. In the first embodiment as shown in FIG. 24, inclination angle $\alpha$1 and inclination angle $\alpha$3 of the inclined inner surfaces 92 of the groove portion(s) 91A and the groove portion(s) 91C, respectively, at the end-portion speed positions PE are each 45°. Inclination angle $\alpha$2 of each of the inclined inner surfaces 92 of the groove portion 91B is 50°.[2] Accordingly, each of the inclined inner surfaces 92 of the groove portion(s) 91B has a steeper inclination than the inclined inner surfaces 92 of the groove portion(s) 91A and the groove portion(s) 91C.

[2]Translator's note: again, in FIG. 24, inclination angle $\alpha$2 appears to be smaller than inclination angle $\alpha$1 and inclination angle $\alpha$3.

The groove portion(s) 91A, the groove portion(s) 91B, and the groove portion(s) 91C have groove width W1, groove width W2, and groove width W3, respectively. In the first embodiment, groove width W1, groove width W2, and groove width W3 are equal. Groove width W1, groove width W2, and groove width W3 are smaller than width WP (see FIG. 19) of the protruding portion 52.

In the first embodiment, the groove portion(s) 91B at the intermediate speed position PM has (have) an inner-bottom surface 93, which connects end portions of the pair of inclined inner surfaces 92. In the first embodiment, the groove portion(s) 91A and the groove portion(s) 91C at the end-portion speed positions PE are not provided with the inner-bottom surface 93. That is, by directly connecting end portions of the pair of inclined inner surfaces 92 of the groove portion(s) 91A to each other (i.e. at a vertex or point) and directly connecting end portions of the pair of inclined inner surfaces 92 of the groove portion(s) 91C to each other (i.e. at a vertex or point), the groove portion(s) 91A and the groove portion(s) 91C at the end-portion speed positions PE become triangular-shaped (isosceles-triangle-shaped) grooves. In contrast, the end portions of the pair of inclined inner surfaces 92 of the groove portion(s) 91B at the intermediate speed position PM are connected via the inner-bottom surface 93. In FIG. 24, the inner-bottom surface 93 is a curved surface that curves smoothly. Consequently, the groove portion(s) 91B at the intermediate speed position PM become(s) an arch-shaped groove that is rounded owing to the shapes of the pair of inclined inner surfaces 92 and the inner-bottom surface 93.

The groove depth of the groove portion(s) 91B at the intermediate speed position PM is less than the groove depths of the groove portion 91A and the groove portion 91C at the end-portion speed positions PE. More specifically, please assume that the groove depths of the groove portion(s) 91A, the groove portion(s) 91B, and the groove portion(s) 91C are groove depth H1, groove depth H2, and groove depth H3, respectively. In FIG. 24, groove depth H2 of the groove portion(s) 91B is smaller than groove depth H1 of the groove portion(s) 91A and groove depth H3 of the groove portion(s) 91C. As shown in FIG. 24 by the chain, double-dashed line in the groove portion 91B, in case, hypothetically, the inner-bottom surface 93 were not provided and the pair of inclined inner surfaces 92 were extended as is at inclination angle α2 to be directly connected, the groove depth of the groove portion 91B would be larger than the other groove portions. As a result, the space (wall thickness of the housing 2) for forming the groove portions 91 of the position-holding parts 90 in the housing 2 might have to be increased. In contrast, by making groove depth H2 of the groove portion(s) 91B to be less than groove depths H1, H3, inclination angle α2 of the groove portion 91B can be made larger without having to enlarge the space (wall thickness of the housing 2) for forming the groove portions 91.

It is noted that groove depth H1 of the groove portion(s) 91A and groove depth H3 of the groove portion(s) 91C are equal. Groove depth H1, groove depth H2, and groove depth H3 are each smaller than protrusion height HP (see FIG. 19) of the protruding portion 52.

Figure 25:
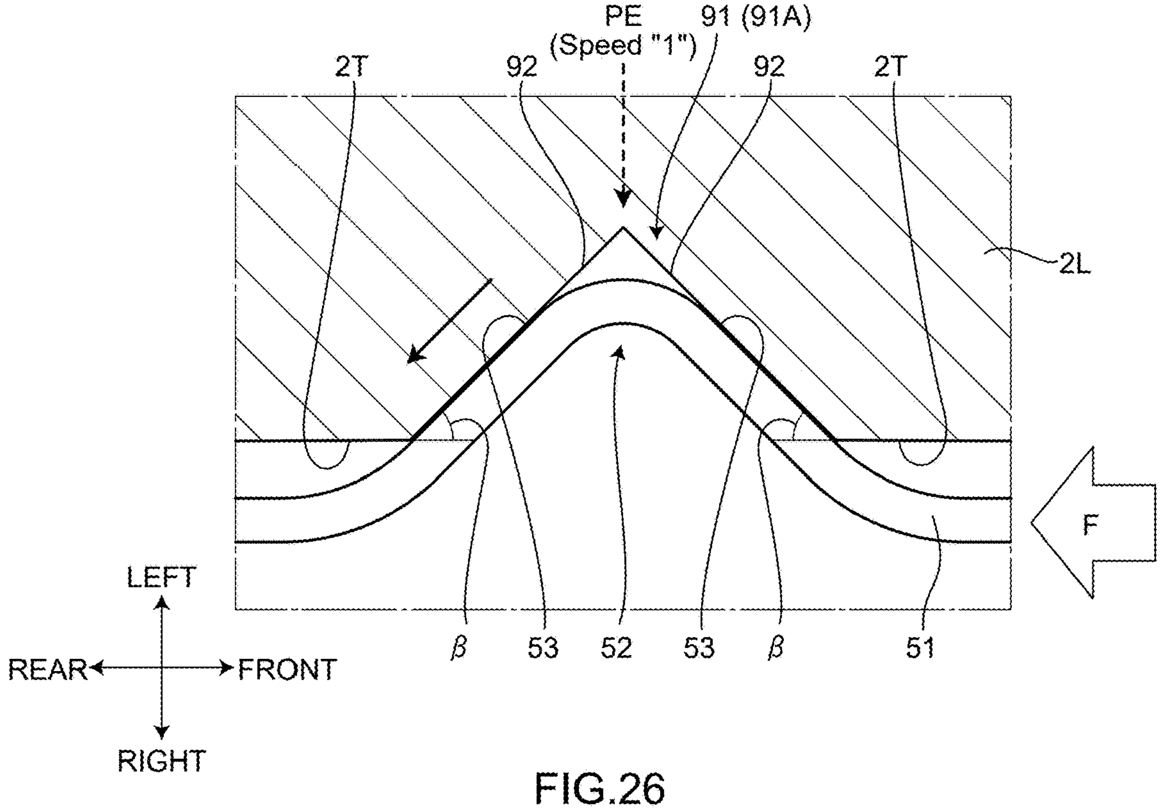
FIG. 25 is an enlarged view that shows the state in which one protruding portion is disposed in the groove portion of one end-portion speed position.
Figure 26:
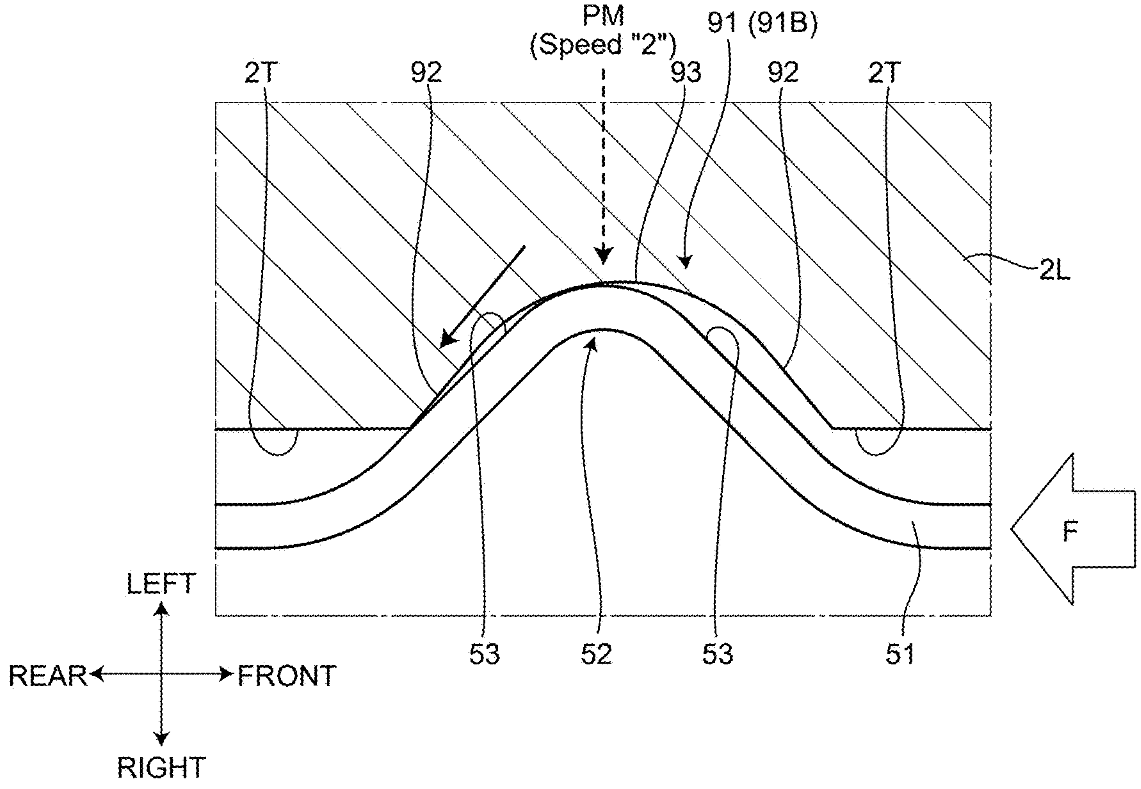
FIG. 26 is an enlarged view that shows the state in which one protruding portion is disposed in the groove portion of an intermediate speed position.

FIG. 25 is an enlarged view that shows the state in which one of the protruding portions 52 is disposed in one of the groove portions 91A at one of the end-portion speed positions PE (namely, the speed position for speed "1"). FIG. 26 is an enlarged view that shows the state in which one of the protruding portions 52 is disposed in one of the groove portions 91B at the intermediate speed position PM.

Each protruding portion 52 comprises two inclined outer surfaces 53 that are inclined relative to the movement direction of the speed-change lever 12. Inclination angle α2 of each of the inclined inner surfaces 92 of the groove portion(s) 91B at the intermediate speed position PM is larger than inclination angle β of each of the inclined outer surfaces 53 of the protruding portion 52. In contrast, inclination angle α1 of each of the inclined inner surfaces 92 of the groove portion(s) 91A at the end-portion speed position PE is equal to inclination angle β of each of the inclined outer surfaces 53 of the protruding portion 52. That is, in the embodiment, inclination angle β is 45°.

When a manipulation (pressing) force F is applied to the speed-change lever 12 (as shown in FIGS. 25 and 26) and the protruding portion 52 separates from the groove portion 91 at every speed position, the protruding portion 52 contacts the inclined inner surface 92 that is in the movement direction. This contact under pressure causes the elastic member 51 to elastically deform (compress) against the inclined inner surface 92 on the opposite side, from which the manipulation force F is being applied. This elastic deformation generates a portion of the above-described position-holding (resilient) force that is directed back toward the center of the groove portion 91. As a result of the elastic deformation, the protruding portion 52 can move (slide) diagonally to ride over the inclined inner surface 92 while being displaced toward the opening side of the corresponding groove portion 91. Thus, the protruding portion 52 slides along one of the corresponding inclined inner surfaces 92. The manipulation force F for the corresponding protruding portion 52 required to ride over the inclined inner surface 92 (i.e., to overcome the position-holding force generated in the elastic member 51 at the groove portion 91B) is larger for the groove portion 91B at the intermediate speed position PM shown in FIG. 26 than the groove portions 91A and 91C at the end portion speed positions (PE) shown in FIG. 25, because the inclined inner surfaces 92 of the groove portion(s) 91B have steeper inclinations than the inclination of the inclined inner surfaces 92 of the groove portion 91A at the end-portion speed position PE shown in FIG. 25 (and the inclination of the inclined inner surfaces 92 of the groove portion 91C at the other end-portion speed position PE).

According to this kind of configuration, in the first embodiment, the position-holding force at the intermediate speed position PM, which is located between the end-portion speed positions PE at both ends of the movable range, is larger than the position-holding forces at each of the end-portion speed positions PE. In other words, in the embodiment, the resisting forces imparted to the speed-change lever 12 at an intermediate position of the movable range are larger than the resisting forces imparted to the speed-change lever 12 at each end portion of the movable range.

Consequently, when, for example, the user is attempting to move the speed-change lever 12 from the speed position for speed "1," which is one of the end-portion speed positions PE, to the speed position for speed "2," which is the intermediate speed position PM, in the state in which the protruding portions 52 are engaged with the groove portions 91A at the speed position for speed "1," the user increases the manipulation force F more and more toward the speed position for speed "2"; then, when the applied manipulation force F exceeds the position-holding forces from engagement of the protrusions 52 in the groove portions 91A, the speed-change lever 12 can begin to move (slid) along the slide surfaces 2T from the speed position for speed "1" toward the speed position for speed "2."

When the protruding portions 52 of the speed-change lever 12 enter the interiors of the groove portions 91B at the speed position for speed "2," because the position-holding forces at the groove portions 91B are larger than the position-holding forces at the groove portions 91A, even if the user continues to apply a manipulation force F to the speed-change lever 12, as long as the manipulation force F does not exceed the position-holding forces at the groove portions 91B, the speed-change lever 12 can be held at the speed position for speed "2" by the engagement of the protrusions 52 in the groove portions 91B. As a result, as compared to known speed change levers, the operator is less likely to unintentional move (slide) the speed-change lever 12 past the speed position for speed "2" toward the speed position for speed "3" while attempting to move the speed-change lever 12 from the speed position for speed "1" to the speed position for speed "2". The same applies also to moving the speed-change lever 12 from the speed position for speed "3" to the speed position for speed "2."

It is noted that, when the user attempts to move the speed-change lever 12 from the speed position for speed "2," which is the intermediate speed position PM, to the speed position for speed "1" or speed "3," which are the end-portion speed positions PE, because the user has to move the speed-change lever 12 forward or rearward to the limit of the movable range, the user does not need to adjust the manipulation force F. Consequently, it is possible for the user to move the speed-change lever 12 reliably to the intended speed position.

Effects

As explained above, in the first embodiment, the power tool 1 comprises: the motor 6, which comprises the stator 61 and the rotor 62; the output part 8, which is disposed forward of the motor 6; the gear-shifting speed-reducing mechanism 30 having three or more gear-shift stages, which is driven by rotation of the rotor 62 and causes the output part 8 to rotate at a rotational speed that is lower than the rotational speed of the rotor 62 that is being input to the speed-reducing mechanism 30; the speed-change lever 12 (gear-shifting manipulation part), which is movable within the movable range that includes three or more speed positions respectively corresponding to the three gear-shift stages of the speed-reducing mechanism 30; and the position-holding parts 90, which impart to the speed-change lever 12 the position-holding forces at each of the speed positions in directions toward the respective speed position. The position-holding forces at the intermediate speed position PM, which is located between the end-portion speed positions PE at both ends of the movable range, are larger than the position-holding forces at the end-portion speed positions PE.

In the above-mentioned configuration, because position-holding forces that are larger than the position-holding forces at the end-portion speed positions PE are imparted to the speed-change lever 12 at the intermediate speed position PM, when the user attempts to move the speed-change lever 12 to the intermediate speed position PM, the speed-change lever 12 is less likely to unintentionally move (slide) past the intermediate speed position PM. As was noted above, because the end-portion speed positions PE are at each end of the movable range, the user only needs to move the speed-change lever 12 to the limit of the movable range and cannot unintentionally move the speed-change lever 12 beyond the end-portion speed positions PE. Therefore, the user is less likely to switch the gear-shifting mechanism to a gear-shift mode that is not intended.

In the first embodiment, the speed-change lever 12 comprises the protruding portions 52. Each of the position-holding parts 90 has the groove portions 91 that are configured to engage with the protruding portions 52 to thereby generate position-holding forces. It is noted that, the speed-change lever 12 may have the groove portions 91, and each of the position-holding parts 90 may comprise the corresponding protruding portion 52. That is, one of the speed-change lever 12 and the position-holding parts 90 may comprise the protruding portions 52, and the other of the speed-change lever 12 and the position-holding parts 90 may have the groove portions 91 that engage with the protruding portions 52 to thereby generate position-holding forces.

In the above-mentioned configuration, in the state in which the protruding portions 52 have entered the interiors of a pair of the groove portions 91 and thus the protruding portions 52 are elastically engaged in the groove portions 91, the position-holding forces thereof can be effectively imparted to the speed-change lever 12 as the resisting force when the user applies a force to the speed-change lever 12 such that the protruding portions 52 move away (out) from the interior of the groove portions 91. Furthermore, the magnitude of the position-holding force can be easily adjusted by modifying the engagement state (hold state) between the protruding portions 52 and the groove portions 91. For example, as was explained above and will be further explained below, by increasing the inclination angle of the pair of groove portions 91B at the intermediate speed position PM (as compared to the inclination angle of the pair of groove portions 91A or 91C), a greater (maximum) position-holding force can be generated at the intermediate speed position PM than at the end-portion speed positions PE.

In the first embodiment, a pair of the groove portions 91 is provided at each of the three or more speed positions, which include the two end-portion speed positions PE and the intermediate speed position PM. The groove portions 91B at the intermediate speed position PM have a different shape than the groove portions 91A, 91C at the end-portion speed positions PE.

In the above-mentioned configuration, by making the shape of the groove portions 91B at the intermediate speed position PM different from the shape of the groove portions 91A, 91C at the end-portion speed positions PE, the magnitude of the manipulation force F that has to be applied to the speed-change lever 12 to overcome the position-holding force generated by the protruding portions 52 and the groove portions 91B to move away from the interiors of the groove portions 91B can be made different from the magnitude of the manipulation force F that has to be applied to the speed-change lever 12 to overcome the position-holding force generated by the protruding portions 52 and the groove portions 91A or 91C to move away from the interiors of the groove portions 91A or 91C, respectively.

In the first embodiment, the groove portions 91 include the pair of inclined inner surfaces 92 that are inclined relative to the movement direction of the speed-change lever 12. The inclination angle of each of the inclined inner surfaces 92 of the groove portions 91B at the intermediate speed position PM is larger than the inclination angle of each of the inclined inner surfaces 92 of the groove portions 91A, 91C at the end-portion speed positions PE. That is, inclination angle $\alpha 2$ of each of the inclined inner surfaces 92 of the groove portions 91B at the intermediate speed position PM is larger than inclination angle $\alpha 1$ and inclination angle $\alpha 3$ of each of the inclined inner surfaces 92 of the groove portions 91A and the groove portions 91C, respectively, at the end-portion speed positions PE.

In the above-mentioned configuration, because the protruding portions 52 move along the inclined inner surfaces 92 when the protruding portions 52 are moving away (out) from the interiors of the groove portions 91, the magnitude of the force required to be applied to the speed-change lever 12 to overcome the position-holding force generated by the protruding portions 52 to cause them to move away (out) from the interiors of the groove portions 91 can be made larger by making the inclination angle of those inclined inner surfaces 92 larger.

In the first embodiment, the protruding portions 52 include the two inclined outer surfaces 53 that are each inclined relative to the movement direction of the speed-change lever 12. Inclination angle α2 of each of the inclined inner surfaces 92 of the groove portions 91B at the intermediate speed position PM is larger than inclination angle β of each of the inclined outer surfaces 53 of the protruding portions 52.

In the above-mentioned configuration, inclination angle β of the inclined outer surfaces 53 of the protruding portions 52 are made to coincide with inclination angles α1, α3 of the inclined inner surfaces 92 of the respective groove portions 91A, 91C at the end-portion speed positions PE. Therefore, for example, the protruding portions 52 can mate with the groove portions 91A, 91C at the end-portion speed positions PE in a flush or uniform contacting manner. On the other hand, because inclination angle α2 is larger than inclination angle β, the protruding portions 52 are accommodated inside the groove portions 91B at the intermediate speed position PM with a gap therebetween, i.e. due to the different shapes (contours, inclination angles) of the groove portions 91B and the protruding portions 52.

In the first embodiment, inclination angle α2 of the inclined inner surfaces 92 of the groove portions 91B at the intermediate speed position PM is 45° or more and 90° or less. Preferably, inclination angle α2 of the inclined inner surfaces 92 of the groove portions 91B at the intermediate speed position PM is at least 5° greater than inclination angles α1, α3 of the inclined inner surfaces 92 of the respective groove portions 91A, 91C at the end-portion speed positions PE.

In the above-mentioned configuration, the position-holding forces can easily be made larger at the intermediate speed position PM.

In the first embodiment, the groove portions 91B at the intermediate speed position PM have the inner-bottom surface 93, which connects the end portions of the pair of inclined inner surfaces 92.

In the above-mentioned configuration, because the inner-bottom surface 93 of the groove portions 91B does not form a vertex between the pair of inclined inner surfaces 92, the groove depth of the groove portions 91B need not be made large even if inclination angle α2 of the inclined inner surfaces 92 has been made relatively large.

In the first embodiment, groove depth H2 of the groove portions 91B at the intermediate speed position PM is less than groove depths H1, H3 of the groove portions 91A, 91C at the end-portion speed positions PE.

In the above-mentioned configuration, even if inclination angle α2 of the inclined inner surfaces 92 of the groove portions 91B at the intermediate speed position PM is made to be relatively large, it is not necessary to make the maximum groove depth of the groove portions 91B at the intermediate speed positions correspondingly large. Because a large space (thickness) is not needed to form the groove portions 91 at each of the speed positions, the outer-shape dimensions of the power tool 1 need not be enlarged.

In the first embodiment, the power tool 1 further comprises the housing 2, which holds the speed-change lever 12 in a movable manner. The position-holding parts 90 are located on the housing 2 and provide slide surfaces 2T for the speed-change lever 12.

In the above-mentioned configuration, the position-holding forces imparted to the speed-change lever 12 can be adjusted by making the sliding resistance imparted to the speed-change lever 12 by the position-holding parts 90 different.

In the first embodiment, the speed-change lever 12 comprises the movable member 50, which is movable to each of the speed positions, and the elastic members 51, which are held by (on) the movable member 50 and slidably contact the slide surfaces 2T while being elastically deformed.

In the above-mentioned configuration, by providing the elastic members 51 on the speed-change lever 12, the position-holding forces imparted to the speed-change lever 12 can be adjusted using the elastic deformation of the elastic members 51.

In the embodiment, the movable range of the speed-change lever 12 has a straight-line shape along the front-rear direction.

In the known art, while the user is moving the speed-change lever along its movable path by manually pushing the speed-change lever in one direction or the other, it was likely that the speed-change lever 12 would unintentionally move beyond the intermediate speed position PM in the event that the user applied too large of pushing (manipulation) force to the speed-change lever 12. However, in the above-mentioned configuration, by making the position-holding forces at the intermediate speed position PM larger, a simple and highly manipulatable configuration can be achieved that reduces the likelihood that the user will inadvertently switch the gear-shifting mechanism to an unintended gear-shift mode.

In the first embodiment, the speed-change lever 12 has a plate shape that is slidably movable along the movable range.

In the above-mentioned configuration, the speed-change lever 12 can be moved to each of the speed positions by merely sliding the speed-change lever 12.

In the first embodiment, the speed-reducing mechanism 30 comprises the gear mechanisms (e.g., the first planetary-gear mechanism 31, the second planetary-gear mechanism 32, and the third planetary-gear mechanism 33), which are connected to the speed-change lever 12. The speed-reduction ratio of the speed-reducing mechanism 30 is switched by changing, in accordance with the speed position of the speed-change lever 12, the position at which the gear mechanisms intermesh.

In the above-mentioned configuration, because electronic control is not needed for switching the speed-reducing mechanism 30, the configuration of the power tool 1 can be simplified.

In the first embodiment, the speed-reducing mechanism 30 is a three-stage, gear-shifting mechanism.

In the above-mentioned configuration, the user can select the appropriate gear-shift stage, from among the three stages, in accordance with the working conditions and/or requirements. Furthermore, the user can also switch, as appropriate, to the gear-shift stage that corresponds to the intermediate speed position PM from among the three stages.

In the first embodiment, the output part 8 comprises: the spindle 81, which is rotated about rotational axis AX—which extends in the front-rear direction—using the rotational force (energy) output by the rotor 62; and the chuck 82, which is mounted on the spindle 81 and is configured to hold the tool accessory.

The above-mentioned configuration can be employed for a variety of work by switching the tool accessory.

In the first embodiment, the power tool 1 comprises: the motor 6, which comprises the stator 61 and the rotor 62; the output part 8, which is disposed forward of the motor 6; the gear-shifting speed-reducing mechanism 30 having three or more gear-shift stages, which is driven by rotation of the rotor 62 and causes the output part 8 to rotate at a rotational speed that is lower than the rotational speed of the rotor 62 that is being input into the speed-reducing mechanism; the speed-change lever 12, which is movable within the movable range that includes the speed positions corresponding to the three gear-shift stages of the speed-reducing mechanism 30; and the housing 2, which holds the speed-change lever 12 in a movable manner and imparts resisting forces to the speed-change lever 12 that resist movement of the speed-change lever 12. The resisting forces at an intermediate position of the movable range are larger than the resisting forces at each end portion of the movable range.

In the above-mentioned configuration, because the resisting forces imparted to the speed-change lever 12 at an intermediate position of the movable range are larger than at the end positions, when the user attempts to move the speed-change lever 12 to the speed position in the middle of the movable range, the speed-change lever 12 is less likely to unintentionally pass the speed position in the middle of the movable range. It is noted that the user only needs to move the speed-change lever 12 to the limit of the movable range for the speed positions at the end portions of the movable range, and there is no situation in which the user will unintentionally move the speed-change lever 12 beyond the speed positions at the end portions. Therefore, the user is less likely to switch the gear-shifting mechanism to a gear-shift mode that is not intended.

Second Embodiment

A second embodiment will now be explained. In the explanation below, structural elements that are identical or equivalent to those in the embodiment described above are assigned identical symbols, and explanations of those structural elements are abbreviated or omitted.

Figure 27:
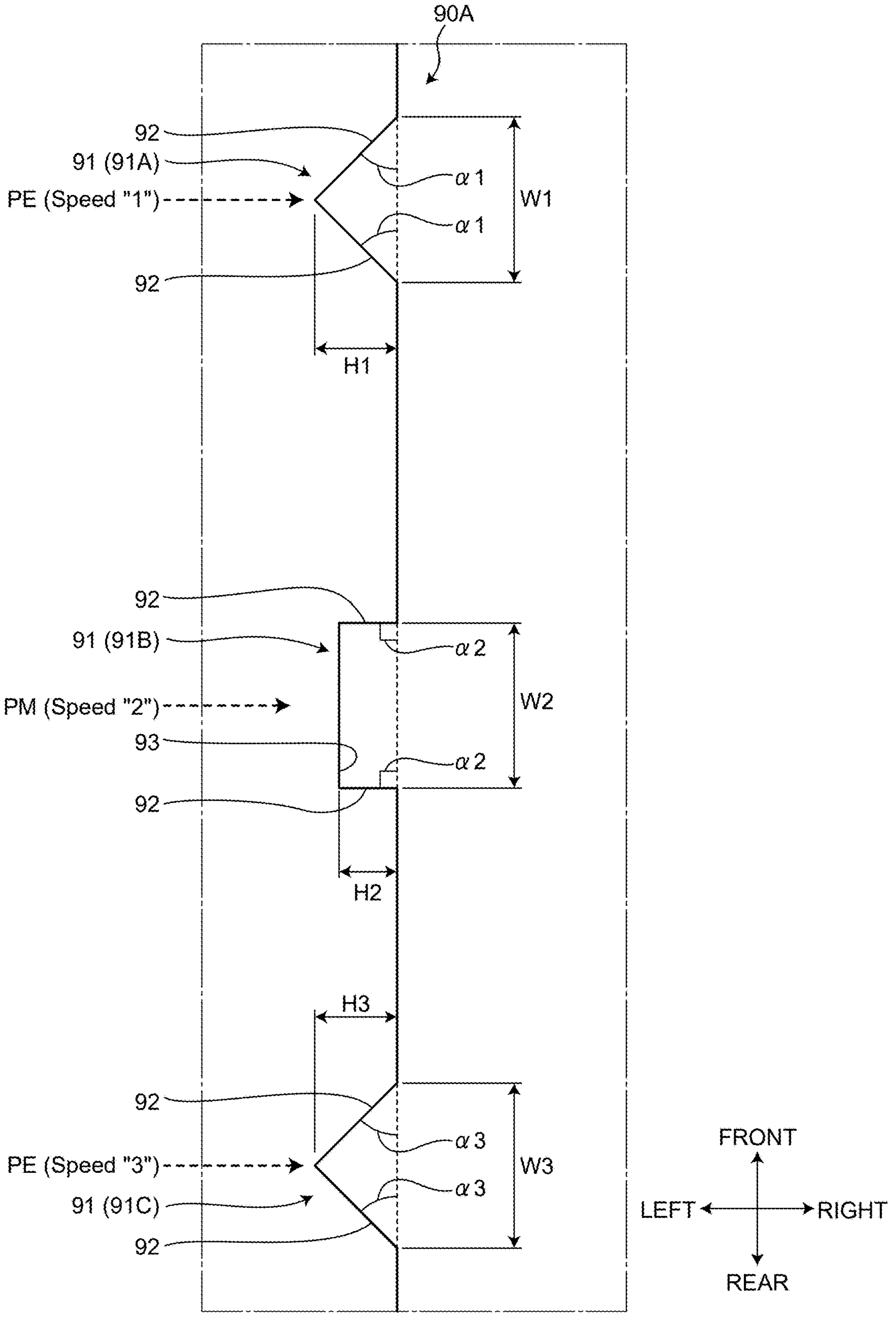
FIG. 27 is an enlarged view that shows groove portions according to a second embodiment of the present teachings.

With regard to position-holding parts 90A according to the second embodiment, the shapes of the groove portions 91B provided at the speed position for speed "2," which is the intermediate speed position PM, differ from those in the above-mentioned first embodiment. FIG. 27 is an enlarged view that shows the groove portions 91 according to the second embodiment. The left-side groove portions 91 formed in the left housing 2L are shown in FIG. 27. Because the right-side groove portions 91 have a shape that is left-right symmetrical with the left-side groove portions 91, an explanation of the right-side groove portions 91 is omitted.

In the second embodiment, inclination angle α2 of the pair of inclined inner surfaces 92 of the groove portion 91B at the intermediate speed position PM is 90°. Thus, the inclined inner surfaces 92 of the groove portion 91B are orthogonal to the movement direction (the front-rear direction) of the speed-change lever 12. The inclined inner surfaces 92 of the groove portion 91B are also orthogonal to the slide surfaces 2T for the speed-change lever 12. The inner-bottom surface 93, which connects end portions of the pair of inclined inner surfaces 92 of the groove portion 91B, is a surface having a straight-line shape extending along (in parallel to) the movement direction of the speed-change lever 12. Consequently, the groove portions 91B according to the second embodiment are oblong-shaped or rectangular-shaped grooves that are recessed from the slide surfaces 2T. Groove depth H2 of the groove portions 91B is smaller than groove depth H1 of the groove portions 91A and groove depth H3 of the groove portions 91C. Groove width W1 of the groove portions 91A, groove width W2 of the groove portions 91B, and groove width W3 of the groove portions 91C are equal.

In the second embodiment, because the inclined inner surfaces 92 of the groove portion 91B at the intermediate speed position PM have a steeper inclination than the inclined inner surfaces 92 of the groove portions 91A and the inclined inner surfaces 92 of the groove portions 91C at the end-portion speed positions PE, the amount of manipulation pushing force F required to overcome the position-holding force at the intermediate speed position PM and cause the protruding portions 52 to ride over the (sharp) outer edges of the inclined inner surface 92 can be made larger than is required to push the speed-change lever 12 away from either of the end-portion speed positions PE. In the groove portions 91B, because the inclined inner surfaces 92 are orthogonal to the slide surfaces 2T, the protruding portions 52, when disposed in the interiors of the groove portions 91B, need to ride over a perpendicular, wall-shaped inclined inner surface 92 in order to move away (out) from the groove portions 91B. Consequently, compared with the above-described first embodiment (wherein inclination angle α2 is only 50° instead of 90°), it is possible in the second embodiment to impart an even larger position-holding force to the speed-change lever 12, thereby making it more difficult (strenuous) to unintentionally move the speed-change lever 12 past the intermediate speed position. Moreover, the shape of the groove portions 91B also makes it less likely that the speed-change lever 12 will be inadvertently left at a position between two speed positions (which could lead to damage of the speed-change mechanism 30) or will be inadvertently pushed out of the intermediate speed position by an accidental contact with the knob part 50A.

As explained above, in the second embodiment, inclination angle α2 of the pair of inclined inner surfaces 92 of the groove portion 91B at the intermediate speed position PM is 90°. Thereby, it is possible for an even larger position-holding force to be imparted to the speed-change lever 12 at the intermediate speed position. It is noted that inclination angle α2 is preferably in the range of 50-90°.

Third Embodiment

A third embodiment will now be explained. In the explanation below, structural elements that are identical or equivalent to those in the embodiments described above are assigned identical symbols, and explanations of those structural elements are abbreviated or omitted.

Figure 28:
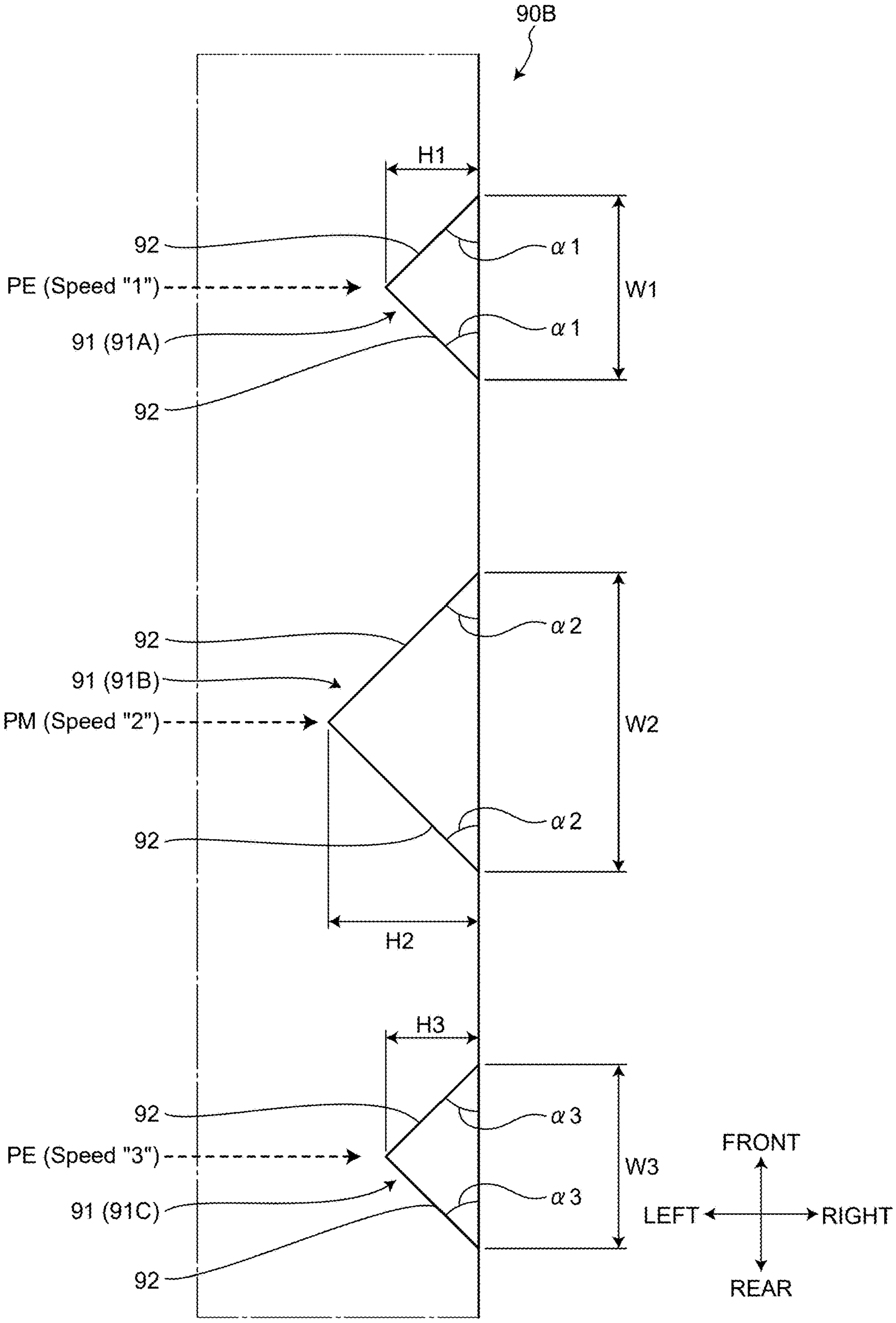
FIG. 28 is an enlarged view that shows groove portions according to a third embodiment of the present teachings.

With regard to position-holding parts 90B according to the third embodiment, the shapes of the groove portions 91B provided at the speed position for speed "2," which is the intermediate speed position PM, differ from those in the above-described first and second embodiments. FIG. 28 is an enlarged view that shows the groove portions 91 according to the third embodiment. The left-side groove portions 91 formed in the left housing 2L are shown in FIG. 28. Because the right-side groove portions 91 have a shape that is left-right symmetrical with the left-side groove portions 91, an explanation of the right-side groove portions 91 is omitted.

In the third embodiment, as shown in FIG. 28, the groove portion 91A and the groove portion 91C at the end-portion speed positions PE and the groove portion 91B at the intermediate speed position PM have the same or at least substantially similar basic shapes. More particularly, each of the groove portion 91A, the groove portion 91B, and the groove portion 91C has an isosceles triangle shape. Furthermore, the inclination angles of each of the inclined inner surfaces 92 of the groove portion 91A, the groove portion 91B, and the groove portion 91C are equal to each other. That is, inclination angle $\alpha 1$=inclination angle $\alpha 2$=inclination angle $\alpha 3$; in the example shown in FIG. 28, the inclination angle is 45° for all three groove portions 91A, 91B, 91C.

However, the groove portion 91B at the intermediate speed position PM is larger than the groove portion 91A and the groove portion 91C at the end-portion speed positions PE. More specifically, the length of the pair of inclined inner surfaces 92 of the groove portion 91B is longer than the length of the pair of inclined inner surfaces 92 of the groove portion 91A and of the pair of inclined inner surfaces 92 of the groove portion 91C.

Consequently, the groove depth of the groove portion 91B at the intermediate speed position PM is deeper than that of the groove portions 91A, 91C at the end-portion speed positions PE. That is, groove depth H2 of the groove portion 91B is deeper than groove depth H1 of the groove portion 91A and groove depth H3 of the groove portion 91C. Furthermore, groove width W2 of the groove portion 91B is longer than groove width W1 of the groove portion 91A and groove width W3 of the groove portion 91C.

Groove depth H2 of the groove portion 91B is also greater than or equal to protrusion height HP of the protruding portions 52 shown in FIG. 19. Groove depth H1 of the groove portion 91A and groove depth H3 of the groove portion 91C are each smaller than protrusion height HP of the protruding portions 52. Consequently, when the speed-change lever 12 is disposed at the speed position for speed "2," which is the intermediate speed position PM, the protruding portions 52 enter deep into the interiors of the groove portions 91B, and a majority of the protruding portions 52 fits into the groove portions 91B. In contrast, when the speed-change lever 12 is disposed at the speed position for speed "1" or speed "3," which are the end-portion speed positions PE, because the groove portions 91A and the groove portions 91C are each relatively small (and have shallower groove depths H1, H3 than groove depth H2), only a portion of the tip side of the protruding portions 52 fits in the interiors of the groove portions 91A or the groove portions 91C. Thus, in the third embodiment, the manipulation force F required to overcome the position-holding force and ride over the edges of the inclined inner surfaces 92 of the groove 91B can be made larger than at the grooves 91A, 91C because the protruding portions 52 enter deeper into the interiors of the groove portions 91B than into the interiors of the groove portions 91A, 91C.

As explained above, in the third embodiment, the groove portions 91B at the intermediate speed position PM have a groove depth that is larger than that of the groove portions 91A and the groove portions 91C at the end-portion speed positions PE.

In the above-mentioned configuration, the force required to overcome the position-holding force and cause the protruding portions 52 to move away (out) from the interiors of the groove portions 91B can be made larger by designing the groove portions 91B such that the protruding portions 52 enter more deeply into the groove portions 91B at the intermediate speed position PM than into the groove portions 91A, 91C at the end-portion speed positions PE.

Fourth Embodiment

A fourth embodiment will now be explained. In the explanation below, structural elements that are identical or equivalent to those in the embodiments described above are assigned identical symbols, and explanations of those structural elements are abbreviated or omitted.

Figure 29:
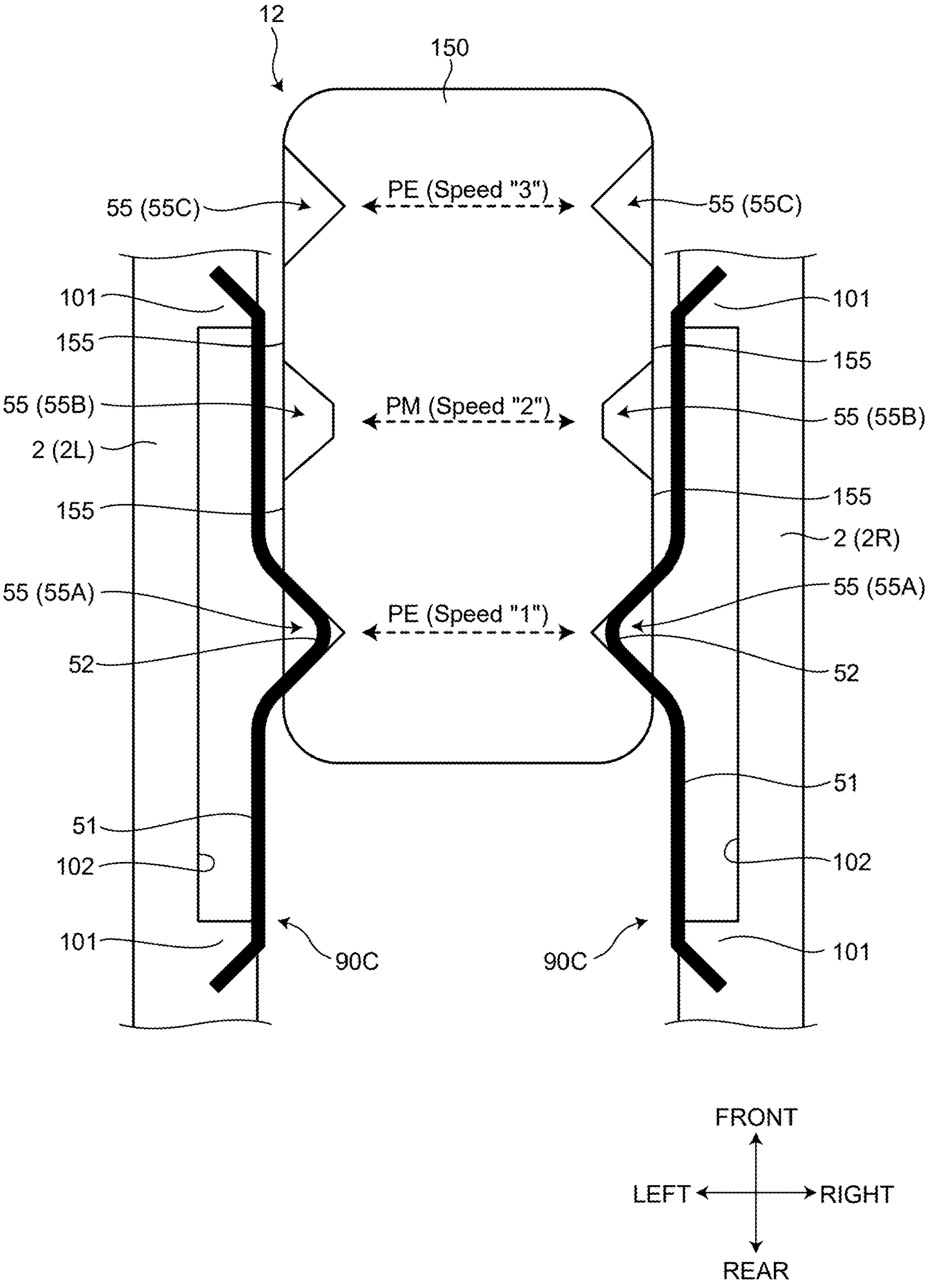
FIG. 29 is a schematic drawing that shows the speed-change lever and position-holding parts according to a fourth embodiment of the present teachings.

FIG. 29 is a schematic drawing that shows the speed-change lever 12 and position-holding parts 90C according to the fourth embodiment. In the fourth embodiment, the position-holding parts 90C have the protruding portions 52; furthermore, the speed-change lever 12, which is the gear-shifting manipulation part, has groove portions 55, which generate position-holding forces when engaged with the protruding portions 52.

The position-holding parts 90C are provided on the housing 2. More specifically, the position-holding parts 90C comprise the elastic members 51, which are disposed on the housing 2 alongside slide surfaces 155 of the speed-change lever 12. In the example shown in FIG. 29, the position-holding parts 90C comprise a pair of elastic members 51. The elastic members 51 are provided on the left housing 2L and the right housing 2R, respectively. The front ends and the rear ends of the elastic members 51 are held on the housing 2. The left housing 2L and the right housing 2R comprise support parts 101, which support end portions of the elastic members 51. A gap is formed between a side surface 102, which extends between the two support parts 101, and the rear surface of the elastic member 51, and thereby the elastic members 51 are deformable toward the side surfaces 102. The protruding portions 52 of the elastic members 51 protrude in the left-right direction toward the speed-change lever 12. The protruding portions 52 of the elastic members 51 are disposed at the same location along the front-rear direction.

The speed-change lever 12 comprises a movable member 150. The groove portions 55 are provided in the movable member 150. The movable member 150 also has the slide surfaces 155, which are the left and the right side surfaces. One of the slide surfaces 155 and the elastic member 51 provided on the left housing 2L face each other, and the other of the slide surfaces 155 and the elastic member 51 provided on the right housing 2R face each other. Groove portions 55 are provided at each of the three speed positions: the two end-portion speed positions PE for speed "1" and speed "3" and the one intermediate speed position PM for speed "2." That is, the groove portions 55 include: groove portions 55A, which are provided at the speed position for speed "1"; groove portion 55B, which are provided at the speed position for speed "2"; and groove portions 55C, which are provided at the speed position for speed "3." Because the protruding portions 52 are provided at both the left and right sides of the speed-change lever 12, the groove portions 55 are likewise provided on both the left-side slide surface 155 and the right-side slide surface 155 to correspond to the left-side protruding portion 52 and the right-side protruding portion 52. The groove portions 55 oppose the speed-change lever 12 in the left-right direction. Each groove portion 55 is recessed from the corresponding slide surface 155 of the movable member 150 toward the center side of the speed-change lever 12. The left-side groove portions 55 are recessed rightward from the left-side slide surface 155, and the right-side groove portions 55 are recessed leftward from the right-side slide surface 155.

Because the shapes of the groove portions 55A, the groove portions 55B, and the groove portions 55C are identical to the shapes of the groove portions 91A, the groove portions 91B, and the groove portions 91C of the above-mentioned first embodiment, a further explanation thereof can be omitted.

When the speed-change lever 12 is disposed at the speed position for speed “1,” the protruding portions 52 of the position-holding parts 90C are respectively disposed in the interiors of the groove portions 55A at the speed position for speed “1.” When the speed-change lever 12 is disposed at the speed position for speed “2,” the protruding portions 52 of the position-holding parts 90C are respectively disposed in the interiors of the groove portions 55B at the speed position for speed “2.” When the speed-change lever 12 is disposed at the speed position for speed “3,” the protruding portions 52 of the position-holding parts 90C are respectively disposed in the interiors of the groove portions 55C at the speed position for speed “3.”

As explained above, in the fourth embodiment, the position-holding parts 90C have the protruding portions 52. The speed-change lever 12 has the groove portions 55, which are capable of generating, together with the protruding portions 52 of the elastic members 51, position-holding forces when engaged with the protruding portions 52.

In the above-mentioned configuration, in the state in which the protruding portions 52 enter the interiors of the groove portions 55 and thereby the groove portions 55 and the protruding portions 52 are engaged with each other, the position-holding forces thereof can be effectively imparted to the speed-change lever 12 as the resisting forces generated as a result of the pressing (manipulation force) applied to the movable member 150, which causes the protruding portions 52 to move away (out) from the interiors of the groove portions 55. Furthermore, the magnitude of the position-holding forces can be easily adjusted by modifying the engagement state (hold state) between the protruding portions 52 and the groove portions 55.

In the fourth embodiment, the power tool 1 comprises the housing 2, which holds the speed-change lever 12 (the gear-shifting manipulation part) in a movable manner. The position-holding parts 90C comprise the elastic members 51, which are disposed on the housing 2 alongside the slide surfaces 155 of the speed-change lever 12.

In the above-mentioned configuration, by providing the elastic members 51 on the housing 2, the position-holding forces imparted to the speed-change lever 12 can be adjusted using the elastic deformation of the elastic members 51.

Fifth Embodiment

A fifth embodiment will now be explained. In the explanation below, structural elements that are identical or equivalent to those in the embodiments described above are assigned identical symbols, and explanations of those structural elements are abbreviated or omitted.

Figure 30:
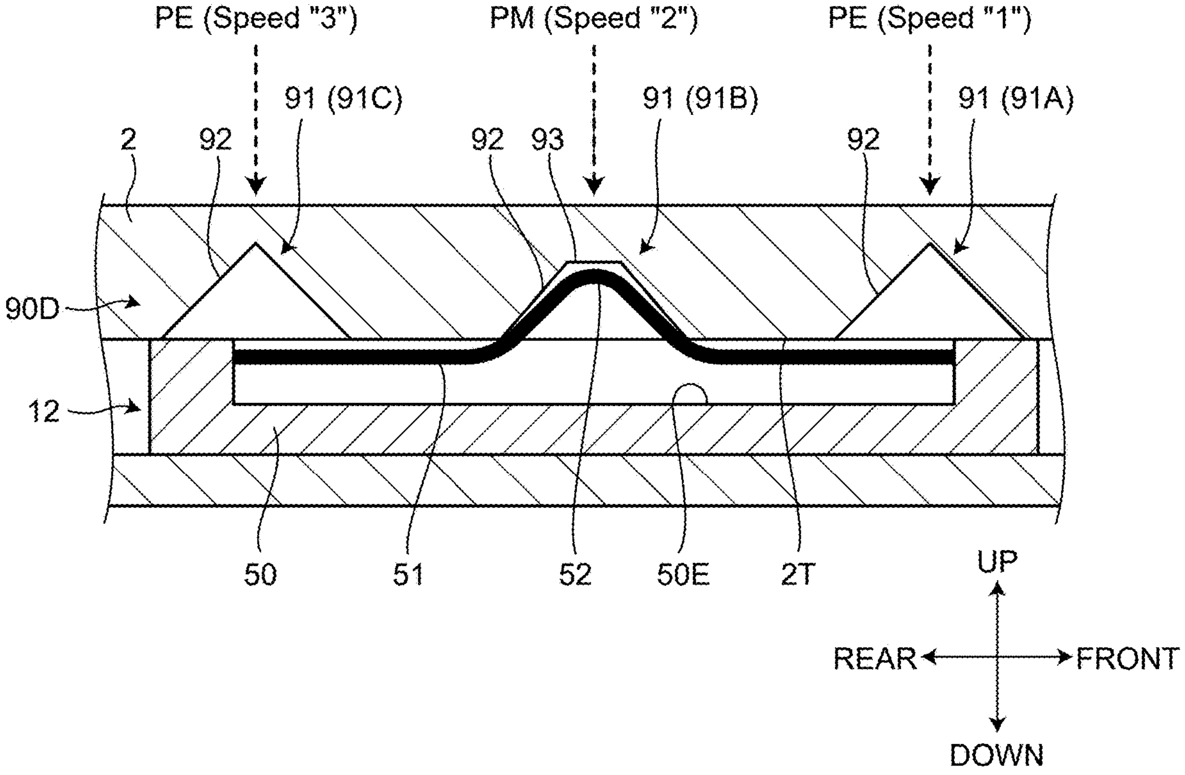
FIG. 30 is a schematic drawing that shows the speed-change lever and the position-holding parts according to a fifth embodiment of the present teachings.

FIG. 30 is a schematic drawing that shows the speed-change lever 12 and one of a pair of position-holding parts 90D according to the fifth embodiment. FIG. 30 shows a vertical cross section of the speed-change lever 12 viewed from the left-right direction, the vertical cross section being along an up-down direction and the front-rear direction of the power tool 1. Furthermore, FIG. 30 shows a cross section of a location outside of the opening 2A in FIG. 14 and is a cross section of the position where the end portions of the speed-change lever 12 in the left-right direction correspond to portions that are covered by the housing 2 (portions in which the elastic members 51 are disposed).

In the fifth embodiment, the groove portions 91 of the position-holding parts 90D and the protruding portions 52 of the speed-change lever 12 are engaged in the thickness or depth direction (the up-down direction) of the speed-change lever 12. The movable member 50 of the speed-change lever 12 holds the elastic members 51 in an attitude in which the protruding portions 52 are oriented (face) upward. That is, the protruding portions 52 of the elastic members 51 protrude upwardly. Gaps are formed between an upper surfaces 50E of the movable member 50 and the rear surfaces of the elastic members 51, and the elastic members 51 are deformable in a direction approaching (towards) the upper surface 50E.

The groove portions 91 of the position-holding parts 90D are formed in the slide surface 2T, which is an inner-side upper surface of the housing 2. The groove portions 91 are recessed from the slide surface 2T of the housing 2 in the direction leading away from the speed-change lever 12. That is, the groove portions 91 are recessed upwardly from the slide surface 2T. The groove portions 91 oppose the speed-change lever 12 in the up-down direction. When the protruding portions 52 enter, upward facing, the interiors of the groove portions 91 from the down direction, the groove portions 91 engage with the protruding portions 52.

The groove portions 91 include: the groove portions 91A, which are provided at the speed position for speed “1”; the groove portions 91B, which are provided at the speed position for speed “2”; and the groove portions 91C, which are provided at the speed position for speed “3.” Because the shapes of the groove portions 91A, the groove portions 91B, and the groove portions 91C are each the same as the corresponding groove portions 91A, 91B, 91C of the above-mentioned first embodiment, a detailed explanation thereof can be omitted.

As explained above, the protruding portions 52 and the groove portions 91 do not need to engage in the left-right direction and may instead engage in the thickness direction (up-down direction) of the speed-change lever 12. Although not shown, the protruding portions 52 may instead protrude downward from lower surfaces of the movable member 50, and the groove portions 91 may be formed in inner surfaces of the housing 2 that oppose the lower surfaces of the movable member 50.

Sixth Embodiment

A sixth embodiment will now be explained. In the explanation below, structural elements that are identical or equivalent to those in the embodiments described above are assigned identical symbols, and explanations of those structural elements are abbreviated or omitted.

Figure 31:
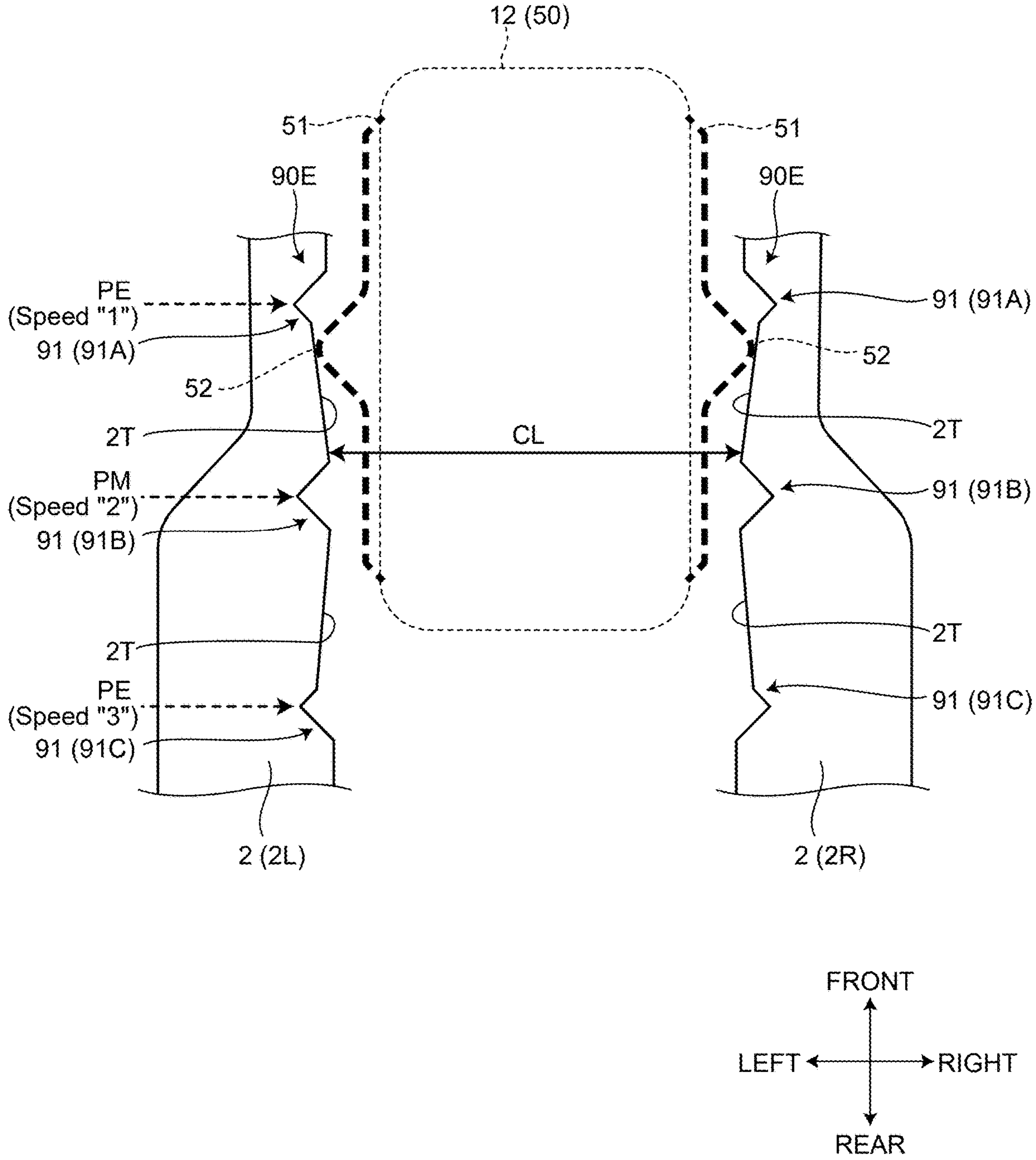
FIG. 31 is a schematic drawing that shows the position-holding parts according to a sixth embodiment of the present teachings.

FIG. 31 is a schematic drawing that shows position-holding parts 90E according to the sixth embodiment. Furthermore, FIG. 31 is a schematic drawing, viewed from the up-down direction, of one possible position of the speed-change lever 12 relative to the housing 2.

The housing 2 according to the sixth embodiment holds the speed-change lever 12 in a movable manner and imparts, together with the elastic members 51, to the speed-change lever 12 resisting forces that resist movement of the speed-change lever 12. The housing 2 includes a pair of slide surfaces 2T, which sandwich the speed-change lever 12 in a movable manner. The resisting forces that resist movement of the speed-change lever 12 are (i) sliding (frictional) resistances acting on the speed-change lever 12 from the slide surfaces 2T via the (elastic) protrusion parts 52 and (ii) elastic restoring forces generated in the (deformed) protrusion parts 52 that acts in the direction opposite to the direction of movement of the speed-change lever 12. The elastic restoring forces may also increase the sliding (frictional) resistance, because the protrusions 52 are pressed more firmly against the slide surfaces 2T and groove portions 91 when under elastic deformation. Similar to the above-mentioned first embodiment, one of the slide surfaces 2T is an inner-side surface of the left housing 2L, and the other of the slide surfaces 2T is an inner-side surface of the right housing 2R. The speed-change lever 12 moves linearly within the movable range, which has a straight-line shape along the front-rear direction.

In the power tool 1 according to the sixth embodiment, the resisting forces at an intermediate position of the movable range of the speed-change lever 12 are larger than the resisting forces at each end portion of the movable range of the speed-change lever 12. That is, the resisting forces imparted to the speed-change lever 12 from the slide surfaces 2T and the elastic members 51 in the vicinity of (on the forward and rearward sides of) the intermediate speed position PM for speed "2" are larger than the resisting forces imparted to the speed-change lever 12 from the slide surfaces 2T and the elastic members 51 in the vicinity of either the end-portion speed position PE for speed "1" or speed "3." In the example in FIG. 31, the more (closer) the speed-change lever 12 approaches the intermediate speed position PM from either end-portion speed position PE, the larger the sliding resistances imparted to the speed-change lever 12 from the slide surfaces 2T and the elastic members 51 become.

Specifically, in the sixth embodiment, spacing CL between the pair of slide surfaces 2T is smaller in an intermediate range of the movable range than at the end portions of the movable range. That is, the spacing CL between the pair of slide surfaces 2T is smaller in the vicinity of the intermediate speed position PM than in the vicinity of either of the end-portion speed positions PE.

In the example shown in FIG. 31, each of the slide surfaces 2T is inclined such that the more (closer) it approaches the intermediate speed position PM from either of the end-portion speed positions PE, the more (closer) the slide surfaces 2T approach (come closer to) the speed-change lever 12. The slide surfaces 2T between the groove portions 91A at the speed position for speed "1" and the groove portions 91B at the speed position for speed "2" are inclined such that they approach the corresponding inner side (toward the speed-change lever 12) in the left-right direction as they go rearward. The slide surfaces 2T between the groove portions 91C at the speed position for speed "3" and the groove portions 91B at the speed position for speed "2" are inclined such that they approach the corresponding inner side (toward the speed-change lever 12) in the left-right direction as they go forward. The shapes of the inclined slide surfaces 2T are left-right symmetrical between the left housing 2L and the right housing 2R.

Consequently, the spacing CL in the left-right direction between the slide surface 2T of the left housing 2L and the slide surface 2T of the right housing 2R becomes smaller the more it approaches the intermediate speed position PM from either of the end-portion speed positions PE. When the speed-change lever 12 is being moved from either of the end-portion speed positions PE to the intermediate speed position PM, the protruding portions 52 of the elastic members 51 move while contacting the slide surfaces 2T. Because the spacing CL gradually becomes smaller, the amount of deformation of the elastic members 51 increases as the speed-change lever 12 approaches the intermediate speed position PM, thereby increasing the sliding resistance between the protruding portions 52 and the slide surfaces 2T. Consequently, because the speed-change lever 12 becomes more difficult to move as it approaches the intermediate speed position PM, thereby requiring a larger manipulation force to be applied to the speed-change lever 12, it becomes less likely that the speed-change lever 12 will be unintentionally moved (slid) past the speed position for speed "2" and up to the speed position for speed "3". The same applies also to moving the speed-change lever 12 from the speed position for speed "3" to the speed position for speed "2."

The closer to either of the end-portion speed positions PE from the intermediate speed position PM, the larger the spacing CL becomes. When the speed-change lever 12 is being moved from the intermediate speed position PM to either of the end-portion speed positions PE, because the spacing CL gradually becomes larger, the sliding resistances decrease as the speed-change lever 12 approaches either of the end-portion speed positions PE. Consequently, the speed-change lever 12 becomes easier to move as it approaches either of the end-portion speed positions PE. However, because each of the end-portion speed positions PE is at an end portion of the movable range of the speed-change lever 12, and because the speed-change lever 12 will be fixed at one of the end-portion speed positions PE when it is moved until it reaches the limit of the movable range, the speed-change lever 12 will not be moved to an unintended speed position.

As explained above, in the sixth embodiment, the power tool 1 comprises: the motor 6, which comprises the stator 61 and the rotor 62; the output part 8, which is disposed forward of the motor 6; the speed-reducing mechanism 30 having three or more gear-shift stages, which is driven by rotation of the rotor 62 and rotationally drives the output part 8 at a rotational speed that is lower than the rotational speed of the rotor 62 that is being input into the speed-reducing mechanism 30; the speed-change lever 12 (gear-shifting manipulation part), which is movable within the movable range that includes the three speed positions corresponding to the three gear-shift stages of the speed-reducing mechanism 30; and the housing 2, which holds the speed-change lever 12 in a movable manner and imparts to the speed-change lever 12 resisting forces that resist movement of the speed-change lever 12. The resisting forces in an intermediate range of the movable range are larger than the resisting forces at each end portion of the movable range.

In the above-mentioned configuration, because the resisting forces imparted to the speed-change lever 12 in an intermediate range of the movable range become larger, when the user attempts to move the speed-change lever 12 to the speed position in the middle of the movable range, the speed-change lever 12 is less likely to unintentionally pass the (intermediate) speed position in the middle of the movable range. It is noted that the user only needs to move the speed-change lever 12 to the limit of the movable range for the speed positions at the end portions of the movable range, and there is no situation in which the user will unintentionally move the speed-change lever 12 beyond the speed positions at the end portions. Thereby, the user is not likely to switch the gear-shifting mechanism to a gear-shift mode that is not intended.

In the sixth embodiment, the housing 2 includes the pair of slide surfaces 2T, which sandwich the speed-change lever 12 in a movable manner. The spacing CL between the pair of slide surfaces 2T is smaller in an intermediate range of the movable range than at the end portions of the movable range.

In the above-mentioned configuration, because resisting forces due to friction can be increased by making the spacing CL between the pair of slide surfaces 2T smaller, the resisting forces in an intermediate range of the movable range can be made larger.

Seventh Embodiment

A seventh embodiment will now be explained. In the explanation below, structural elements that are identical or equivalent to those in the embodiments described above are assigned identical symbols, and explanations of those structural elements are abbreviated or omitted.

Figure 32:
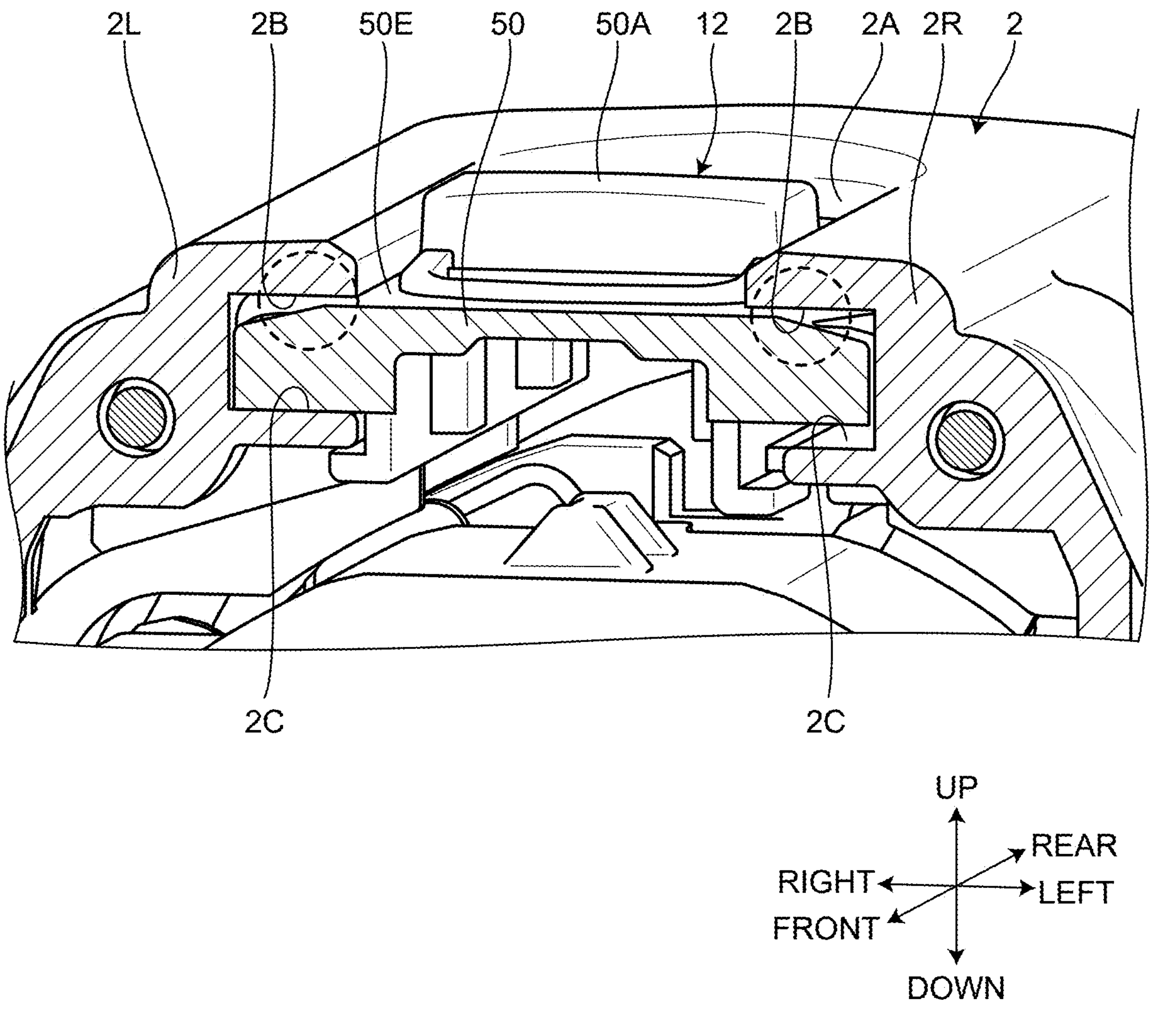
FIG. 32 is an oblique, cross-sectional view that shows the housing and the speed-change lever according to a seventh embodiment of the present teachings.
Figure 33:
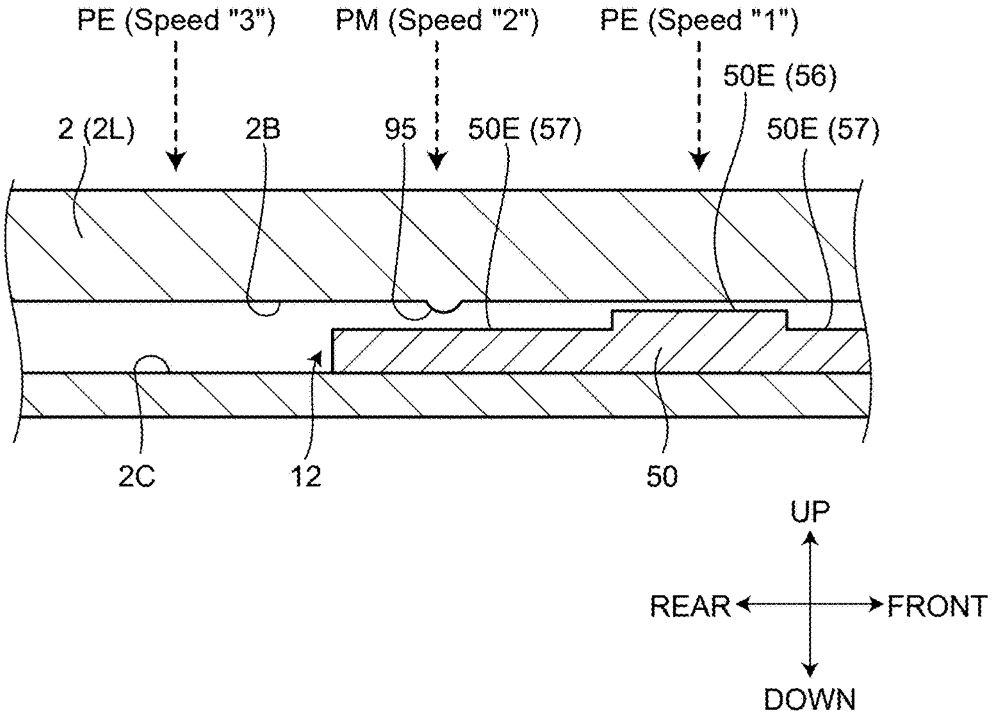
FIG. 33 is a schematic drawing for explaining a resistance-imparting portion of the housing according to the seventh embodiment of the present teachings.
Figure 34:
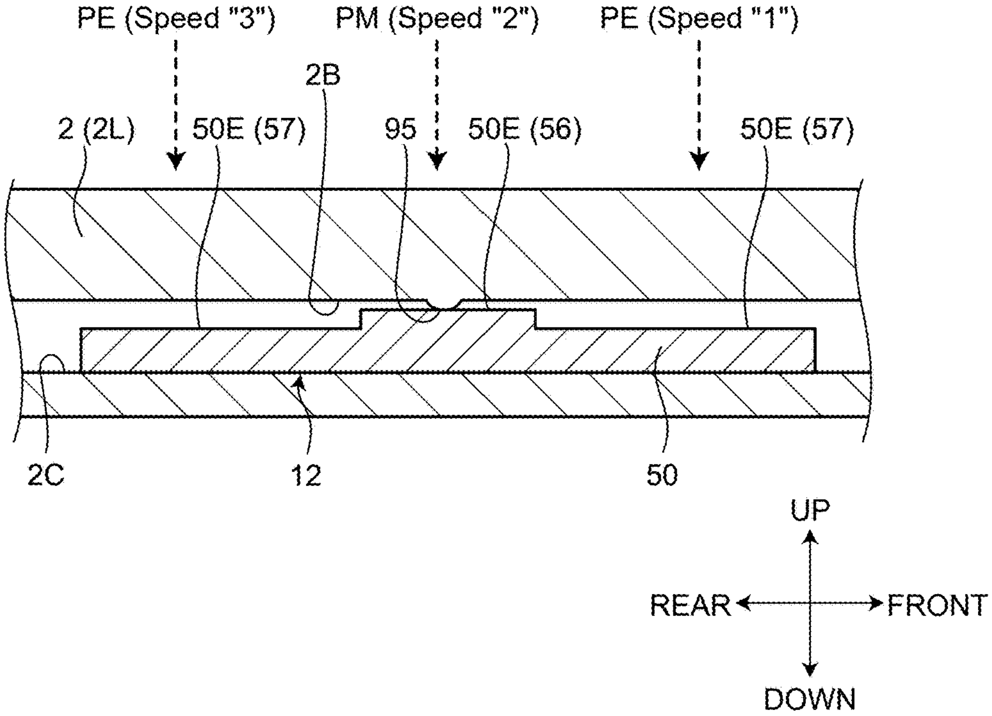
FIG. 34 is a schematic drawing that shows the state in which the resistance-imparting portion and the speed-change lever are in contact with each other.

FIG. 32 is an oblique, cross-sectional view that shows the housing 2 and the speed-change lever 12 according to the seventh embodiment. More specifically, FIG. 32 is an oblique view, viewed from the front, of a cross section along the up-down direction and the left-right direction passing through a holding portion in the housing 2 that holds the speed-change lever 12. FIG. 33 is a schematic drawing for explaining one of a pair of resistance-imparting portions 95 of the housing 2 according to the seventh embodiment. FIG. 34 is a schematic drawing that shows the same cross-section as FIG. 33, but in a state in which the resistance-imparting portion(s) 95 and the speed-change lever 12 are in contact with each other.

In the above-described sixth embodiment, an example was described in which the resisting forces in an intermediate range of the movable range are made larger by inclining the slide surfaces 2T of the housing 2, which the protruding portions 52 of the speed-change lever 12 respectively contact; however, in this seventh embodiment an example will be described in which the resisting forces at an intermediate position of the movable range are made larger at regions that differ from the slide surfaces 2T, which the protruding portions 52 contact.

More specifically, the housing 2 according to the seventh embodiment comprises the above-noted resistance-imparting portions 95—which impart to the speed-change lever 12 the resisting (frictional) forces that resist movement of the speed-change lever 12—at regions that differ from the slide surfaces 2T, which the protruding portions 52 contact in the preceding embodiments. As shown in FIG. 32, the two resistance-imparting portions 95 (see FIG. 33) are provided on respective inner-side upper surfaces 2B of the housing 2 (the two locations surrounded by broken lines) that oppose (face) the upper surface of the speed-change lever 12.

FIG. 33 and FIG. 34 schematically show cross sections along the front-rear direction passing through the position of one of the resistance-imparting portions 95. The resistance-imparting portions 95 are protruding portions that protrude downward from the inner-side upper surfaces 2B of the housing 2 toward the upper surfaces 50E of the movable member 50 of the speed-change lever 12. Although the resistance-imparting portions 95 are integral (monolithic) with the housing 2, the resistance-imparting portions 95 may each be separate bodies from the housing 2. As shown in FIG. 33, the resistance-imparting portion(s) 95 do(es) not contact the speed-change lever 12 when the speed-change lever 12 is at one of the end-portion speed positions PE. On the other hand, as shown in FIG. 34, the resistance-imparting portion(s) 95 contact(s) the speed-change lever 12 when the speed-change lever 12 is at the intermediate speed position PM. The resistance-imparting portions 95 impart sliding-resistance forces to the speed-change lever 12 by increasing friction at the sliding contacts with the upper surfaces 50E of the movable member 50. The speed-change lever 12 contacts the resistance-imparting portions 95 in a prescribed range, which includes the intermediate speed position PM, of the movable range and receives the resisting forces from the resistance-imparting portions 95. As a result, the resisting forces at an intermediate position of the movable range become larger than the resisting forces at each end portion of the movable range.

In the examples shown in FIG. 33 and FIG. 34, the upper surfaces 50E of the movable member 50 of the speed-change lever 12 each include a first portion 56, which is capable of contacting the respective resistance-imparting portion 95, and second portions 57, which do not contact the resistance-imparting portion 95. One second portion 57 is provided at both the front and the rear of the first portion 56. The first portion 56 protrudes more upwardly than the second portions 57. Consequently, when the speed-change lever 12 is being moved, the first portion 56 contacts the resistance-imparting portion 95 while the first portion 56 is disposed directly below the resistance-imparting portion 95. Because the second portions 57 are non-contacting with the resistance-imparting portion 95 when the second portions 57 are disposed directly below the resistance-imparting portion 95, a resisting force is not imparted from the resistance-imparting portion 95 to the speed-change lever 12.

The first portion 56 is provided over a prescribed range in the front-rear direction. The prescribed range of the first portion 56 in the front-rear direction corresponds to the range in which the resisting forces are to be imparted by the resistance-imparting portions 95. As shown in FIG. 34, the first portion 56 is provided at a position that becomes directly below the resistance-imparting portion 95 when the speed-change lever 12 is at the speed position for speed “2,” which is the intermediate speed position PM. Thus, when the speed-change lever 12 is at the intermediate speed position PM, the first portion 56 is provided over the prescribed range of the resistance-imparting portions 95 in the front-rear direction. The second portions 57 are provided at positions that are directly below the resistance-imparting portions 95 while the speed-change lever 12 is at the speed position for speed “1” and at the speed position for speed “3,” which are the end-portion speed positions PE. Consequently, when the speed-change lever 12 is at the speed position for speed “1” and the speed position for speed “3,” which are the end-portion speed positions PE, the speed-change lever 12 and the resistance-imparting portions 95 do not contact each other, and the speed-change lever 12 does not receive resisting forces from the resistance-imparting portions 95.

Thereby, for example, when the speed-change lever 12 is at the end-portion speed position PE for speed “1” shown in FIG. 33, and the speed-change lever 12 is being moved to the intermediate speed position PM, the first portions 56 and the resistance-imparting portion 95 contact each other when a rear-end portion of the first portions 56 reaches the location of the resistance-imparting portions 95. After the first portions 56 and the resistance-imparting portions 95 contact each other, the speed-change lever 12 continues to receive the resisting (frictional) force from the resistance-imparting portions 95 until the speed-change lever 12 reaches one of the end-portion speed positions PE. Consequently, it becomes more difficult to move the speed-change lever 12 in the prescribed range—centered on the intermediate speed position PM—which is at an intermediate position of the movable range; that is, the manipulation force F for sliding the speed-change lever 12 must be increased in the range of the contact between the first portions 56 and the resistance-imparting portions 95. Thus, because it is necessary to increase the manipulation force applied to the speed-change lever 12 in the intermediate portion of the movable range, the speed-change lever 12 is less likely to unintentionally pass the speed position for speed “2” up to the speed position for speed "3". The same applies also to moving the speed-change lever 12 from the speed position for speed "3" to the speed position for speed "2."

As explained above, with regard to the housing 2, in addition to or instead of the resisting forces being imparted by the slide surfaces 2T, which contact the protruding portions 52, the resisting forces in an intermediate range of the movable range may be made larger than the resisting forces at the end portions of the movable range by the resistance-imparting portions 95, which are provided separately from the slide surfaces 2T.

It is noted that, although in the examples of FIG. 33 and FIG. 34, the resistance-imparting portions 95 are provided on the inner-side upper surfaces 2B of the housing 2, the resistance-imparting portions 95 may instead be provided on inner-side support surfaces 2C of the housing 2. The inner-side support surfaces 2C are surfaces that support the lower surface of the speed-change lever 12.

Eighth Embodiment

An eighth embodiment will now be explained. In the explanation below, structural elements that are identical or equivalent to those in the embodiments described above are assigned identical symbols, and explanations of those structural elements are abbreviated or omitted.

Figure 35:
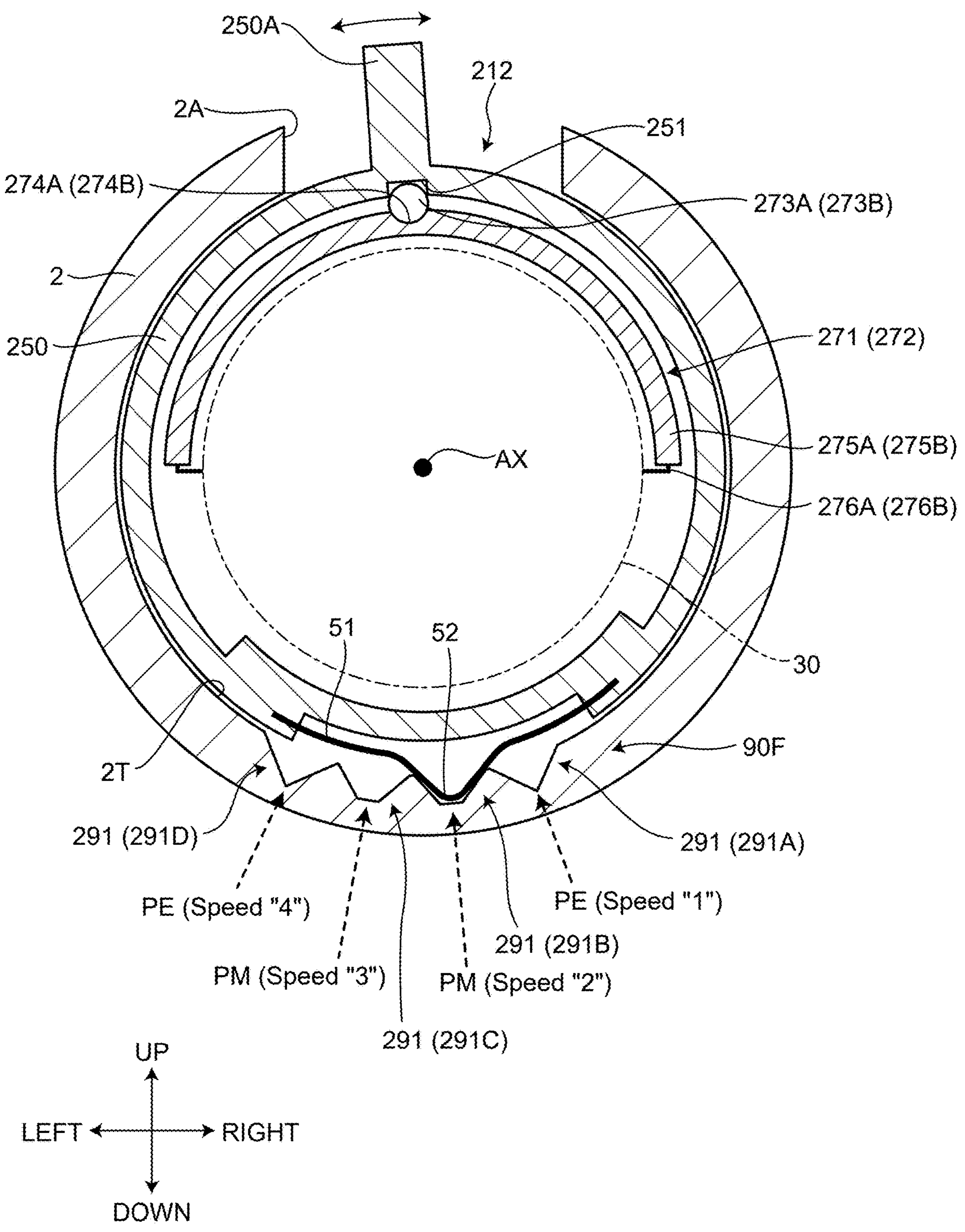
FIG. 35 is a schematic drawing that shows the speed-change lever and the position-holding parts according to an eighth embodiment of the present teachings.
Figure 36:
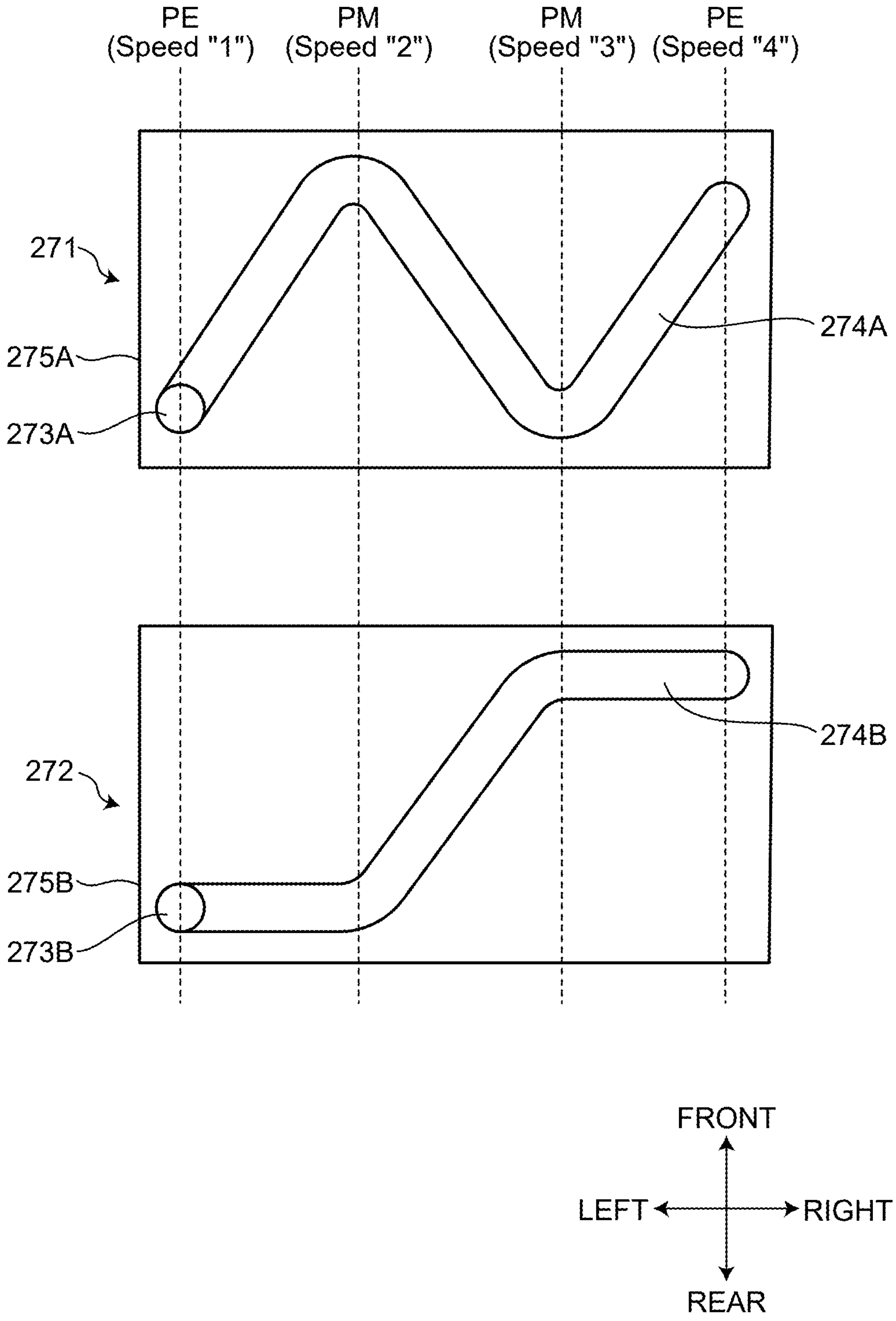
FIG. 36 is a diagram for explaining a speed-change mechanism according to the eighth embodiment.

FIG. 35 is a schematic drawing that shows a speed-change lever 212 (gear-shifting manipulation part) and a position-holding part 90F according to the eighth embodiment. More specifically, FIG. 35 is a schematic drawing, viewed from the front-rear direction, of a cross section of the speed-change lever 212, the cross section being along a surface orthogonal to rotational axis AX. FIG. 36 is a diagram for explaining a speed-change mechanism according to the eighth embodiment.

The speed-change lever 212 according to the eighth embodiment is pivotable about rotational (central) axis AX, which extends in the front-rear direction, along an inner-circumferential surface of the housing 2. In the example shown in FIG. 35, the speed-change lever 212 has a ring shape. A movable member 250 of the speed-change lever 212 has a circular-ring shape. A first speed-change mechanism 271, a second speed-change mechanism 272, and the speed-reducing mechanism 30, which is indicated by a chain, double-dashed line, are disposed within the inner circumference of the movable member 250.

A knob part 250A of the movable member 250 protrudes radially outward from an outer-circumferential surface of the movable member 250. The knob part 250A protrudes from the interior to the exterior of the housing 2 through the opening 2A in the housing 2. The user can pivot the speed-change lever 212 about central axis AX by gripping the knob part 250A and moving it in either of the circumferential directions of the housing 2. The opening 2A defines the movable range of the speed-change lever 212. The movable range is a prescribed angular range about central axis AX in the front-rear direction.

The first speed-change mechanism 271 and the second speed-change mechanism 272 are disposed between the speed-change lever 212 and the speed-reducing mechanism 30. The first speed-change mechanism 271 and the second speed-change mechanism 272 are held by a casing 4 (not shown in FIG. 35) in a movable manner in the front-rear direction and in a non-movable manner in the rotational direction. The first speed-change mechanism 271 and the second speed-change mechanism 272 cause the gear mechanisms of the speed-reducing mechanism 30 to operate to switch the speed-reduction ratio of the speed-reducing mechanism 30 as the speed-change lever 212 pivots in the circumferential direction.

The first speed-change mechanism 271 and the second speed-change mechanism 272 are disposed aligned in the front-rear direction. The first speed-change mechanism 271 is connected to the movable member 250 via a ball 273A. It is noted that, although FIG. 35 shows a cross section of the location at which the first speed-change mechanism 271 is disposed, similar to the first speed-change mechanism 271, the second speed-change mechanism 272 is also connected to the movable member 250 via a ball 273B. A holding recessed portion 251, which holds both the ball 273A and the ball 273B, is formed in the inner-circumferential surface of the movable member 250. The first speed-change mechanism 271 comprises an arcuate-shaped cam plate 275A, in which a cam groove 274A is formed. The cam plate 275A is connected to the speed-reducing mechanism 30 by a first switching wire 276A. The second speed-change mechanism 272 comprises an arcuate-shaped cam plate 275B, in which a cam groove 274B is formed. The cam plate 275B is connected to the speed-reducing mechanism 30 by a second switching wire 276B.

FIG. 36 shows the contours of the arcuate-shaped cam plate 275A and the cam plate 275B in plan view. As shown in FIG. 36, the cam groove 274A, which is formed in the cam plate 275A of the first speed-change mechanism 271, has a shape that zigzags forward and rearward along the circumferential direction. One portion of the ball 273A is disposed in the interior of the holding recessed portion 251 of the movable member 250, and the other portion of the ball 273A is disposed in the interior of the cam groove 274A. The cam groove 274B, which is formed in the cam plate 275B of the second speed-change mechanism 272, has a shape that inclines forward partway from a left-end portion toward a right-end portion in the circumferential direction. One portion of the ball 273B is disposed in the interior of the holding recessed portion 251 of the movable member 250, and the other portion of the ball 273B is disposed in the interior of the cam groove 274B.

In the eighth embodiment, the speed-reducing mechanism 30 is a four-stage, gear-shifting mechanism. The speed-change lever 212 is pivotable to the two end-portion speed positions PE, which are respectively at the two ends of the movable range, and two intermediate speed positions PM, which are at intermediate positions of the movable range. The two end-portion speed positions PE are speed positions for speed "1" and for speed "4," respectively, and the two intermediate speed positions PM are speed positions for speed "2" and for speed "3," respectively.

FIG. 36 shows the state in which the speed-change lever 212 is at the speed position for speed "1." When the speed-change lever 212 is pivoted toward the speed position for speed "4," the ball 273A and the ball 273B move, together with the movable member 250, in the circumferential direction (right direction in FIG. 36) as the speed-change lever 212 pivots. Owing to the movement of the ball 273A and the ball 273B, the cam plate 275A and the cam plate 275B are pushed by the ball 273A and the ball 273B and move in the front-rear direction.

In the first speed-change mechanism 271, the cam plate 275A moves rearward in the process of the ball 273A moving from the speed position for speed "1" to the speed position for speed "2," and thereby the cam plate 275A causes a switching ring of the speed-reducing mechanism 30 to be disposed at a rearward position. The cam plate 275A moves forward in the process of the ball 273A moving from the speed position for speed "2" to the speed position for speed "3," and thereby the cam plate 275A causes the switching ring of the speed-reducing mechanism 30 to be disposed at a forward position. The cam plate 275A moves rearward in the process of the ball 273A moving from the speed position for speed "3" to the speed position for speed "4," and thereby the cam plate 275A causes the switching ring of the speed-reducing mechanism 30 to be disposed at the rearward position.

In the second speed-change mechanism 272, when the ball 273B is at the speed position for speed "1" or for speed "2," the cam plate 275B is disposed at a forward position, and thereby the cam plate 275B causes the switching ring of the speed-reducing mechanism 30 to be disposed at the forward position. The cam plate 275B moves rearward in the process of the ball 273B moving from the speed position for speed "2" to the speed position for speed "3," and thereby the cam plate 275B causes the switching ring of the speed-reducing mechanism 30 to be disposed at the rearward position. When the ball 273B is at the speed position for speed "3" or for speed "4," the cam plate 275B is disposed at the rearward position, and thereby the cam plate 275B causes the switching ring of the speed-reducing mechanism 30 to be disposed at the rearward position.

Accordingly, at the speed position for speed "1," the cam plate 275A is disposed at the forward position, and the cam plate 275B is disposed at the forward position. At the speed position for speed "2," the cam plate 275A is disposed at the rearward position, and the cam plate 275B is disposed at the forward position. At the speed position for speed "3," the cam plate 275A is disposed at the forward position, and the cam plate 275B is disposed at the rearward position. At the speed position for speed "4," the cam plate 275A is disposed at the rearward position, and the cam plate 275B is disposed at the rearward position. By moving the switching ring to the front and rear in accordance with the positions of the cam plate 275A and the cam plate 275B, the intermeshing position of the gear mechanisms provided by the speed-reducing mechanism 30 can be varied. According to such a configuration, the speed-reducing mechanism 30 selectively switches among the speed-reduction ratios of the four stages by the combinations of the front-rear position of the cam plate 275A of the first speed-change mechanism 271 and the front-rear position of the cam plate 275B of the second speed-change mechanism 272.

As shown in FIG. 35, the elastic member 51 is held on an outer-circumferential surface of the movable member 250. A gap is formed between the outer-circumferential surface of the movable member 250 and the rear surface of the elastic member 51, and the elastic member 51 is deformable radially inward. The movable member 250 opposes (faces) the slide surface 2T, which is the inner-circumferential surface of the housing 2. The elastic member 51 contacts the slide surface 2T as the elastic member 51 elastically deforms. The protruding portion 52 of the elastic member 51 protrudes radially outward of central axis AX toward the slide surface 2T. When the movable member 250 pivots, the protruding portion 52 moves along the slide surface 2T while contacting the slide surface 2T.

Groove portions 291 of the position-holding part 90F are formed in the slide surface 2T, which is the inner-circumferential surface of the housing 2. The groove portions 291 are recessed from the slide surface 2T of the housing 2 in the direction leading away from the speed-change lever 12. That is, the groove portions 291 are recessed radially outward from the slide surface 2T. The groove portions 291 oppose the speed-change lever 212 in the radial direction. When the protruding portion 52, which is radially outward facing, enters the interior of one of the groove portions 291 from radially inward, the groove portion 291 engages with the protruding portion 52.

The groove portions 291 include: a groove portion 291A, which is provided at the speed position for speed "1"; a groove portion 291B, which is provided at the speed position for speed "2"; a groove portion 291C, which is provided at the speed position for speed "3"; and a groove portion 291D, which is provided at the speed position for speed "4." The groove portion 291A and the groove portion 291D are groove portions at the end-portion speed positions PE, and the groove portion 291B and the groove portion 291C are groove portions at the intermediate speed positions PM. The shapes of the groove portion 291A and the groove portion 291D are the same as the shapes of the groove portions 91A (and the groove portions 91C) of the above-mentioned first embodiment. The shapes of the groove portion 291B and the groove portion 291C are the same as the shape of the groove portions 91B of the above-mentioned first embodiment.

Consequently, when the groove portion 291B or the groove portion 291C engages with the protruding portion 52, a larger position-holding force is imparted to the speed-change lever 212 at the speed position for speed "2" and the speed position for speed "3," which are the intermediate speed positions PM, than at the end-portion speed positions PE. As a result, as the user attempts to move (rotate) the speed-change lever 212 to the speed position for speed "2" or speed "3", unintentional movement passing through those speed positions to another speed position is less likely to occur. When the user attempts to move the speed-change lever 212 from one of the intermediate speed positions PM to the speed position for speed "1" or speed "4," which are the end-portion speed positions PE, because the user has to pivot the speed-change lever 212 to the limit of the movable range, the user does not need to adjust the manipulation force, and thereby it is possible for the user to move the speed-change lever 212 reliably to the intended speed position.

As explained above, the movable range of the speed-change lever 212 need not have a straight-line shape in all embodiments of the present teachings, but may instead extend in the rotational direction about rotational (central) axis AX.

Other Embodiments

In the embodiments described above, it is assumed that the battery pack 20, which is mounted on the battery-mounting part 5, is used as the power supply of the power tool 1. However, in the alternative, a commercial power supply (AC power supply) may be used as the power supply of the power tool 1. In such embodiments, the power tool 1 preferably has a power cord, instead of the battery-mounting part 5.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved power tools.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

1 Power tool
2 Housing
2A Opening
2B Inner-side upper surface
2C Inner-side support surface
2L Left housing
2R Right housing
2S Screw
2T Slide surface
3 Rear cover
3S Screw
4 Casing
4A First casing
4B Second casing
4C Bracket plate
4D Stop plate
4E Screw
4F Screw
4H Through hole
4J Through hole
4S Screw
5 Battery-mounting part
6 Motor
7 Power-transmission mechanism
8 Output part
9 Fan
10 Trigger lever
11 Forward/reverse-switch lever
12 Speed-change lever (gear-shifting manipulation part)
13 Mode-change ring
15 Interface panel
16 Dial
17 Controller
18 Air-intake port
19 Air-exhaust port
20 Battery pack
21 Motor-housing part
22 Grip part
23 Battery-holding part
24 Manipulation device
25 Display device
26 Controller case
27 Panel opening
28 Dial opening
30 Speed-reducing mechanism
31 First planetary-gear mechanism
31S Pinion gear
32 Second planetary-gear mechanism
32A Pin
32C Second carrier
32E Groove
32F Cam tooth
32P Planet gear
32R Internal gear
32S Sun gear
33 Third planetary-gear mechanism
33A Pin
33C Third carrier
33F Cam tooth
33G Cam tooth
33P Planet gear
33R Internal gear
33S Sun gear
40 Hammer mechanism
41 First cam
42 Second cam
43 Hammer-switching ring
43C Switching cam
43E Spring
43S Opposing portion
44 Stop ring
45 Support ring
46 Steel ball
47 Washer
48 Cam ring
50 Movable member
50A Knob part
50B Support part
50C Support part
50D Side surface
50E Upper surface
51 Elastic member
52 Protruding portion
53 Inclined outer surface
55 Groove portion
55A Groove portion
55B Groove portion
55C Groove portion
56 First portion
57 Second portion
61 Stator
61A Stator core
61B Front insulator
61C Rear insulator
61D Coil
61E Sensor circuit board
61F Short-circuiting member
62 Rotor
62A Rotor core
62B Permanent magnet
63 Rotor shaft
64 Bearing
65 Bearing
71 First speed-change mechanism
72 Second speed-change mechanism
81 Spindle
81F Flange portion
81R Screw hole
81T Flat surface
82 Chuck
83 Bearing

84 Bearing
87 Coil spring
90 Position-holding part
90A Position-holding part
90B Position-holding part
90C Position-holding part
90D Position-holding part
90E Position-holding part
90F Position-holding part
91 Groove portion
91A Groove portion
91B Groove portion
91C Groove portion
92 Inclined inner surface
93 Inner-bottom surface
95 Resistance-imparting portion
101 Support part
102 Side surface
150 Movable member
155 Slide surface
212 Speed-change lever (gear-shifting manipulation part)
250 Movable member
250A Knob part
251 Holding recessed portion
271 First speed-change mechanism
272 Second speed-change mechanism
273A Ball
273B Ball
274A Cam groove
274B Cam groove
275A Cam plate
275B Cam plate
276A First switching wire
276B Second switching wire
291 Groove portion
291A Groove portion
291B Groove portion
291C Groove portion
291D Groove portion
311A First pin
311C First-stage carrier
311F Cam tooth
311P Planet gear
311R Internal gear
311S Large-diameter portion
312A Second pin
312C Second-stage carrier
312F Cam tooth
312P Planet gear
312R Internal gear
312S Small-diameter portion
500 Switching ring
500A Groove
500B Ring portion
500C Protruding portion
500D Cam groove
500E Cam groove
510 First switching wire
520 Second switching wire
600 Guide rod
610 First movable member
620 Second movable member
630 First spring
640 Second spring
F Manipulation force
H1 Groove depth
H2 Groove depth
H3 Groove depth
W1 Groove width
W2 Groove width
W3 Groove width
$\alpha$1 Inclination angle
$\alpha$2 Inclination angle
$\alpha$3 Inclination angle
$\beta$ Inclination angle

The invention claimed is:

1. A power tool, comprising:

a motor, which comprises a stator and a rotor having a rotational axis;

an output part, which extends forward of the motor in a front-rear direction of the power tool that is parallel or colinear with the rotational axis of the rotor;

a speed-reducing mechanism having three or more gear-shift stages, which is driven by rotation of the rotor and causes the output part to rotate at a rotational speed that is lower than the rotational speed of the rotor that is being input to the speed-reducing mechanism;

a gear-shifting manipulation part configured to move within a movable range that includes three or more speed positions for the three or more respective gear-shift stages of the speed-reducing mechanism; and a position-holding part configured to impart a position-holding force to the gear-shifting manipulation part at each of the speed positions to hold it at the respective speed position;

wherein:

the position-holding force at an intermediate speed position, which is located between first and second end-portion speed positions respectively located at opposite ends of the movable range, is larger than the position-holding force at the first and second end-portion speed positions of the movable range;

one of the gear-shifting manipulation part and the position-holding part has a protruding portion, and the other of the gear-shifting manipulation part and the position-holding part has at least one groove portion, the position-holding force being generated by engagement of the at least one groove portion with the protruding portion;

the at least one groove portion comprises a first groove portion at the first end-portion speed position, a second groove portion at the intermediate speed position and a third groove portion at the second end-portion speed position, respectively;

each of the first, second and third groove portions has a pair of inclined inner surfaces that are inclined by a groove inclination angle relative to a movement direction of the gear-shifting manipulation part; and the groove inclination angle of each of the inclined inner surfaces of the second groove portion at the intermediate speed position is larger than the groove inclination angles of each of the inclined inner surfaces of the first and third groove portions at the first and second end-portion speed positions.

2. The power tool according to claim 1, wherein:

the protruding portion has a pair of inclined outer surfaces that are inclined by a protruding inclination angle relative to the movement direction of the gear-shifting manipulation part; and the groove inclination angle of each of the inclined inner surfaces of the second groove portion at the intermediate speed position is larger than the protruding inclination angle of each of the inclined outer surfaces of the protruding portion.

3. The power tool according to claim 2, wherein the second groove portion at the intermediate speed position has a groove depth that is less than the groove depth of the first and third groove portions at the first and second end-portion speed positions.

4. The power tool according to claim 1, wherein the groove inclination angle of each of inclined inner surfaces of the second groove portion at the intermediate speed position is 45° or more and 90° or less.

5. The power tool according to claim 1, wherein the second groove portion at the intermediate speed position has an inner-bottom surface, which connects end portions of the pair of inclined inner surfaces of the second groove portion.

6. The power tool according to claim 1, further comprising:

a housing, which holds the gear-shifting manipulation part in a movable manner;

wherein the position-holding part is located on the housing and provides at least one slide surface for the gear-shifting manipulation part.

7. The power tool according to claim 6, wherein the gear-shifting manipulation part comprises:

a movable member configured to be movable to each of the three or more speed positions; and an elastic member, which is held by or on the movable member and contacts the slide surface under elastic deformation.

8. The power tool according to claim 1, wherein the movable range of the gear-shifting manipulation part has a straight-line shape along the front-rear direction.

9. The power tool according to claim 1, wherein the gear-shifting manipulation part has a plate shape that is slidable along the movable range of the gear-shifting manipulation part.

10. The power tool according to claim 1, wherein:

the speed-reducing mechanism comprises a gear mechanism that is operably coupled to the gear-shifting manipulation part; and the speed-reducing mechanism is configured to provide three or more speed-reduction ratios by changing an intermeshing position of the gear mechanism in accordance with the respective three or more speed positions of the gear-shifting manipulation part.

11. The power tool according to claim 1, wherein the speed-reducing mechanism is a three-stage, gear-shifting mechanism.

12. The power tool according to claim 1, wherein the output part comprises:

a spindle that is rotatable about the rotational axis; and a chuck mounted on the spindle and configured to hold a tool accessory.

13. The power tool according to claim 1, further comprising:

a housing, which holds the gear-shifting manipulation part in a movable manner;

wherein the position-holding part comprises an elastic member, which is disposed on the housing and contacts a slide surface for the gear-shifting manipulation part.

14. A power tool, comprising:

a motor, which comprises a stator and a rotor having a rotational axis;

an output part, which extends forward of the motor in a front-rear direction of the power tool that is parallel or colinear with the rotational axis of the rotor;

a speed-reducing mechanism having three or more gear-shift stages, which is driven by rotation of the rotor and causes the output part to rotate at a rotational speed that is lower than the rotational speed of the rotor that is being input to the speed-reducing mechanism;

a gear-shifting manipulation part configured to move within a movable range that includes three or more speed positions for the three or more respective gear-shift stages of the speed-reducing mechanism; and a position-holding part configured to impart a position-holding force to the gear-shifting manipulation part at each of the speed positions to hold it at the respective speed position;

wherein:

the position-holding force at an intermediate speed position, which is located between first and second end-portion speed positions respectively located at opposite ends of the movable range, is larger than the position-holding force at the first and second end-portion speed positions of the movable range;

one of the gear-shifting manipulation part and the position-holding part has a protruding portion, and the other of the gear-shifting manipulation part and the position-holding part has at least one groove portion, the position-holding force being generated by engagement of the at least one groove portion with the protruding portion;

the at least one groove portion comprises a first groove portion at the first end-portion speed position, a second groove portion at the intermediate speed position and a third groove portion at the second end-portion speed position, respectively; and the second groove portion at the intermediate speed position has a groove depth that is larger than the groove depth of the first and third groove portions at the first and second end-portion speed positions.

15. A power tool, comprising:

a motor, which comprises a stator and a rotor having a rotational axis;

an output part, which extends forward of the motor in a front-rear direction of the power tool that is parallel or colinear with the rotational axis of the rotor;

a speed-reducing mechanism having three or more variable-speed stages, which is driven by rotation of the rotor and causes the output part to rotate at a rotational speed that is lower than the rotational speed of the rotor that is being input to the speed-reducing mechanism;

a gear-shifting manipulation part configured to move within a movable range that includes three or more speed positions for the respective three or more variable-speed stages of the speed-reducing mechanism; and a housing, which holds the gear-shifting manipulation part in a movable manner;

wherein:

the housing has:

a first pair of grooves, a second pair of grooves and a third pair of grooves that respectively correspond to a first gear-shift stage, a second gear-shift stage and a third gear-shift stage of the speed-reducing mechanism, the first pair of grooves being located at a first end position in the movable range, the second pair of grooves being located at an intermediate position in the movable range, and the third pair of grooves being located at a second end position in the movable range;

a first pair of slide surfaces respectively connecting the first pair of grooves and the second pair of grooves; and a second pair of slide surfaces respectively connecting the second pair of grooves and the third pair of grooves;

a spacing between the first pair of slide surfaces monotonically decreases in a direction from the first pair of grooves toward the second pair of grooves; and a spacing between the second pair of slide surfaces monotonically decreases in a direction from the third pair of grooves toward the second pair of grooves.

16. A power tool, comprising:

a motor, which comprises a stator and a rotor having a rotational axis;

an output part, which extends forward of the motor in a front-rear direction of the power tool that is parallel or colinear with the rotational axis of the rotor;

a speed-reducing mechanism having three or more gear-shift stages, which is driven by rotation of the rotor and causes the output part to rotate at a rotational speed that is lower than the rotational speed of the rotor that is being input to the speed-reducing mechanism;

a gear-shifting manipulation part configured to move within a movable range that includes three or more speed positions for the three or more respective gear-shift stages of the speed-reducing mechanism; and a housing that houses the motor, at least a portion of the output part, the speed-reducing mechanism;

wherein:

the housing supports the gear-shifting manipulation part such that the gear-shifting manipulation part is slidable relative to the housing;

one of the housing and the gear-shifting manipulation part has a pair of elastic protrusions;

the other of the housing and the gear-shifting manipulation part has a first pair of grooves, a second pair of grooves and a third pair of grooves that respectively correspond to a first gear-shift stage, a second gear-shift stage and a third gear-shift stage of the speed-reducing mechanism;

the second gear-shift stage defines an intermediate speed range of the output part between a low speed range of the output part and a high speed range of the output part at the first gear-shift stage and the third gear-shift stage, respectively; and the second pair of grooves has inclined inner surfaces that form a larger inclination angle relative to a movement direction of the gear-shifting manipulation part than inclination angles of the first and third pairs of grooves.

* * * * *